US012460686B2

(12) United States Patent
Zimmer

(10) Patent No.: US 12,460,686 B2
(45) Date of Patent: Nov. 4, 2025

(54) ELECTROMAGNETIC CLUTCH

(71) Applicant: ZPE LICENSING INC., Temecula, CA (US)

(72) Inventor: Andrew Jason Zimmer, Temecula, CA (US)

(73) Assignee: ZPE LICENSING INC., Temecula, CA (US)

( * ) Notice: Subject to any disclaimer, the term of this patent is extended or adjusted under 35 U.S.C. 154(b) by 0 days.

(21) Appl. No.: 18/984,534

(22) Filed: Dec. 17, 2024

(65) Prior Publication Data

US 2025/0116302 A1 Apr. 10, 2025

Related U.S. Application Data

(63) Continuation of application No. 18/167,262, filed on Feb. 10, 2023, now Pat. No. 12,209,619.

(60) Provisional application No. 63/363,313, filed on Apr. 20, 2022.

(51) Int. Cl.
*F16D 27/112* (2006.01)
*F16D 27/14* (2006.01)

(52) U.S. Cl.
CPC ............ *F16D 27/112* (2013.01); *F16D 27/14* (2013.01); *F16D 2250/0038* (2013.01)

(58) Field of Classification Search
CPC ........ F16D 27/04; F16D 27/14; F16D 27/112; F16D 2250/0038
See application file for complete search history.

(56) References Cited

U.S. PATENT DOCUMENTS

| | | | |
|---|---|---|---|
| 662,046 | A | 11/1900 | Winter |
| 902,224 | A | 10/1908 | Fouillaron |
| 936,213 | A | 10/1909 | Bordenkircher |
| 1,176,787 | A | 3/1916 | Swabb |
| 1,350,670 | A | 8/1920 | Ritter |
| 1,601,662 | A | 9/1926 | Abbott |
| 1,966,831 | A | 7/1934 | Torrence |
| 2,182,774 | A | 12/1939 | Birnbaum |
| 2,184,545 | A | 12/1939 | Collier |
| 2,187,188 | A | 1/1940 | Whitcomb |
| 2,230,902 | A | 2/1941 | Overbey |
| 2,390,875 | A | 12/1945 | Firth |
| 2,402,743 | A | 6/1946 | Firth |
| 2,413,817 | A | 1/1947 | Firth |

(Continued)

FOREIGN PATENT DOCUMENTS

| | | | |
|---|---|---|---|
| JP | 2019138324 | A | 8/2019 |
| WO | 2013159910 | A1 | 10/2013 |

OTHER PUBLICATIONS

Australian Examination Report No. 1 issued in App. No. AU2021202191, dated Mar. 21, 2025, 2 pages.

(Continued)

*Primary Examiner* — Huan Le
(74) *Attorney, Agent, or Firm* — DANE IP Law PC

(57) ABSTRACT

A pulley assembly having a body, a shaft mount and a plurality of bolts is disclosed. The body is aligned to the shaft mount by providing a tight tolerance between a shoulder portion of the bolt and a neck portion of a counter sunk hole formed in the body. Additionally, an outer surface of the body may have a pattern of friction lines or patches formed by fusing particulate matter to the outer surface with heat generated by a laser beam.

19 Claims, 40 Drawing Sheets

(56) References Cited

U.S. PATENT DOCUMENTS 2,495,459 A 1/1950 Kessler
2,516,829 A 7/1950 Reeves
2,548,387 A 4/1951 May
2,553,791 A 5/1951 Smith
2,609,699 A 9/1952 Rohn
2,633,751 A 4/1953 Browning
2,643,549 A 6/1953 Whitesell
2,701,491 A 2/1955 Ross
2,748,618 A 6/1956 Lee
2,779,202 A 1/1957 Jackson
2,836,982 A 6/1958 Voss
2,905,361 A 9/1959 Noall
2,963,145 A 12/1960 Bruestle
3,078,556 A 2/1963 Carroll
3,445,130 A 5/1969 Obenshain
3,473,202 A 10/1969 Howard
3,599,311 A 8/1971 Ellis
3,604,280 A 9/1971 Davis
3,651,557 A 3/1972 Bagley
3,666,613 A 5/1972 Beninga
3,738,691 A 6/1973 Firth
3,772,928 A 11/1973 Gobeille
3,776,059 A 12/1973 Habermann
3,945,102 A 3/1976 Kotlar
3,958,063 A 5/1976 Robson
4,034,458 A 7/1977 Ford
4,142,811 A 3/1979 Burnham
4,291,426 A 9/1981 Bishop, Jr.
4,364,736 A 12/1982 Hetz
4,366,609 A 1/1983 Speer
4,468,210 A 8/1984 McCutchan, Jr.
4,548,592 A 10/1985 Ohhashi
4,612,208 A 9/1986 Reichenecker
4,692,128 A 9/1987 Sadler
4,781,656 A 11/1988 Brackett
4,781,660 A 11/1988 Amataka
4,781,661 A 11/1988 Emmett
4,790,799 A 12/1988 Sadler
4,826,412 A 5/1989 Kubo
4,838,842 A 6/1989 Ohkata
4,860,618 A 8/1989 Givot
4,905,361 A 3/1990 Morishita
4,913,689 A 4/1990 Morishita
4,947,533 A 8/1990 Taniguchi
4,947,713 A 8/1990 Arnold
5,069,654 A 12/1991 Rampe
5,106,672 A 4/1992 Rabe
5,168,972 A 12/1992 Smith
5,269,982 A 12/1993 Brotz
5,289,813 A 3/1994 Adachi
5,306,096 A 4/1994 Tuens
5,374,221 A 12/1994 Casada
5,454,760 A 10/1995 Aranibar
5,507,698 A 4/1996 Kuribayashi
D370,397 S 6/1996 White
5,593,366 A 1/1997 Puzik
5,637,353 A 6/1997 Kimock
5,894,650 A 4/1999 Barenburg
5,997,012 A 12/1999 Brian
6,089,833 A 7/2000 Glanfield
6,253,648 B1 7/2001 Beery
6,254,503 B1 7/2001 Chiba
6,266,860 B1 7/2001 Kiebler
6,415,491 B1 7/2002 Klann
6,543,113 B1 4/2003 Khurana
6,572,270 B2 6/2003 Takemura
6,648,781 B1 11/2003 Fischer
6,676,548 B2 1/2004 Fujiwara
6,731,043 B2 5/2004 Pritchard
6,761,093 B2 7/2004 Chang
6,796,919 B2 9/2004 Johnson
6,858,262 B2 2/2005 Fischer
6,951,156 B2 10/2005 Garg
6,960,117 B1 11/2005 Mahadev
7,004,730 B1 2/2006 Williams
7,096,765 B1 8/2006 Diggle, III
7,159,491 B1 1/2007 Chaconas
7,191,880 B2 3/2007 Liston
7,207,111 B2 4/2007 Aloise
7,210,379 B1 5/2007 Pepin
7,244,185 B2 7/2007 Kamdem
7,259,351 B2 8/2007 Lineton
7,284,464 B2 10/2007 Chaconas
7,297,081 B2 11/2007 Eck
7,350,447 B1 4/2008 Smith
7,448,972 B2 11/2008 Garabello
7,520,041 B1 4/2009 Aguilar
7,648,435 B2 1/2010 Ishida
7,653,975 B2 2/2010 Hu
7,780,556 B2 8/2010 Sakanaka
7,798,927 B2 9/2010 Ishida
7,824,287 B2 11/2010 Nonoshita
7,857,721 B2 12/2010 Ishida
7,958,635 B2 6/2011 Yoshida
7,996,972 B2 8/2011 Hu
D662,046 S 6/2012 Unger
8,308,590 B2 11/2012 Fiordaliso
8,485,068 B2 7/2013 Campbell
8,607,671 B2 12/2013 Peirce
8,653,409 B1 2/2014 Sodhi
8,852,698 B2 10/2014 Fukumitsu
8,931,156 B1 1/2015 Zimmer
9,027,446 B1 5/2015 Simkin
9,028,353 B1 5/2015 Zimmer
9,254,922 B2 2/2016 Anderson
9,382,995 B2 7/2016 Osborne
9,421,637 B2 8/2016 Zimmer
9,551,409 B2 1/2017 Zimmer
9,714,700 B2 7/2017 Briggs
9,771,128 B2 9/2017 Sugimoto
9,839,995 B2 12/2017 Kovach
9,958,050 B2 5/2018 Kolloch
10,385,958 B2 8/2019 Medaglia
10,406,657 B2 9/2019 Marovets
10,618,588 B2 4/2020 Cody
10,655,723 B2 5/2020 Zimmer
10,794,663 B2 10/2020 Zimmer
11,148,709 B2 10/2021 Lee
11,149,767 B2 10/2021 Pettey
11,292,555 B2 4/2022 Akanishi
11,549,781 B2 1/2023 Zimmer
2001/0053727 A1 12/2001 Nakashima
2002/0083905 A1 7/2002 Kim
2002/0144986 A1 10/2002 Grow
2003/0139240 A1 7/2003 Chen
2004/0069440 A1 4/2004 Hugenschutt
2004/0089734 A1 5/2004 Martin
2004/0194585 A1 10/2004 Clark
2004/0200108 A1 10/2004 Doiron
2005/0003633 A1 1/2005 Mahle
2005/0032596 A1 2/2005 Nonoshita
2005/0148417 A1 7/2005 Garabello
2005/0217111 A1 10/2005 Yoshida
2005/0221938 A1 10/2005 Yoshida
2005/0272546 A1 12/2005 Reiter
2005/0282672 A1 12/2005 Nonoshita
2006/0027542 A1 2/2006 Mahadev
2007/0095333 A1 5/2007 Jones
2008/0066584 A1 3/2008 Vines
2008/0076611 A1 3/2008 Fisher
2008/0121073 A1 5/2008 Williams
2008/0161141 A1 7/2008 Joo
2009/0001058 A1 1/2009 Lentz
2009/0176034 A1 7/2009 Ruuttu
2009/0313799 A1 12/2009 Oguri
2010/0099239 A1 4/2010 Dunne
2010/0120562 A1 5/2010 Kadokawa
2010/0251528 A1 10/2010 Hu
2011/0030440 A1 2/2011 Keane
2011/0126394 A1 6/2011 Heimmer
2011/0155708 A1 6/2011 Luetke
2011/0318497 A1 12/2011 Beals
2012/0037473 A1 2/2012 Ouwenga
2012/0088615 A1 4/2012 Briggs

(56) References Cited

U.S. PATENT DOCUMENTS

| | | | | |
|---|---|---|---|---|
| 2012/0227551 | A1 | 9/2012 | Miller | |
| 2013/0292188 | A1 | 11/2013 | Bilen | |
| 2014/0060995 | A1 | 3/2014 | Anderson | |
| 2014/0112697 | A1 | 4/2014 | Harmon | |
| 2014/0190317 | A1 | 7/2014 | Rosby | |
| 2014/0224077 | A1 | 8/2014 | Doumenis, Jr. | |
| 2015/0024885 | A1 | 1/2015 | Odenmarck | |
| 2015/0060229 | A1 * | 3/2015 | Takahashi | F16D 27/14 192/84.9 |
| 2015/0080158 | A1 | 3/2015 | Van Der Heijde | |
| 2015/0133248 | A1 | 5/2015 | Wang | |
| 2015/0252885 | A1 | 9/2015 | Manzoor | |
| 2015/0260271 | A1 | 9/2015 | Zimmer | |
| 2016/0003340 | A1 | 1/2016 | Crump | |
| 2016/0047456 | A1 | 2/2016 | Kolloch | |
| 2016/0053876 | A1 | 2/2016 | Nakamura | |
| 2016/0129526 | A1 | 5/2016 | Russ | |
| 2016/0334001 | A1 | 11/2016 | Zimmer | |
| 2017/0030436 | A1 | 2/2017 | Duan | |
| 2017/0089441 | A1 | 3/2017 | Zimmer | |
| 2018/0079074 | A1 | 3/2018 | Devengenzo | |
| 2018/0328692 | A1 | 11/2018 | Zimmer | |
| 2019/0047612 | A1 | 2/2019 | Lee | |
| 2019/0085925 | A1 | 3/2019 | Lu | |
| 2020/0240507 | A1 | 7/2020 | Zimmer | |
| 2023/0286115 | A1 | 9/2023 | Hsieh | |

OTHER PUBLICATIONS

Steeda Autosports, http://www.steeda.com/steeda-gt500-supercharger-pulley-puller-555-8902/, [Published as early as Mar. 14, 2014].

VMP Tuning, http://vmptuning.com/tools/3inclam/, [Published as early as Mar. 14, 2014].

VMP Tuning, http://vmptuning.com/pulley-tools/vmpalltool/, [Published as early as Mar. 14, 2014].

International Search Report and Written Opinion on related PCT application (PCT/US2015/020611) from International Searching Authority (US) dated Jul. 15, 2015.

Lone Wolf as early as Apr. 24, 2015 (there may be more/earlier) and it's archived here: http://web.archive.org/web/20150424223706/https:/www.lonewolfdist.com/Detail.aspx?PROD=156322 (Year: 2015).

International Preliminary Report on Patentability on related PCT Application (PCT/US2015/020611) from the International Bureau of WIPO dated Sep. 14, 2016.

Behera et al., "Experimental investigations of nanosecond-pulsed Nd:YAG laser beam micromachining on 304 stainless steel", Journal of Micromanufacturing, 1 (1) 62-75, 2018, Reprints and permissions: in.sagepub.com/journals-permissions-india, DOI: 10.1177/2516598418766937, journals.sagepub.com/home/jmf, 14 pages.

Jagdheesh et al., "One-Step Generation of Ultrahydrophobic Aluminum Surface Patterns by Nanosecond Lasers", WLT, Lasers in Manufacturing Conference 2015, 9 pages.

Frank Flemming, "The Basics of Electromagnetic Clutches and Brakes", Ogura Industrial Corp, Jul. 2009, 4 pages.

* cited by examiner

| TYPE OF MATERIAL | EFFECT | TYPE OF PASS | NUMBER OF PASSES TOTAL | POWER % 0-70W | SPEED (INCH/SEC) | FREQUENCY (KILOHERTZ) 0-1000 | LASER ON TIME IN NANO SECONDS | SPI WAVE FORMS 0-36 | PATTERN OR FILL, BOTH SIZE IN INCH. | CROSS HATCHING ANGLES IN DEG. | KERF WIDTH IN INCH INCLUDING RECAST SINGLE LASER LINE MARK=MEAN | KERF WIDTH IN INCH NOT INCLUDING RECAST SINGLE LASER LINE MARK=MEAN | WOBBLE FRQ HZ |
|---|---|---|---|---|---|---|---|---|---|---|---|---|---|
| ALUM 6061 | MICRO MACHINED SURFACE. MATERIAL REMOVAL | ROUGHING PASS | 2 | 95 | 50 | 50 | 420 | 34 | 0.001 | 90/180 | 0.0035 | 0.0024 | 0 |
| | | SMOOTHING PASS | 2 | 100 | 85 | 50 | 520 | 36 | 0.0005 | 90/45 | 0.003 | 0.00287 | 0 |
| | | BRAZING PASS FOR COLOR AND HARDNESS | 1 | 85 | 65 | 50 | 350 | 32 | 0.0003 | 120 | 0.0032 | 0.0029 | 0 |
| ALUM 6061 | RAISED SURFACE RECAST MATERIAL RE POPULATE | ROUGHING PASS | 2 | 100 | 25 | 250 | 55 | 16 | 0.003 | 45/135 | 0.0047 | 0.0024 | 0 |
| | | SMOOTHING PASS | 2 | 35 | 120 | 90 | 100 | 10 | 0.0006 | 90/45 | 0.0028 | 0.0025 | 0 |
| | | BRAZING PASS FOR DARK GREY COLOR AND HARDNESS | 1 | 65 | 50 | 55 | 350 | 32 | 0.0002 | 35 | 0.0034 | 0.0024 | 0 |
| STAINLESS STEEL 17-4 PH | MICRO MACHINED SURFACE. | ROUGHING PASS | 2 | 90 | 80 | 120 | 420 | 34 | 0.004 | 45/180 | 0.004 | 0.0021 | 0 |
| | | SMOOTHING PASS | 2 | 90 | 60 | 120 | 200 | 2 | 0.004 | 90/120 | 0.0038 | 0.0022 | 0 |
| | | BRAZING PASS FOR COLOR AND HARDNESS. SOME SMOOTHING | 1 | 55 | 35 | 120 | 30 | 22 | 0.0004 | 45 | 0.0026 | 0.0019 | 0 |

FIG. 14

ELECTROMAGNETIC CLUTCH

CROSS-REFERENCE TO RELATED APPLICATIONS

This application is a continuation application of U.S. patent application Ser. No. 18/167,262, filed on 2023 Feb. 10, which claims the benefits of U.S. Ser. No. 63/363,313, filed on 2022 Apr. 20, the entire contents of which is expressly incorporated herein by reference.

STATEMENT RE: FEDERALLY SPONSORED RESEARCH/DEVELOPMENT

Not Applicable

BACKGROUND

The various embodiments and aspects described herein relate to components for a supercharger of an automobile.

The supercharger has a pulley which is connected to a rotating shaft of the engine and drives the supercharger. The pulley has a small diameter which leads to slippage between the pulley and the belt driving the pulley.

Accordingly, there is a need in the art for an improved method and device for mitigating slippage between the pulley and the belt and addressing other deficiencies.

BRIEF SUMMARY

The various embodiments and aspects disclosed herein address the needs discussed above, discussed below and those that are known in the art.

This application is related to U.S. Ser. No. 16/945,483 filed on 2020 Jul. 31, U.S. patent application Ser. No. 16/850,917 filed on 2020 Apr. 16, U.S. patent application Ser. No. 15/372,586 filed on 2016 Dec. 8, U.S. patent application Ser. No. 15/221,949 filed on 2016 Jul. 28, U.S. patent application Ser. No. 14/656,556 filed on 2015 Mar. 12, and U.S. patent application Ser. No. 14/213,740 filed on 2014 Mar. 14, the entire contents of which are expressly incorporated herein by reference.

A pulley assembly having a body, a shaft mount and a plurality of bolts that attach the body to the shaft mount is disclosed. The shaft mount is mountable to a shaft of a supercharger. The body is attachable to the shaft mount with the bolts. In particular, the shaft mount has a plurality of threaded holes that engage threads of the bolts. The body has a series of counter sunk holes that are aligned to the threaded holes of the shaft mount. The counter sunk holes have a him neck area that is minimally larger than a shoulder area of the bolt. As such, when the bolt is inserted into the counter sunk holes and threaded into the threaded holes of the shaft mount, the tight tolerancing (i.e., within 0.001 inches) between diameters of the necks of the counter sunk holes and the shoulder of the bolts align the body of the pulley assembly to the shaft mount and ultimately to the shaft of the supercharger. In another aspect, the outer surface of the body of the pulley assembly has a pattern of friction lines for increasing the frictional forces between the outer surface of the body of the pulley assembly and the belt driving the pulley. The friction lines may be formed by applying particulate matter to the outer surface of the body of the pulley assembly and fusing the applied particulate matter to the outer surface by heating the outer surface and the particulate matter. The heat may be generated by a laser beam that traces a desired pattern of friction lines. The increased friction mitigates noise by reducing slippage between a belt and the pulley. Alternatively, the laser may be used to remove material and to create a rough surface on the outer surface of the body of the pulley assembly. The heat generated from the laser beam may trace a desired pattern of friction lines.

More particularly, a pulley for transmitting rotational motion between first and second rotating shafts with a belt on an automobile engine is disclosed. The pulley may be fixed to the first rotating shaft. The pulley comprising a body and a laser infused friction material. The body may have a cylindrical central hole for receiving the first rotating shaft and mounting the body onto the first rotating shaft on the automobile engine. The cylindrical central hole may define a central axis about which the body rotates. The body may have at least one groove formed circumferentially about the central axis for receiving the belt. The laser infused friction material may be bonded to an outer surface of the at least one groove.

The laser infused friction material may be configured into a pattern on the outer surface of the at least one groove. The pulley may have at least three grooves. The pulley may have a diameter of about 1-10 inches, and more preferably between about 2-4 inches, and even more preferably about 2.5 inches.

In another aspect, a method of fabricating a pulley for transmitting rotational motion between first and second rotating shafts with a belt on an automobile engine is disclosed. The pulley may be fixed to the first rotating shaft. The method may comprise the steps of forming a body having a cylindrical central hole for receiving the first rotating shaft and mounting the body onto the first rotating shaft on the automobile engine, the cylindrical central hole defining a central axis about which the body rotates, the body having at least one groove formed circumferentially about the central axis for receiving the belt; covering an outer surface of the at least one groove with a powder material; and selectively applying heat from a laser beam to the powder material and the outer surface of the at least one groove to fuse the powder material to the outer surface of the at least one groove. The fused powder material provides a surface texture to increase its coefficient of friction and reduce slip with another material such as a belt.

The powder material used in the method may be a formulation sold under the trademark THERMARK or CERMARK. The powder material used in the method may also be any powdered metallic material or powdered oxide material. By way of example and not limitation, the metallic material may be tungsten, various types of carbides, cobalt, titanium, aluminum, steel or combinations thereof. The average size of the of the powdered material may be up to about 100 microns, and is preferably up to about 35 microns. More preferably, the powdered material is between about 2-25 microns. The texture of the fused material may be increased or decreased by respectively using larger or smaller sized powdered oxide material. Additionally, ceramic and/or diamond particles may be heterogeneously mixed in with the powdered metallic material or powdered oxide material.

The powder material and the outer surface of the at least one groove may reach a temperature of at least 200 degrees Fahrenheit depending on the specific powder material and the outer surface to fuse the powder material to the outer surface of the groove. By way of example and not limitation, the powder material may be configured so that the fusing temperature of the powder material and the outer surface may be as high as about 1,221 degrees Fahrenheit to about 4,566 degrees Fahrenheit for aluminum which are the respective melting and boiling points for aluminum. More broadly speaking, the heat applied to the powder material and the outer surface is regulated so that the temperature of the outer surface may reach between the melting point and the boiling point of the base material.

In the method, the covering step may include the step of covering the entire outer surface of the at least one groove.

In the method, the applying step may comprise the steps of mounting the body to a chuck; mounting the body and the chuck to a laser machine; rotating the body with the chuck while performing the applying heat from the laser beam step, rotational motion of the body defining a rotational axis; and traversing a head of the laser machine along the rotational axis while performing the applying heat from the laser beam step.

In another aspect, a method of removing a pulley from a rotating shaft of an automobile engine is disclosed. The method may comprise the steps of unscrewing a plurality of first bolts from the pulley to disassemble a first outer body of the pulley from an inner mounting fixture of the pulley; removing the first outer body from the inner mounting fixture; positioning a second outer body over the inner mounting fixture wherein an internal configuration of the second outer body is sized to interface with the inner mounting fixture and an external configuration of the second outer body is sized to mate with a puller; screwing the plurality of first bolts or a plurality of second bolts to the pulley to fix the second outer body to the inner mounting fixture wherein the second outer body has a larger flange compared to a flange of the first outer body; engaging the puller to the larger flange of the second outer body; and pulling on the larger flange of the second outer body with the puller to remove the inner mounting fixture from the rotating shaft.

In the method, the larger flange of the second outer body may be located on an inner side of the pulley.

In a different aspect, a method for increasing a coefficient of friction of a surface of a pulley is disclosed. The method may comprise the steps of disposing a laser machine adjacent to the pulley so that a laser beam of the laser machine is applied to an area of the surface of the pulley; adjusting the laser machine to a roughing setting to emit a laser beam that vaporizes the surface of the area to increase a roughness of the pulley surface; applying the laser beam of the laser machine onto the pulley surface with the laser machine set to the roughing setting; adjusting the laser machine to a smoothing setting to emit the laser beam to reduce sharps peaks on the pulley surface caused by the applying the laser beam of the laser machine set to the roughing setting; and applying the laser beam of the laser machine onto the pulley surface with the laser machine set to the smoothing setting.

The step of adjusting the laser machine to the smoothing setting from the roughing setting may comprise the steps of decreasing a kerf width, decreasing a fill distance and decreasing a power of the laser beam.

The step of adjusting the laser machine to the roughing setting may comprise the steps of setting a kerf width and setting a fill distance to be greater than the kerf width. The kerf width may be about between 0.0019 and about 0.004 inches. The step of adjusting the laser machine to the smoothing setting may comprise the steps of setting the fill distance to about double the kerf width but can be more or less depending on the material being worked on. By way of example and not limitation, the fill distance may be less than double the kerf width for aluminum and more than double the kerf width for 17-4 stainless steel.

The method may further comprise the step of adjusting the laser machine to an annealing setting to harden the pulley surface.

The method may further comprise the step of rotating the pulley or the laser machine after performing both applying steps to apply the laser beam of the laser machine about a circumference of the pulley.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 14 is a table of settings of a laser;

DETAILED DESCRIPTION

Figure 1:
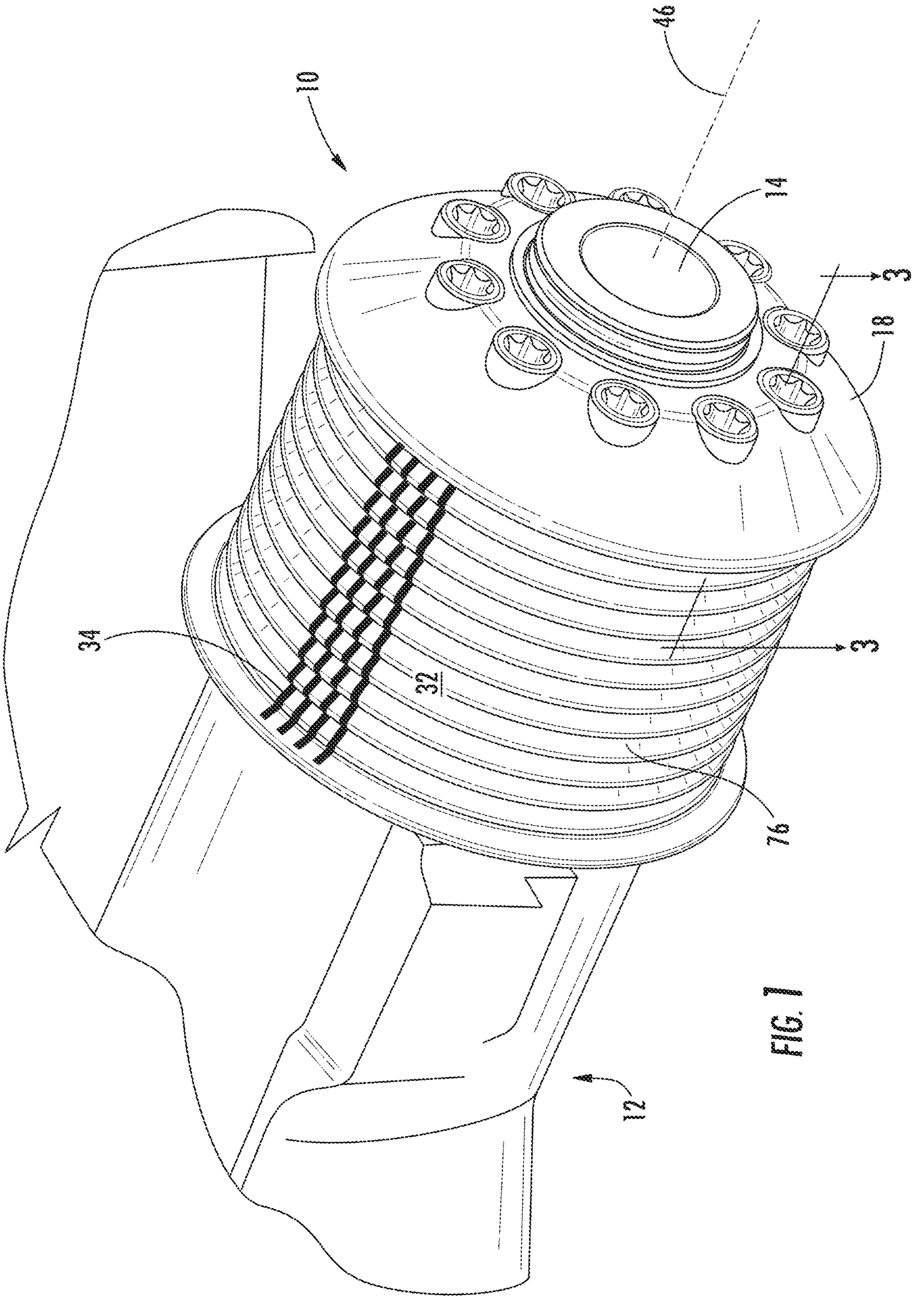
FIG. 1 is a perspective view of a pulley assembly mounted on a shaft of the supercharger.

Referring now to the drawings, a pulley assembly 10 for a supercharger 12 is shown. The pulley assembly 10 is mounted to a shaft 14 of the supercharger 12. The pulley assembly 10 may have three different components, namely, a shaft mount 16, a body 18 and a plurality of bolts 20. The body 18 is mounted to the shaft mount 16 with the plurality of bolts 20. In particular, each of the bolts 20 may have a shoulder 22 having an outer diameter 24 which is smaller than and within 0.001 inches of an inner diameter 26 of a neck 54 of a countersunk hole 28 formed in the body 18. The shaft mount 16 has a plurality of threaded holes 30 which receive the bolts 20. In this manner, the neck 54 of the body 18 aligns the body 18 to the shaft mount 16. Additionally, an outer surface 32 of the body 18 may have a plurality of friction lines 34 which mitigate slip between the outer surface 32 of the body 18 and a belt being driven by the pulley assembly 10 or driving the pulley assembly 10. The increased friction mitigates noise by reducing slippage between the belt and the pulley assembly 10.

Figure 2:
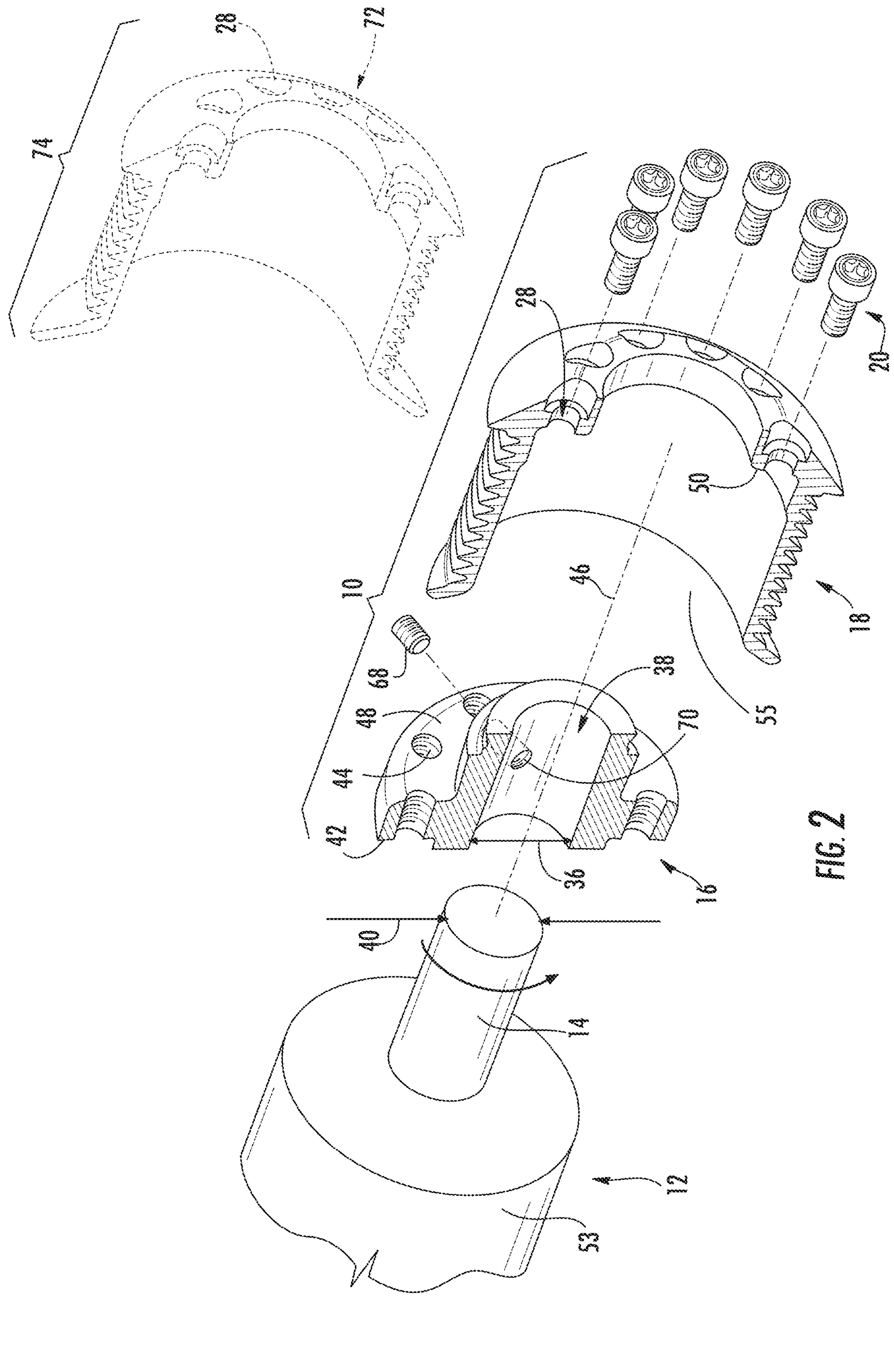
FIG. 2 is a cross-sectional exploded view of the pulley assembly shown in FIG. 1.

More particularly, referring now to FIG. 2, the pulley assembly 10 is made up of at least the shaft mount 16, the body 18 and the plurality of fasteners or bolts 20. To mount the pulley assembly 10 to the shaft 14 of the supercharger 12, the shaft mount 16 is heated to a temperature above the temperature of the shaft 14. The inner diameter 36 of the hole 38 of the shaft mount 16 is enlarged due to the heat so that the shaft mount 16 may be slid over the shaft 14. When the shaft mount 16 cools down, the shaft mount 16 is fixedly secured to the shaft 14 of the supercharger 12. The inner diameter 36 of the hole 38 of the shaft mount 16 is slightly smaller than an outer diameter 40 of the shaft 14 when the shaft 14 and the shaft mount 16 are at the same temperature. The shaft mount 16 compresses on the shaft 14 when the temperature of the shaft mount 16 reaches the temperature of the shaft 14.

The shaft mount 16 may have a flange 42 that extends outwardly around a periphery of the shaft mount 16. The flange 42 may have a plurality of threaded holes 44 symmetrically disposed about a central axis 46. The flange 42 may have a proximal surface 48 which mates with a distal surface 50 of the body 18. The body 18 is mounted to the shaft mount 16 with the plurality of fasteners 20. The body 18 has a set of corresponding countersunk holes 28 that receive the bolts 20. These countersunk holes 28 are aligned in the same pattern as the threaded holes 44 formed in the flange 42 of the shaft mount 16. The body 18 has an inner cavity 55 which is large enough to receive the shaft mount 16 and a portion 53 of the supercharger 12 that holds the shaft 14. The body 18 is disposed over the shaft mount 16 and the countersunk holes 28 are aligned to the threaded holes 44. Each of the fasteners 20 are then inserted through the countersunk holes 28 and engage to the threaded holes 44 of the shaft mount 16. The fasteners 20 fixedly secure the body 18 the shaft mount 16. Also, the interference fit between the hole 38 of the shaft mount 16 and the shaft 14 of the supercharger 12 fixedly secure the shaft mount 16 to the shaft 14.

Figure 3:
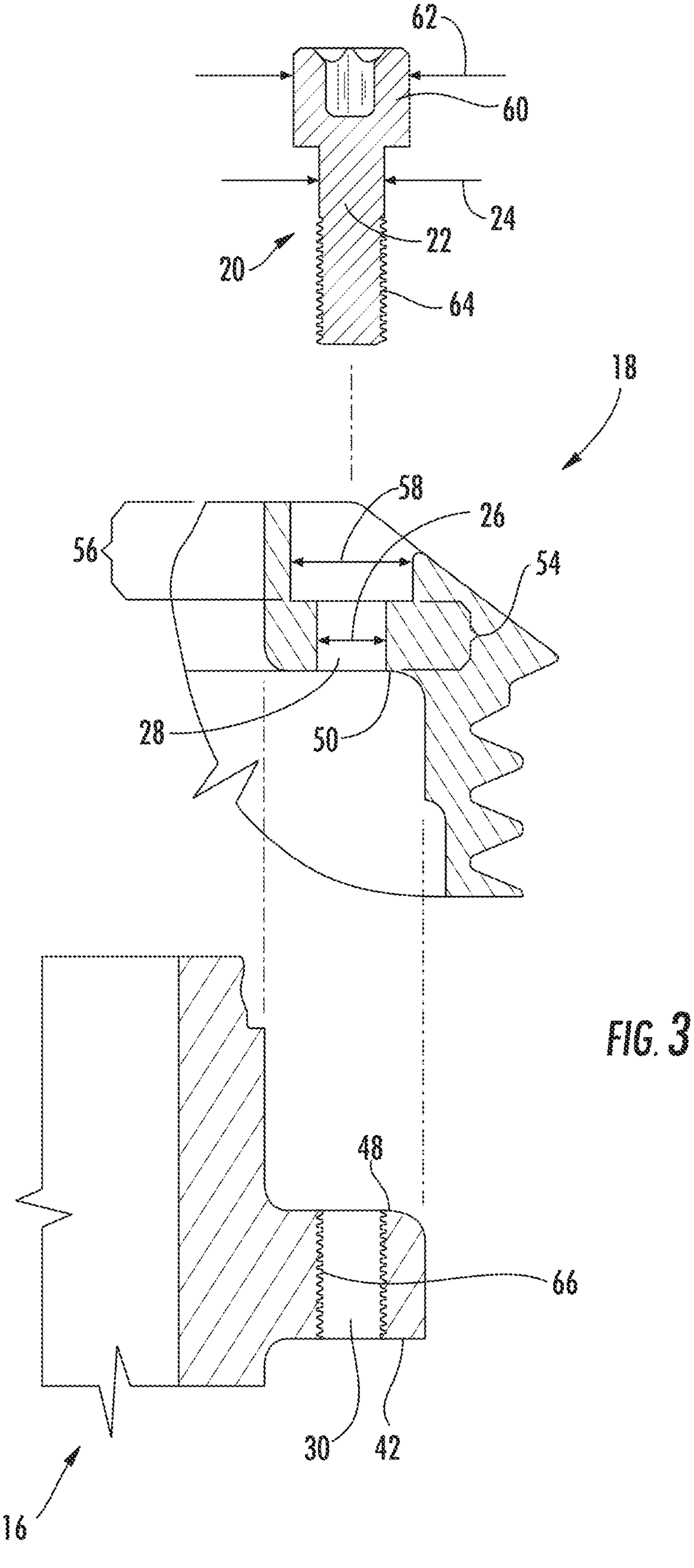
FIG. 3 is a cross-sectional view of the pulley assembly illustrating a bolt that aligns a body of the pulley assembly to a shaft mount of the pulley assembly.

To align the body 18 to the shaft mount 16, the bolts 20 have a shoulder 22 that mates to a neck 54 of the countersunk hole 28 formed in the body 18. In particular, referring now to FIG. 3, a cross-sectional view of the pulley assembly 10 is shown. The countersunk hole 28 has two different diameters. A first diameter at a neck 54 identified as inner diameter 26. A second diameter at a countersunk portion 56 identified as inner diameter 58. The inner diameter 58 receives a head 60 of the bolt 20. More particularly, the inner diameter 58 is significantly larger than an outer diameter 62 of the head 60 of the bolt 20. In contrast, the inner diameter 26 of the neck 54 of the threaded hole 28 is only minimally larger than an outer diameter 24 of the neck portion 22 of the bolt 20. More particularly, the inner diameter 26 is within 0.001 inches of the outer diameter 24 of the neck 22 of the bolt 20. As the threads 64 of the bolt 20 engage the threads 66 of the threaded hole 30 of the flange 42 of the shaft mount 16, the shoulder 22 of the bolt 20 enters the neck 54 of the hole 28 of the body 18. Since the inner diameter 26 of the hole 28 is within 0.001 inches to the outer diameter 24 of the shoulder 22, the body 18 begins to align to the shaft mount 60 as two or more bolts 20 engage the threaded holes 44 of the shaft mount 16.

Optionally, to further secure the shaft mount 16 to the shaft 14, the shaft mount 16 may have one or more socket set screws 68 that engage the shaft 14. In particular, the shaft mount 16 may have an extended length. A threaded hole 70 may be formed in the extended length. Preferably, a plurality of threaded holes 70 are symmetrically formed about the central axis 46 to maintain rotational balance of the pulley assembly 10 during rotation. By way of example and not limitation, threaded holes 70 may be placed on opposed sides of the central axis 46. Alternatively, three holes 70 may be disposed 120° apart from each other about the central axis 46 or four holes may be disposed 90° apart from each other about the central axis 46. After the shaft mount 16 is mounted to the shaft 14, the socket set screws 68 are threaded into the threaded holes 70 and engaged to the shaft 14. Preferably, the socket set screws 68 have a knurled end to further engage the shaft 14.

To mount the pulley assembly 10 to the shaft 14 of the supercharger 12, the shaft mount 16 (see FIG. 2) is heated to a temperature above the temperature of the shaft 14 of the supercharger 12. In doing this, the heat enlarges the inner diameter 36 of the shaft mount 16 so that the inner diameter 36 of the shaft mount 16 when heated is greater than the outer diameter 40 of the shaft 14. While the shaft mount 16 is heated to an elevated temperature, the shaft mount 16 is placed over the shaft 14 so that the shaft 14 is now disposed within the hole 38 of the shaft mount 16. As the shaft mount 16 cools down, the inner diameter 36 of the shaft mount 16 decreases. When the temperature of the shaft mount 16 is equal to the temperature of the shaft 14, the inner diameter 36 of the shaft mount 16 is equal to the outer diameter 40 of the shaft 14. Since the inner diameter 36 of the shaft mount 16 is less than the outer diameter 40 of the shaft 14 (when the shaft mount 16 and the shaft 14 are at the same temperature and the shaft mount 16 is not mounted to the shaft 14), the inner surface defining the inner diameter 36 of the shaft mount 16 compresses upon the outer surface of the shaft 14 when the shaft mount 16 is mounted to the shaft 14 of the supercharger 12.

To further ensure that the shaft mount 16 is retained on the shaft 14, socket set screws 68 may be threaded into the threaded holes 70 formed in the extended length of shaft mount 16. A distal tip of each of the socket set screws 68 may have knurls to further engage the shaft 14 and mitigate inadvertent movement between the shaft mount 16 and the shaft 14.

The body 18 is then disposed over the shaft mount 16 so that the shaft mount 16 is disposed within the cavity 55 of the body 18. The bolts 20 are inserted through the countersunk holes 28 of the body 18 and threadedly engaged to the threaded holes 44 formed in the flange 42 of the shaft mount 16. As the bolts 20 are tightened, the neck 54 of the bolts 20 seat into the neck 54 of the body 18. Due to the tight tolerances between the shoulders 22 of the bolts 20 and the necks 54 of the countersunk holes 28 of the body 18, the body 18 begins to align to the shaft mount 16. The user tightens the bolts 20 to securely attach the body 18 to the shaft mount 16, and in turn, to the shaft 14 of the supercharger 12.

To remove the pulley assembly 10 from the shaft 14 of the supercharger 12, the user loosens the bolts 20 to remove the body 18 from the shaft mount 16. The purpose of removing the body 18 from the shaft mount 16 is to provide the user with access to the socket set screws 68, if used. The user loosens and removes the socket set screws 68 from the shaft mount 16. The user may then reinstall the original body 18 or install a sacrificial body 72 (see FIG. 2). The sacrificial body 72 may incorporate the counter sunk holes 28 and an enlarged distal flange 74. The enlarged distal flange 74 is used to pull the body 18 and shaft mount 16 off of the shaft 14. The user may then pull the pulley assembly 10 from the shaft 14 with the puller.

Figure 24:
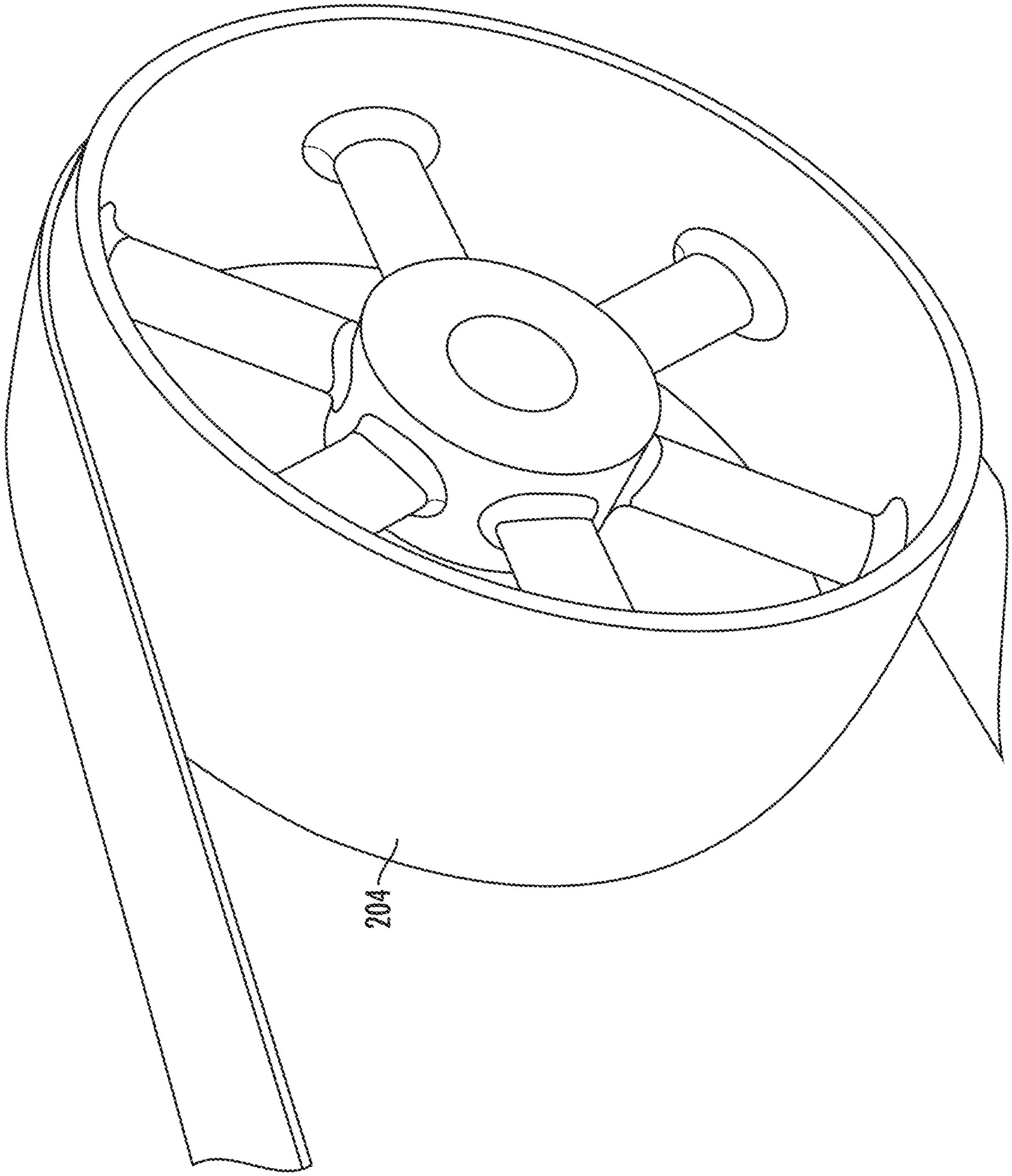
FIG. 24 is a perspective view of a drum pulley with a friction patch formed on an interface surface of the drum pulley that engages.

Referring back to FIG. 1, the body 18 of the pulley assembly 10 may have an outer surface 32. The outer surface 32 may have a plurality of grooves 76 circumscribing the body 18 about the rotational axis 46. In the embodiment shown in the figures, the pulley assembly 10 has a plurality of grooves. However, it is also contemplated that the various aspects described herein may be applied to a pulley have a single groove or a pulley or tensioner having a cylindrical surface. The outer surface 32, and in this instance, the grooves 76 engage a belt that wraps around the body 18 and fits within the grooves 76. The outer surface 32 of the body 18 may be smooth so that during use, the belt wrapped around the body 18 may inadvertently slip so that the linear speed of the outer surface 32 of the body 18 is not equal to the linear speed of the belt driving or driven by the pulley assembly 10. To mitigate slippage between the belt and the outer surface 32 of the body 18, friction patches or lines 34 may be formed on the outer surface 32 of the body 18. Although the friction patches or lines 34 are described as being applied to the pulley assembly 10, the friction patches or lines 34 may also be applied in the same manner, with the same materials and machines and the same methods to a bead seat 212 of a wheel rim 200, 200*a* (see FIG. 18), a flat drum pulley 204 (see FIG. 24), a flat surface and a V groove pulley 206 (see FIG. 25). In relation to the wheel rim 200, 200*a*, the goal is to prevent slippage between the tire 202 (instead of the belt) and the rim 200, 200*a* (instead of the pulley). The formation of a surface to increase a coefficient of friction on the wheel rim 200, 200*a*, the flat drum pulley 204 and the groove pulley 206 will be discussed below.

Figure 4:
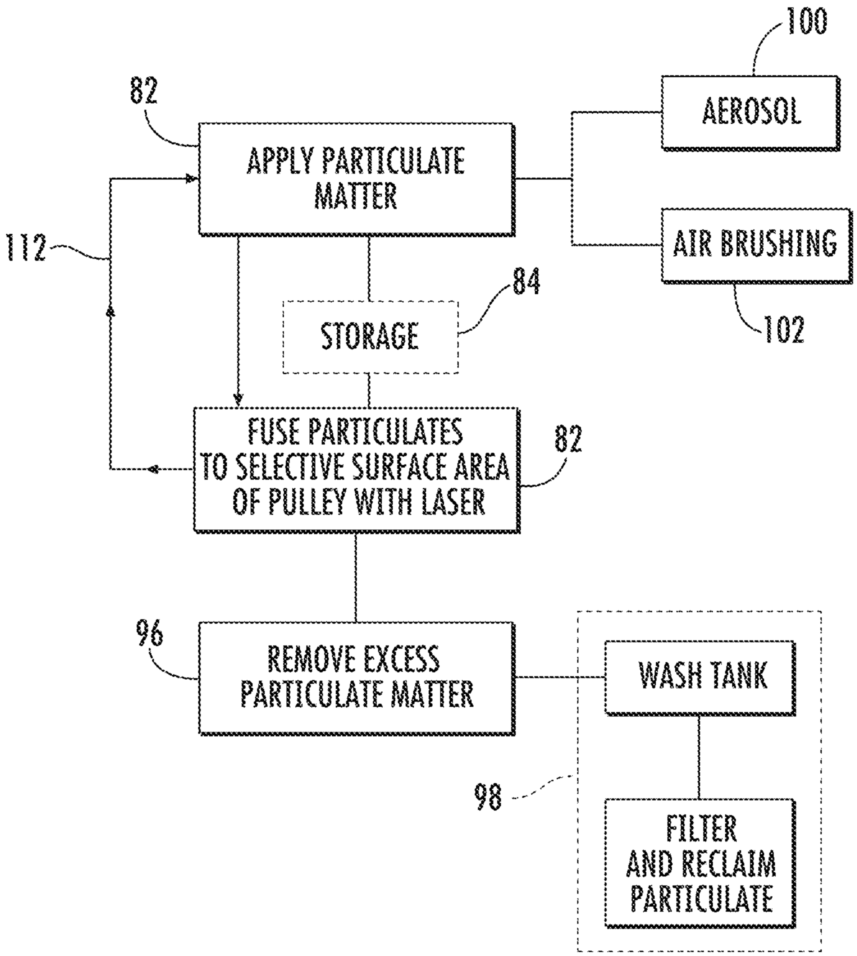
FIG. 4 is a flowchart for forming friction lines on an outer surface of the body of the pulley assembly.
Figure 5:
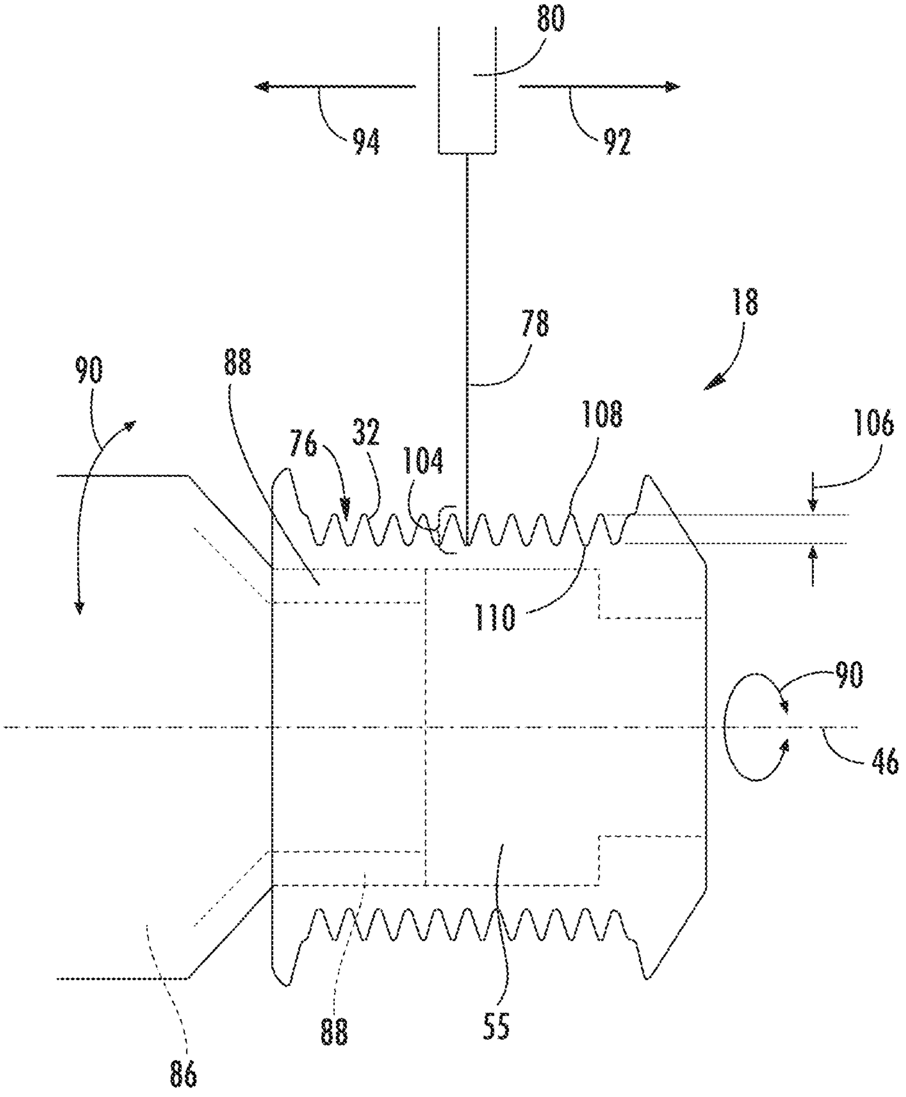
FIG. 5 illustrates a laser beam used to fuse particulate matter on the outer surface of the body of the pulley assembly for forming the friction lines.

In particular, referring now to FIGS. 4 and 5, particulate matter or substance may be fused to the outer surface 32 of the body 18 and have a coefficient of friction with the belt greater than the coefficient of friction between the smooth outer surface 32 of the body 18 and the belt. The particulate matter may be coated over the outer surface 32. A laser beam 78 of the laser 80 may be directed to selective locations on the outer surface 32 of the body 18 to fuse the particulate matter to the outer surface 32 of the body 18. Preferably, the particulate matter when fused to the outer surface 32 has a coefficient of friction with the belt greater than the coefficient of friction between the smooth outer surface 32 of the body 18 and the belt. Moreover, the particulate matter provides a slightly raised surface so that the edges of the friction lines 38 create additional friction between the friction lines 34 and the belt. The fusing of the particulate matter to the outer surface 32 of the body 18 is a physical bonding process wherein the particulate matter is heated and permanently bonded to the outer surface 32 of the body 18.

To coat the particulate matter onto the outer surface 32 of the body 18, the particulate matter is applied 82 (see FIG. 4) to the outer surface 32 of the body 18. The particulate matter may be applied 82 to the outer surface 32 of the body 18 either by way of an aerosol 100 or airbrushing 102. If the particulate matter is delivered or coated onto the outer surface 32 of the body 18 with an aerosol 100, the aerosol can 100 is purchased in a prepackaged form. The user sprays the entire outer surface 32 of the body 18, and more particularly, sprays the grooves 76. In the event that the particulate matter is formed on the wheel rim 200, 200*a* or the flat drum pulley 204, the particulate matter is disposed (e.g. sprayed or coated) on the bead seat 212 of the rim 200, 200*a* or the interface surface where the belt rides on the flat drum pulley 204. If the particulate matter is delivered or coated onto the outer surface 32 of the body 18 by way of airbrushing 102, the particulate matter is mixed with denatured alcohol then sprayed on the outer surface 32 with a sprayer. Two types of particulate matter may be utilized when air brushing. A first type is one sold under the trademark Thermark. A second type is one sold under the trademark Cernark. For low production runs, the Thermark particulate matter is preferred since un-fused particulate matter on the outer surface 32 is easily removed by wiping with a damp wet rag. However, for large production runs, Cernark is preferred since the particulate matter may be applied to the outer surface 32 of the body 18 and stored for an extended period of time.

If Thermark is used, then the user applies the particulate matter shortly before fusing 82 the particulate matter to the outer surface 32 of the body 18. If Cermark is used, then the user may optionally store 84 the coated bodies 18 in storage for an extended period of time. When desired, the user takes the coated bodies 18 out of storage and fuses 82 the particulate matter to the outer surface 32 of the body 18. Regardless of whether Thermark or Cermark is utilized, the particulate matter may be fused 82 to the outer surface 32 (or bead seat 212 of rim or interface surface of the drum pulley) of the body 18 with a laser beam 78. The laser beam 78 heats up the particulate matter and the outer surface 32 of the body 18. The heat permanently attaches the particulate matter to the outer surface 32 of the body 18 so that the particulate matter does not rub off as the belt runs over the outer surface 32 of the body 18.

Generally, the particular matter may be provided as a powder. The powder may be delivered by aerosol or a spray gun. The material of the powder may be a metallic material. More particularly, the powder may be any form of a metallic oxide material. By way of example and not limitation, the metallic material may be tungsten, carbides (e.g., tungsten carbide, titanium carbide, silicon carbide, calcium carbide, boron carbide), cobalt, titanium, aluminum, steel or combinations thereof. The average size of the of the powdered material may be up to about 100 microns, and is preferably up to about 35 microns with a minimum size being 2 microns. The texture of the fused material may be increased or decreased by respectively using larger or smaller sized powdered oxide material. During tests, a powder metallic oxide material having a size of about 35 microns has created a 0.007 inch texture to the outer surface 32.

To form the friction lines or patches 34, the body 18 (or rim 200, 200*a* or drum pulley) may be attached to a chuck 86 after applying the particulate matter to the outer surface 32. The chuck 86 may have a plurality of arms 88 with serrated teeth. The plurality of arms 88 may be inserted within the internal cavity 55 of the body 18 and expanded outward. Upon outward expansion, the arms 88 automatically center the body 18 onto the chuck 86. The chuck 86 and the body 18 are placed on a rotary table or an indexer that controls the rotational movement 90 of the chuck 86 and the body 18 about rotational axis 46. The laser 80 is capable of traversing longitudinally along the central or rotational axis 46 in the direction of arrows 92, 94. Preferably, the laser beam 78 of the laser 80 intersects and is perpendicular to the central or rotational axis 46. Additionally, the laser 80 may be a direct beam laser 80.

The laser beam 78 may be traversed longitudinally along the axis 46 and simultaneously, the body 18 may be rotated about axis 46 so that the laser beam 78 traces the pattern of lines, circles, curves, patches and other shapes (straight, curved or combinations thereof) to form a mark, word, pattern on the outer surface 32 of the grooves of the body 18. In FIG. 1, the friction lines 34 are shown as being linear along the longitudinal length of the central axis 46. However, other types of patterns and shapes are also contemplated. It is also contemplated that the laser beam 78 may trace a random series of lines, circles, curves, patches, indentations and other shapes (straight, curved or combinations thereof). Nevertheless, these random series may still be considered a pattern since the circle would be a pattern.

After fusing 82, the particulate matter to the outer surface 32 of the body 18, the excess particulate matter which is not fused to the outer surface 32 of the body 18 may be removed 96 and reclaimed 98 for subsequent use. More particularly, the body 18 may be placed in a wash tank such as an ultrasonic tank. Fluid within the ultrasonic tank is heated up to 200° F. and the tank is vibrated. The fluid is run through a filter and the particulate matter that was not fused to the body 18 is reclaimed 98 and reused at a later time.

The direct beam laser 80 produces a laser beam 78 having a focal depth 104. Preferably, the focal depth 104 is greater than a distance 106 between a peek 108 and valley 110 of the grooves 76 formed in the body 18. The laser 80 and laser beam 78 are positioned so that the focal depth 104 covers the entire distance 106. By way of example and not limitation, the focal depth 104 of the laser beam 78 may be about 0.200 inches. In this manner, the laser beam 78 heats up the particulate matter and the surface 32 along the entire height of the grooves 76 to provide optimal friction lines 34.

It is also contemplated that the process of forming the friction lines 34 as discussed above and in relation to FIGS. 4 and 5 may be repeated over existing friction lines 34 as shown by process line 112 (see FIG. 4). In particular, after fusing 82, the particulate matter to the surface 32 of the body 18, additional particulate matter may be applied 82 to the outer surface 32 of the body 18. The additional particulate matter may be fused 82 to the layer of fused particulate matter and to the bare metal of the body 18. The process may be repeated to increase the thickness of the layers of particulate matter on the outer surface 32 of the body 18.

Other types of lasers 80 may also be utilized to fuse 82 the particulate matter to the outer surface 32 of the body 18. By way of example and not limitation, a Galvo laser which utilizes one or more lenses to position the laser beam 78 on the outer surface 32 of the body 18 may be utilized. In this manner, the throughput is higher than a direct laser beam 78 or a CO2 laser beam in that the lenses can create multiple friction lines 34 in one pass.

The process of forming the friction lines 34 is discussed in relation to FIGS. 4 and 5 with the process of producing an emboss on the outer surface 32 of the body 18 (or rim or drum pulley). However, it is also contemplated that a deboss may be formed on the outer surface 32 of the body 18 (or rim or drum pulley) by removing material. In particular, the Galvo laser may be utilized to remove material from the outer surface 32 of the body 18. The Galvo laser utilizes one or more lenses to redirect the laser beam 78 instead of moving the laser head 80 to position the laser beam 78 on the outer surface 32 of the body 18.

In addition to forming the deboss on the outer surface 32 with the laser 80, it is also contemplated that the deboss may be formed with a micro end mill. The same is true if the deboss was formed on the rim or drum pulley. Regardless of whether the deboss is formed with a laser 80 or a micro end mill, the body 18 (or rim or drum pulley) is mounted to the chuck 86. The chuck 86 and the body 18 are mounted to an indexer or a rotary table which controls the rotational angle of the body 18 as the micro end mill or the laser 80 removes material from the outer surface 32 of the body 18. In another aspect, it is also contemplated that the body 18 may remain stationary while the micro end mill or the laser 80 both rotate about the body 18 and also traverse longitudinally along the axis 46.

The friction lines or patches 34 were described as being formed on a rotary table or indexer that is coordinated with the laser. However, it is also contemplated that the friction lines or patches 34 may be formed manually. By way of example and not limitation, the part could be mounted to a chuck or a holding mechanism that the user may move by hand.

Figure 6:
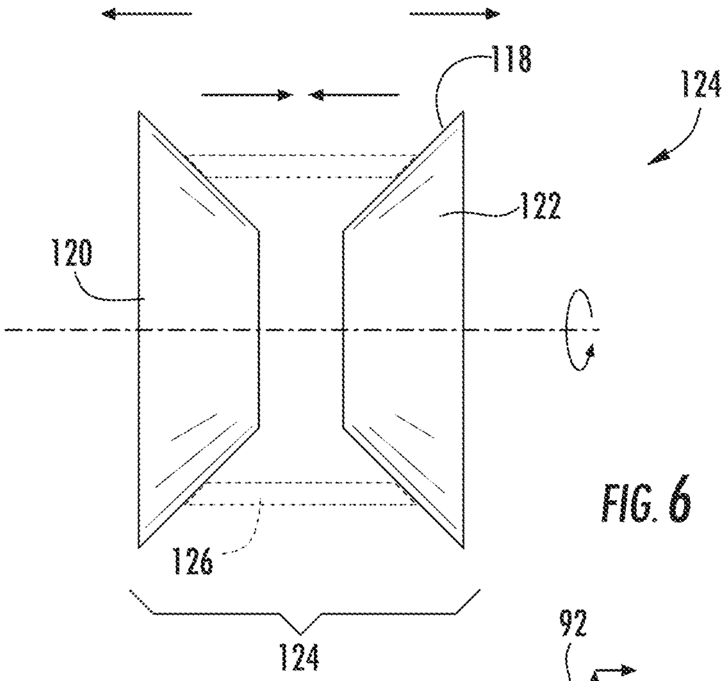
FIG. 6 is a front view of a variable diameter pulley of a continuously variable transmission.

In another aspect, referring now to FIG. 6, the friction lines or patches may be formed on other types of pulleys (e.g. adjustable pulleys, drum pulleys), and also on tensioning rollers having a cylindrical flat surface (e.g. drum pulleys). By way of example and not limitation, the friction lines or patches 34 may be formed on inner surfaces 118 of first and second parts 120, 122 of a variable diameter pulley 124 of a continuously variable transmission. When the belt 126 is closer to the rotational axis 128, the revolutions per minute of the pulley 124 is higher than when the belt 126 is further away from the rotational axis 128.

Figure 7:
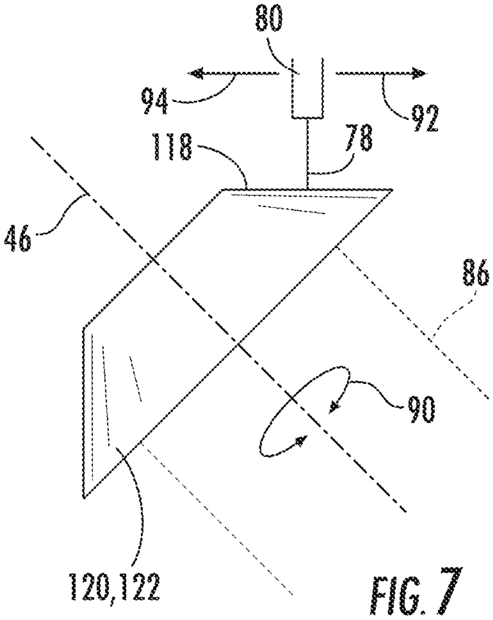
FIG. 7 is a front view of one of first and second parts of the variable diameter pulley individually mounted to a chuck.

Referring now to FIG. 7, to form the friction lines or patches 34 on the inner surface 118, the first and second parts may each be individually mounted to the chuck 86. The part 120 or 122 is positioned with the inner surface 118 perpendicular to the laser beam 78. The form the patch or lines 34, the laser 80 is traversed laterally in the direction of arrows 92 and 94 and the chuck 86 is rotated in direction of arrow 90 about rotating axis 46.

Figure 8:
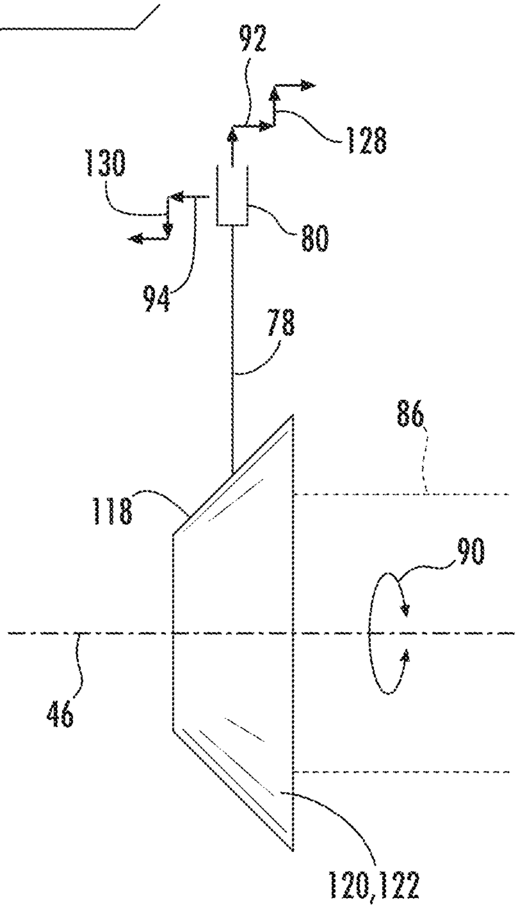
FIG. 8 is a front view of one of first and second parts of the variable diameter pulley individually mounted to a chuck in a different orientation to a laser beam of a laser.

Referring now to FIG. 8, a different set up between the part 120, 122 and the laser beam 78 is shown. Instead of the part 120, 122 being oriented so that the laser beam 78 is perpendicular to the inner surface 118, the inner surface 118 may be oriented at a skewed angle with respect to the laser beam 78. In FIG. 8, the rotational axis of the part 120, 122 is set up so as to be perpendicular to the laser beam 78. Since the laser beam 78 has a particular focal depth 104 which is the location of the laser beam effective for heating up the particular matter and the inner surface 118 to fuse the two together, the laser 80 cannot simply be laterally traversed in a linear as shown in FIG. 7 if the angle of the inner surface 118 is too large so that the entire surface 118 is within the focal depth 104 of the laser beam. If the laser is moved to the left 94 or right 92, the laser beam 78 is effective at fusing the particulate matter to the inner surface 118 as long as the inner surface 118 is within the focal depth of the laser beam. Right before the inner surface 118 comes out of the focal depth of the laser beam 78, the laser may be traversed up 128 or down 130 to reposition the focal depth of the laser beam on the inner surface 118. To form the friction lines or patches 34, the laser 80 is traversed sideways 92, 94 and vertically 128, 130 in a staggered fashion. This technique can also be used for pulleys that have a deep groove wherein the distance 106 between the peak 108 and the valley 110 of the deep groove is greater than the focal depth 104 of the laser beam 78.

Referring now the FIGS. 9-13, a method and apparatus for forming the deboss on the outer surface 32 of the body 18 in order to increase a coefficient of friction of the outer surface 13 of the body 18 is shown. The same method and apparatus may be used to form the deboss on a bead seat 212 of a rim 200, **200*a* or an interface surface of a drum pulley. Referring back to formation of the deboss on the body 18, in particular, the laser beam 78 of the laser 80 may create a plurality of kerfs 150 (see FIG. 12). These kerfs 150 form the deboss on the outer surface 32 of the body 18. This is accomplished with a roughing pass of the laser beam 78 on the outer surface 32 of the body 18. Additional passes of the laser beam 78 on the outer surface 32 of the body 18 may be made for different purposes. These additional passes may be a smoothing pass wherein excessively sharp protrusions formed during the roughing pass are rounded out or knocked down and an annealing pass which raises the temperature of the surface 32 of the body 18 in order to harden the outer surface 32 of the body 18 and/or recast material 166 formed during the roughing pass. More particularly, the laser 80 may perform 1) the roughing pass, 2) smoothing pass, 3) the roughing and smoothing passes, 4) the roughing, smoothing and annealing passes or 5) the annealing pass on the outer surface 32 of the body 18**.

Figure 9:
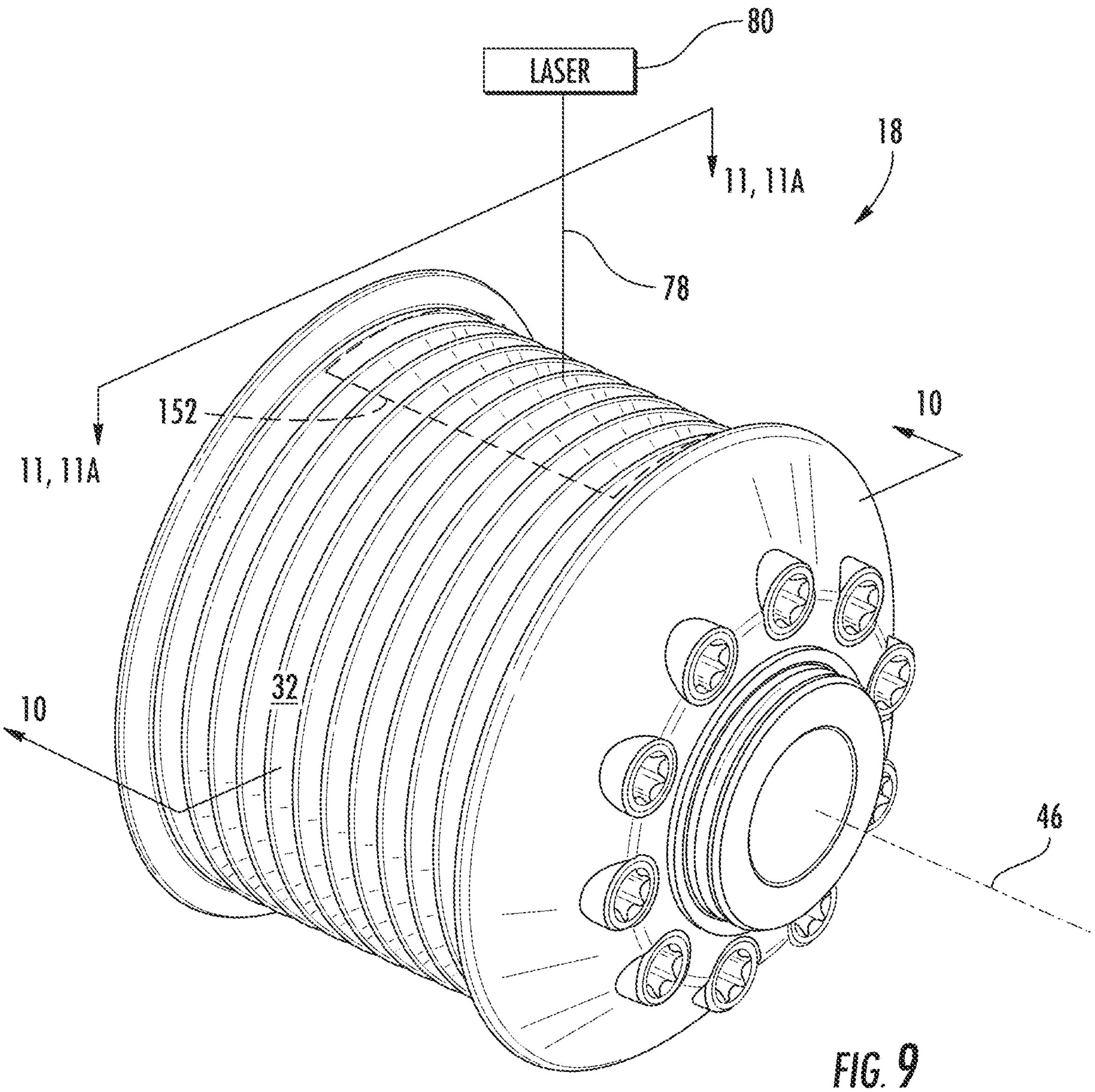
FIG. 9 is a perspective view of the pulley assembly having an outer surface debossed with a laser to increase a coefficient of friction of the outer surface.

As shown in FIG. 9, the laser 80 is disposed above the body 18 having the surface 32 on which the deboss which increases the coefficient of friction is to be formed. A direction of the laser beam 78 can be controlled by lenses and mirrors in order to cover an area 152 of the outer surface 32 of the body 18. Due to the curvature of the outer surface 32, the laser beam cannot cover the entire outer surface 32 of the body 18. The body 18 may be rotated about central axis 46 or the laser 80 may be rotated about the body 18 with respect to the central axis 46 in order to deboss the entire circumference of the body 18. The same applies if the deboss was formed on a bead seat of a rim 200, **200*a* or drum pulley 204. Preferably, the body 18 and the laser 80 are stationary while the laser beam 78 is performing one or more of the roughing pass, smoothing pass and annealing pass on the area 152 being worked on by the laser beam 78 of the laser 80. After the laser beam 78 works the area 152 with one or more of the roughing pass, smoothing pass and annealing pass, either the laser 80 and/or the body 18 rotates so that the laser beam 78 can work one or more of the passes on a different area 152 on the circumference of the outer surface 32 of the body 18**.

Figure 10:
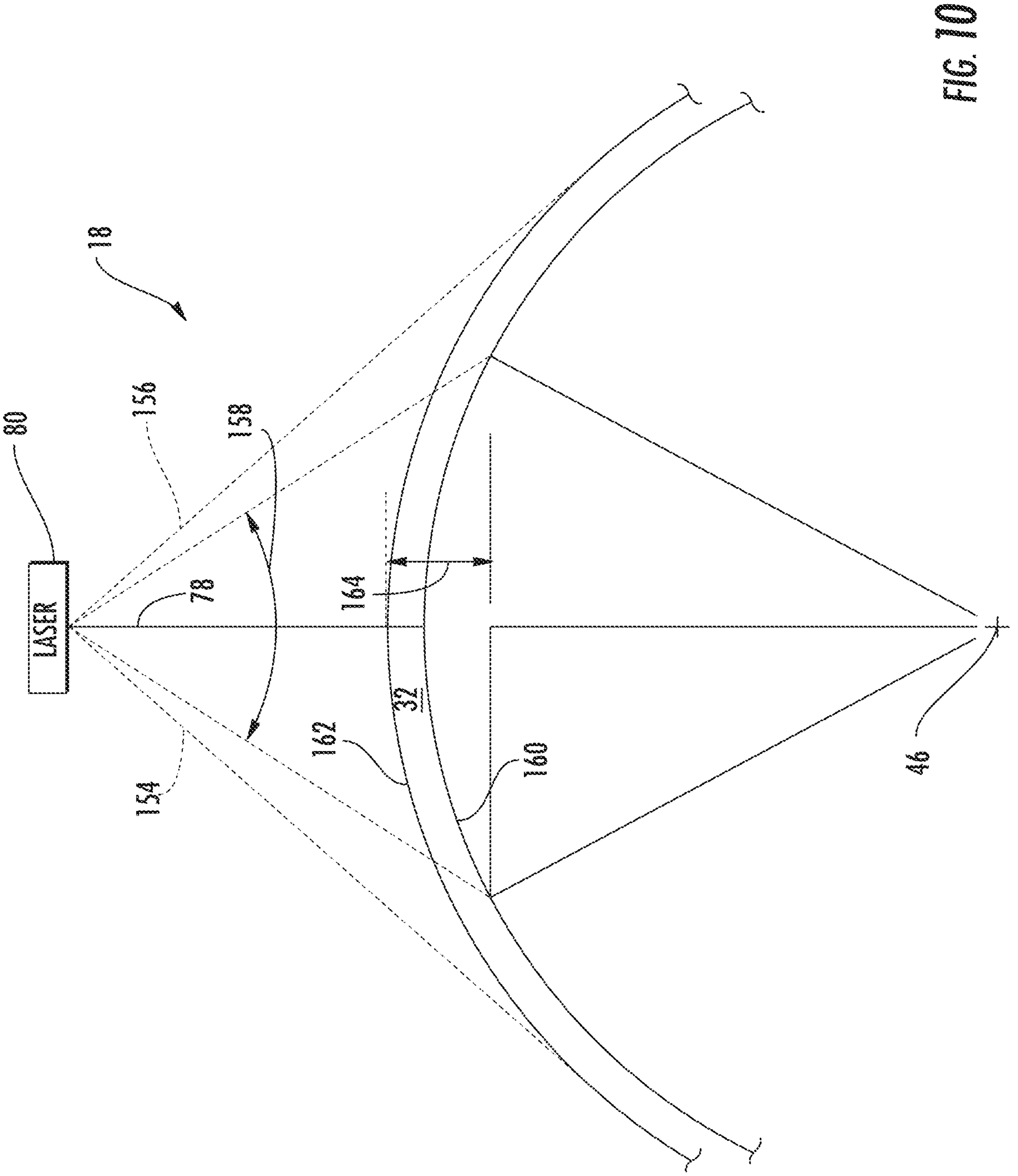
FIG. 10 is a cross-sectional view of the pulley assembly shown in FIG. 9.
Figure 11:
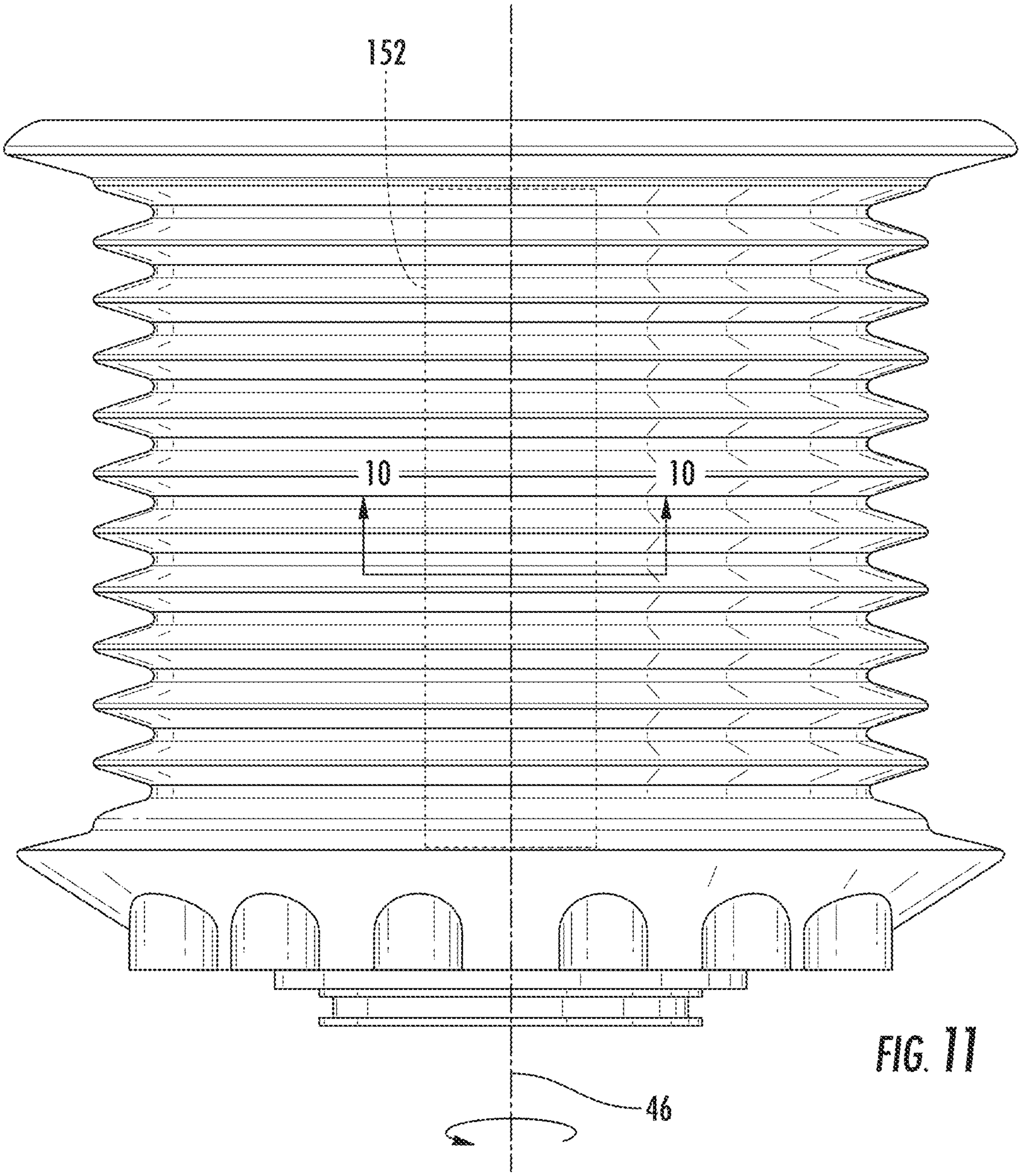
FIG. 11 is a top view of the pulley assembly shown in FIG. 9.

Referring now to FIG. 10, a cross-sectional view of the body 18 shown in FIG. 9 with respect to the laser 80 is shown. Preferably, the laser beam 78 is centrally aligned to the central rotational axis 46 of the body 18 (or rim 200, **200*a* or drum pulley 204) in that the laser beam 78 is not skewed. The laser beam 78 may be skewed to the left or right as shown in dashed lines 154, 156 as well as along a length of the central axis 46. Theoretically, the laser beam 78 may be skewed to the left 154 or right 156 so that the laser beam 78 is tangent to the left and right sides of the body 18. However, at such an excessive skewed angle, the power of the laser beam 78 is less or non-effective. As such, the laser beam 78 is skewed to the left and right 154, 156 to a smaller angle 158 so that the focal depth or depth of field 164 of the laser beam 78 coincides with or encompasses the outer surface 32 of the body 18 at a valley 160 and peak 162 of a groove formed on the body 18. The body 18 shown in FIGS. 9-11 is that of a pulley 10, 204 having a plurality of grooves that define the valley and peaks 160, 162. However, the method and apparatus for forming the deboss may be used on a variety of other surfaces including but not limited to a pulley having a single groove such as one that is incorporated into a continuously variable transmission (CVT) or a flat pulley 200 (see FIG. 24). More broadly speaking, the method and apparatus for forming the deboss may be used on any surface that contacts a belt or requires an increased coefficient of friction (e.g., rim 200, 200***a*). Likewise, the laser beam 78 is skewed to the left and right 164, 156 to a smaller angle 158 so that the focal depth or depth of field 164 of the laser beam 78 coincides with and encompasses the outer surface 32 of the body 18. For the flat pulley (idler or drive pulley; e.g., see FIG. 24), there are no valleys and peaks. As such, the curvature of the pulley is accounted for in determining the acceptable angle 158. For a CVT, the laser beam 78 may be applied to the surface 118 by forming the deboss on the first and second parts 120, 122 separately as discussed above during the emboss process. In particular, the laser debosses the first part and the second part separately which are then assembled together at a later time.

Figure 11A:
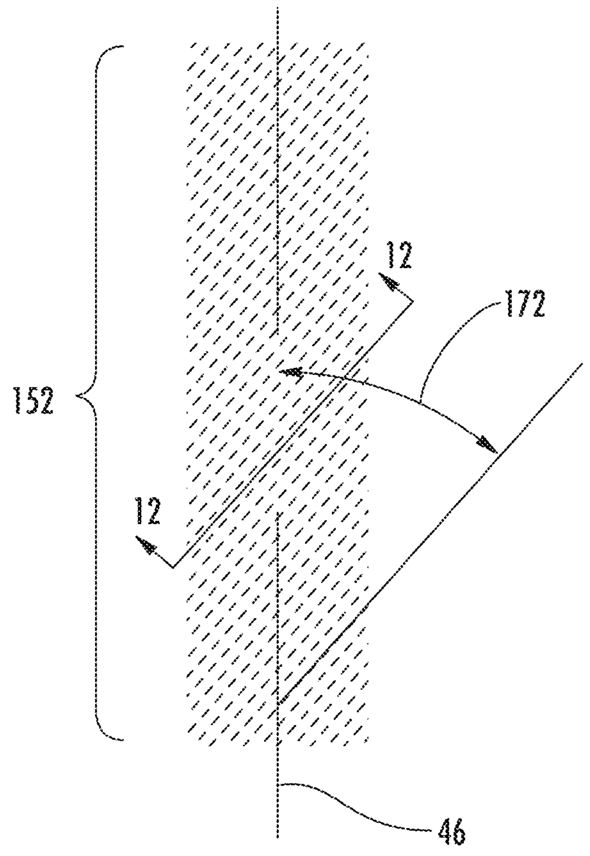
FIG. 11A is a top view of a crosshatching pattern formed on an area of the outer surface the pulley assembly.

Referring now the FIG. 11A, a top view of the area 152 which is worked by the laser beam 78 of the laser 80 is shown. FIG. 11A illustrates the pulley 10 but other pulleys and rotating objects may replace the pulley 10 such as a wheel rim 200, 200*a*, drum pulley 204 and groove pulley (see FIG. 25). In this regard, the laser beam creates a series of straight line dashes at an angle 172 with respect to the central axis 46 of the body 18. In FIG. 11A, the grooves of the pulley are not shown for clarity. Also, FIG. 11A is a top view of only the area 152 worked by the laser beam 78 of the laser 80. The laser beam 78 can be adjusted to pass over the area 152 at different angles. By way of example and not limitation, the preferred angles are 0° 30°, 45°, 60°, 90°, 120°, 125°, 150°. These angles are known as the crosshatching angles 172. The laser beam 78 of the laser machine 80 creates a series of parallel short line dashes. A distance between the short line dashes is referred to as a crosshatching size 174 (see FIG. 12). The laser beam 78 may be adjusted to run at a particular speed measured in inches per second.

Figure 12:
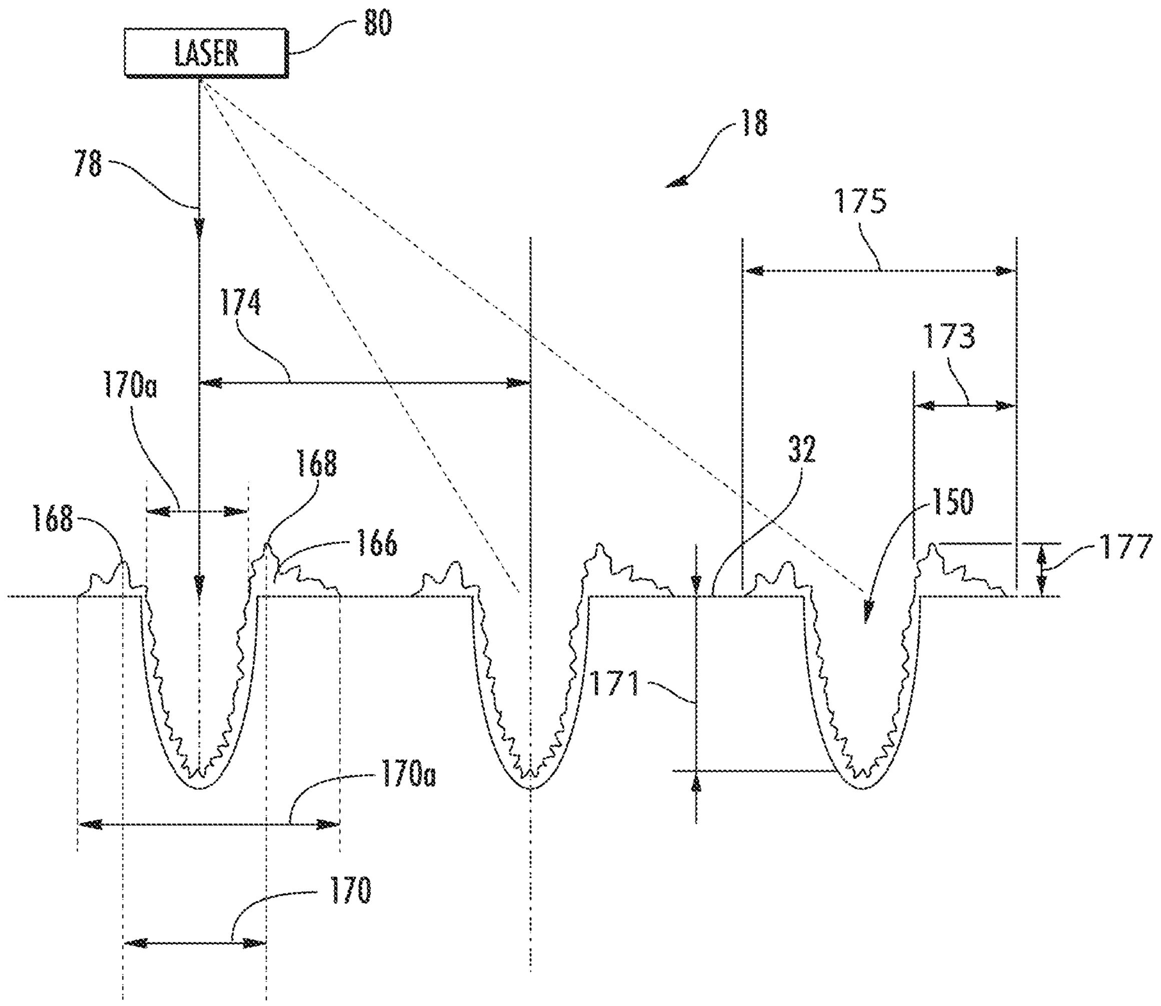
FIG. 12 is a cross-sectional view of the outer surface illustrating a plurality of kerfs formed by the laser beam of the laser.

Referring now to FIG. 12, the laser 80 is shown emitting a laser beam 78 onto the outer surface 32 the body 18 (or wheel rim 200, 200*a* or pulley 204, 206). The laser beam 78 vaporizes the outer surface 32 in order to create an indentation or a kerf 150. In other words, kerf may be an elongated groove but kerf may also encompass an indentation. This is the deboss formed by the laser beam 78. When the laser beam 78 vaporizes a portion of the outer surface 32 of the body 18, as shown in FIG. 12, recast material 166 lines an interior of the kerf 150 and/or extends outward above the outer surface 32 of the body 18 outside of the kerf 150. The recast material may be described as being at the kerf 150.

The outward extensions are shown by peaks 168 of the recast material 166. The kerf 150 is defined by a width 170 at the peaks 168. It is also contemplated that the kerf width 170 may be measured at the outer surface 32 including the recast material 166 as shown by dimension line 170*a*. The kerfs 150 are shown in FIG. 12 as being formed vertically straight up-and-down. However, the laser 80 from the position shown in FIG. 12 emits the laser beam 78 at a skewed angle. The first kerf 150 would not be formed straight up-and-down. The drawing is shown in this fashion in FIG. 12 because the drawing is not to scale since the distance between the laser 80 and the outer surface 32 and the distance 174 between kerfs 150 are not to scale. In actuality, the distance 174 is measured in thousandths of an inch whereas the distance between the laser 80 and the surface 32 is measured in inches if not feet.

Figure 11B:
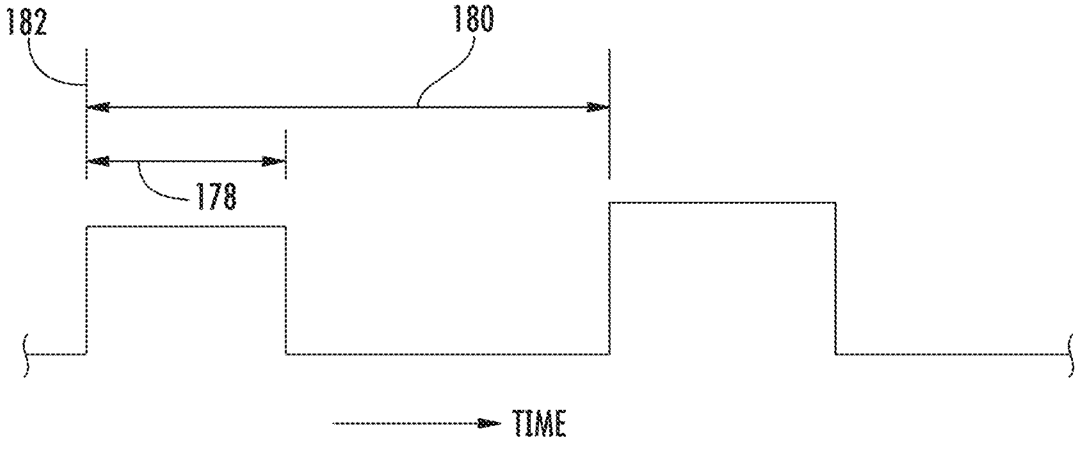
FIG. 11B is a schematic diagram illustrating a pulse width of a laser beam of the laser.

Referring now to FIG. 11B, a length of the kerf 150 and a gap between kerfs 150 may be defined by a pulse width 178 and a speed of the laser beam 78 which are adjusted on the laser 80. The pulse width 178 is defined by a length of time that the laser 80 is generating the laser beam 78 over a period 180 of fixed time. Laser beams 78 pulse at regular intervals. The pulses are defined by the period 180 of fixed time. The pulse width 178 of the laser beam 78 and the linear speed of the laser beam 78 on the surface 32 defines a length of the kerf 150. After the laser 80 is turned off so that no laser beam 78 is emitted from the laser 80, the laser 80 is turned back on after the period 180 of fixed time from the beginning 182 of the prior pulse width 178. This defines the gap between kerfs 150. The kerf may be an elongate groove. In this instance, the length of the kerf is longer than the width of the kerf. However, it is also contemplated that the kerf may have its length and width be equal to each other. Other shapes are also contemplated for the kerf. For example, the kerf may form a polygonal shape (e.g, multiple straight grooves joined end to end), curved shape (e.g., non straight grooves). The polygonal shape and the curved shape may be closed to form an shape such as a square, pentagon, circle, ellipse. The kerf may be formed as a combination of straight and curved lines as well.

The kerfs may be formed into a pattern. For example, the kerfs may be formed as a series of equally spaced apart straight or curved grooves, dots, indentations or combinations thereof. The pattern may also be formed based on an image or shape. For example, an image or shape may be dithered and the kerfs instead of being elongate grooves may be a plurality of dots or indentations which are spaced apart from each other so that when all of the dots or indentations are viewed by a person represents the image or shape.

The kerfs may alternatively be formed as one or more indentations, dots, straight lines, curved lines which are spaced apart from each other randomly. In other words, the spacing between the indentations, dots, straight lines, curved lines may be random so that they do not form a pattern when all of the indentations, dots, straight lines, curved lines are viewed. Nevertheless, this series of kerfs may be considered to be a pattern since the individual kerf has a pattern (e.g., straight line, dot, curved line, etc.). It is also contemplated that the each kerf may be different than every other kerf in shape, size, and relative position so as to be random.

Regardless of whether the kerf is formed into a pattern or randomly, it is preferred that the surface roughness between a surface of a first part (e.g., pulley, flat surface, table top surface) which contacts a surface of a second part (e.g., belt, container) is about the same (e.g., plus or minus 10% to 30%) regardless of where the surface of the second part is contacting the surface of the first part. By way of example and not limitation, when a belt contacts a pulley, the belt contacts a portion of the pulley. This may be referred to as the contact patch between the belt and the pulley. As the pulley rotates, the surface of the belt and the surface of the pulley comes into contact with each other then spreads apart. Nevertheless, the area of the contact path remains about the same as the pulley rotates. The surface roughness, or in other words, the coefficient of friction between the belt and the pulley remains constant through out the rotation of the pulley.

The laser 80 may be rated at a particular wattage. By way of example and not limitation, the laser 80 may be a 70 watt laser 80.

Referring now to the chart below, the laser 80 may be adjusted differently for each of the roughing pass, smoothing pass and annealing pass. When the laser 80 makes the roughing pass, the laser 80 is set to the roughing setting shown below. In this regard, the roughing setting may create a plurality of kerfs 150 having a kerf width 170 between about 0.004 inches and about 0.0021 inches. The laser beam 80 may pass over the area 152 two times. During the first pass, the laser beam 78 may have a crosshatching angle 172 of about 45°. During the second pass, the laser beam 78 may have a crosshatching angle 172 of about 180°. The laser beam 78 runs parallel with respect to the central axis 46 of the body 18. The laser 80 may be set at 90% power for a 70 watt laser 80. The pulse width 178 of the laser beam 78 may be set to 420 ns. The laser beam 78 travels on the surface 32 of the body 18 at around 80 inches per second during the roughing pass. The roughing pass creates a plurality of kerfs 150 and projects the recast material 166 upward to form peaks 168. The setting for the roughing pass may be set so as to create an aggressive texture in that the peaks 168 may tear a belt running on the pulley during use of the pulley. As such, the roughing pass may be followed up with a smoothing pass.

TABLE 1

Settings of laser machine for 17-4 stainless steel
Stainless steel

| | Roughing setting | Smoothing setting | Annealing Setting |
|---|---|---|---|
| Kerf width including recast material | 0.004 inches | 0.0038 inches | 0.0026 inches |
| Kerf width not including recast | About .0021 inches | About .0022 inches | About .0019 inches |
| Cross hatching angles (parallel lines to fill an area, 180 degrees, 90 degrees, 45 degrees and 120 degrees. (Option of outlining area)) | 45/180 degrees | 45 degrees | 45 degrees |
| Size of cross hatching | Min. distance between parallel lines is greater than the kerf width of the roughing setting plus 0.0005 inches to 0.004 inches (preferably, 0.004 inches or double the kerf width for a kerf width of 0.002 inches) | Smaller than kerf width of the roughing setting | Greater than kerf width of annealing setting |
| Power of machine and % wattage | 90% of 70 watt | 90% of 70 watt | 55% of 70 watt |
| Pulse width | 420 nanoseconds (34 waveform) | 200 nanoseconds (2 waveform) | 30 nanoseconds (22 waveform) |
| Speed | 80 inches per second | 60 inches per second | 35 inches per second |

The smoothing pass rounds out the peaks 168 of the recast material 166. In order to do so, the kerf width 170 is set to be smaller than the kerf width 170 during the roughing pass. In our example, the kerf width 170 for the smoothing pass is set to be about equal to the kerf width 170 during the roughing pass. The crosshatching angle 172 is set to the crosshatching angle 172 of the roughing pass. In our example, the roughing pass had two different crosshatching angles 172. The crosshatching angle 172 during the smoothing pass may be set to either one of the crosshatching angles 172 used during the roughing pass. The distance 174 of the crosshatching may be smaller than the kerf width 170 of the roughing pass. The reason is that the laser beam 78 during the smoothing pass needs to hit a significant amount of peaks 168 to round out or knock down the peaks 168. In order to account for any misalignment between the laser beam 78 and the kerfs 150 made during the roughing pass, reducing the crosshatching size 174 to be smaller than the kerf width 170 of the roughing pass enables the laser 80 to round out a significant portion (i.e., more than 25%, 50% or 75%) of the peaks 168 of the recast material 166. The smoothing pass is not meant to generate new indentations in the surface 32 of the body 18. Rather, the smoothing pass is designed to round off the peaks 168 of the recast material 166. In this regard, the pulse width is significantly reduced so that less energy is introduced into the surface 32 of the body 18. Also, the speed of the laser is reduced in order to ensure that a significant portion of the peaks 168 generated during the roughing pass are rounded out or knocked down.

Figure 13:
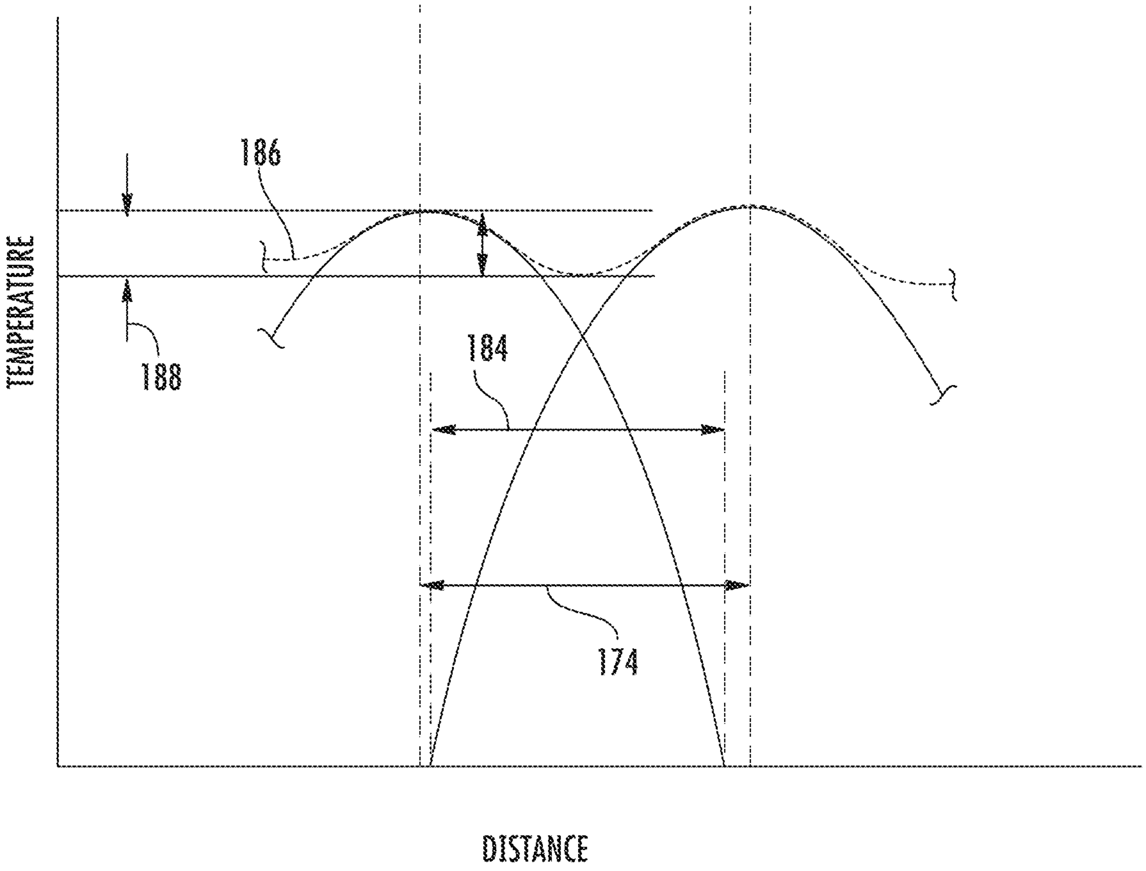
FIG. 13 is a graph of temperature as a function of distance as the laser beam passes over the outer surface of the pulley assembly to anneal the outer surface.

After the roughing and smoothing passes, it is also contemplated that the surface 32 may be annealed by adjusting the laser 80 with the annealing setting shown above. The annealing pass may also be used to add color to the exterior surface. In annealing the surface 32 of the body 18, the annealing takes place on the surface 32 of the body 18 to a depth of about a few thousandths of an inch below its exterior. Referring now to FIG. 13, as the laser beam 78 passes over the outer surface 32 of the body 18, the laser beam 78 introduces heat into the outer surface 32 of the body 18. The center of the laser 78 introduces the most amount of energy into the outer surface 32 of the body 18. As such, this position increases the temperature of the outer surface 32 the greatest amount. As one measures the temperature going away from that position on the surface 32, the temperature of the surface 32 decreases as shown in FIG. 13. When the laser beam 78 creates a hatching pattern, the laser beam 78 forms a series of parallel lines separated by distance 174. In particular, the laser beam 78 introduces heat into the outer surface adjacent to a first line and raises the temperature of the outer surface 32 in the same manner as before. However, there may be a slight overlap 184 so that the heat introduced into the outer surface 32 by the first line may be additive to the heat introduced into the outer surface 32 by the second line. The dashed line 186 shows the temperature fluctuation on the outer surface. The annealing settings on the laser 80 are set so that the temperature of the outer surface remains within a narrow band 188 sufficient to raise the temperature of the outer surface 32 to anneal or harden the outer surface 32 on the area 152 thereof or create a consistent discoloration thereof. The temperature range to anneal the outer surface for 17-4 stainless steel may be about 800 degrees Fahrenheit to about 1500 degrees Fahrenheit, and more preferably between about 900 degrees Fahrenheit to about 1150 degrees Fahrenheit.

The settings for the roughing pass and the smoothing passes illustrate a power saturation of the laser beam which is applied to the surface being treated. As discussed above, the roughing pass cuts a groove into the surface being treated. Moreover, recast material is ejected which is attached to the surface of the groove and the area immediately adjacent to the groove. In contrast, the smoothing pass may form (e.g., vaporize) a groove in the surface to be treated. However, the smoothing pass predominantly smooths out the sharp edges and points in the recast. The setting of the laser shown in Tables 2-19 below forms a groove in the surface to be treated in a single pass for aluminum and stainless steel. However, the settings may be varied to form a groove in other materials in a single pass. These other materials may include but are not limited to composites, plastics, polymers, diamonds and other nonorganic materials. Recast may be disposed in the groove and the surface outside of the groove immediately adjacent to the groove. This recast may have sharp or rough enough to increase a coefficient of friction of the surface being treated but also not to tear into a rubber belt (e.g., Gates belt for an automobile).

The settings specified in Tables 2-10 (shown below) are for a laser machine Model Number 200 Watt Air Cooled EP-Z manufactured by SPI for aluminum 7075-T6. Although aluminum 7075-T6 has been specified the settings disclosed herein may be utilized for a wide variety of aluminums. The specific settings shown in Table 2 provide a certain level of power saturation as a function of wave form, power density, beam spot size and speed to allow for comparable coefficients of friction with a single pass of the laser beam compared to the combination of roughing and smoothing passes described herein. Table 2 shows a laser machine with the power watt set to 200 watts, wave form set to 54, power density set to 1.24 mJ, beam spot size set to 10 um, and the speed of the laser set to 140 inches per second. With these settings, the surface of the material (e.g., aluminum 7075-T6) is modified to have kerfs. Each kerf has a kerf width 170*a* (see FIG. 12) of about 0.002362 inches, kerf depth 171 (see FIG. 12) of about 0.0045 inches, recast wall width 173 (see FIG. 12) of about 0.001102 inches, recast edge to edge wall 175 (see FIG. 12) of about 0.003937 inches, recast wall height 177 (see FIG. 12) of about 0.004 inches which produces a created surface roughness or RA of 22 to 35 um from a surface initially having a surface roughness of about 2.5 um. Table 3 and Table 4 shows the kerf data when varying the laser speed setting of the laser machine. In Table 3, the laser speed is set to 100 inches per second, and the created surface roughness RA is about 22 to 35 um. In Table 4, the laser speed is set to 70 inches per second, and the created surface roughness RA is about 22 to 35 um.

Tables 5-7 show the kerf data and created surface roughness when the laser machine is set to the same settings as in Tables 2-4 but the power watt is set to 150 watts. Tables 8-10 show the kerf data and created surface roughness when the laser machine is set to the same settings as in Tables 2-4 but the power watt is set to 100 watts. For settings shown in FIGS. 2-10, the laser of the laser machine may be passed over the surface once and produce the created surface roughness RA identified in Tables 2-10.

TABLE 2

| Power Watt 200 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.0023622 | 0.0045 | 0.00110236 | 0.00393701 | 0.004 | 22-35 um |
| PWR Density | 1.24 mJ | | | | | | |
| Beam Spot Size | 10 um | | | | | | |
| Speed IPS | 140 | | | | | | |

TABLE 3

| Power Watt 200 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00251969 | 0.005 | 0.00114173 | 0.00425197 | 0.005 | 22-35 um |
| PWR Density | 1.24 mJ | | | | | | |
| Beam Spot Size | 10 um | | | | | | |
| Speed IPS | 100 | | | | | | |

TABLE 4

| Power Watt 200 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.0023622 | 0.006 | 0.00188976 | 0.00543307 | 0.006 | 22-35 um |
| PWR Density | 1.24 mJ | | | | | | |
| Beam Spot Size | 10 um | | | | | | |
| Speed IPS | 70 | | | | | | |

TABLE 5

| Power Watt 150 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00244095 | 0.004 | 0.00059055 | 0.00338583 | 0.0035 | 22-35 um |
| PWR Density | 1.24 mJ | | | | | | |
| Beam Spot Size | 10 um | | | | | | |
| Speed IPS | 140 | | | | | | |

TABLE 6

| Power Watt 150 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00232284 | 0.0045 | 0.00070866 | 0.00374016 | 0.004 | 22-35 um |
| PWR Density | 1.24 mJ | | | | | | |
| Beam Spot Size | 10 um | | | | | | |
| Speed IPS | 100 | | | | | | |

TABLE 7

| Power Watt 150 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00212598 | 0.005 | 0.00114173 | 0.00452756 | 0.005 | 22-35 um |
| PWR Density | 1.24 mJ | | | | | | |

TABLE 7-continued

| Power Watt 150 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Beam Spot Size | 10 um | | | | | | |
| Speed IPS | 70 | | | | | | |

TABLE 8

| Power Watt 100 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00188976 | 0.0025 | 0.0003937 | 0.00295276 | 0.002 | 22-35 um |
| PWR Density | 1.24 mJ | | | | | | |
| Beam Spot Size | 10 um | | | | | | |
| Speed IPS | 140 | | | | | | |

TABLE 9

| Power Watt 100 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00185039 | 0.0035 | 0.0007874 | 0.00322835 | 0.003 | 22-35 um |
| PWR Density | 1.24 mJ | | | | | | |
| Beam Spot Size | 10 um | | | | | | |
| Speed IPS | 100 | | | | | | |

TABLE 10

| Power Watt 100 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00173228 | 0.004 | 0.00106299 | 0.0038189 | 0.004 | 22-35 um |
| PWR Density | 1.24 mJ | | | | | | |
| Beam Spot | 10 um | | | | | | |

TABLE 10-continued

| Power Watt 100 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Size | | | | | | | |
| Speed IPS | 70 | | | | | | |

The settings specified in Tables 11-19 (shown below) are for a laser machine Model Number 200 Watt Air Cooled EP-Z manufactured by SPI for stainless steel 17-4PH H900. Although stainless steel 17-4PH H900 is specified similar settings may be utilized on a wide range of stainless steels. The specific settings shown in Table 11 provide a certain level of power saturation as a function of wave form, power density, beam spot size and speed to allow for comparable coefficients of friction with a single pass of the laser beam compared to the combination of roughing and smoothing passes described herein. Table 11 shows a laser machine with the power watt set to 200 watts, wave form set to 54, power density set to 1.24 mJ, beam spot size set to 10 um, and the speed of the laser set to 140 inches per second. With these settings, the surface of the material (e.g., stainless steel 17-4PH H900) is modified to have kerfs. Each kerf has a kerf width 170*a* (see FIG. 12) of about 0.0016 inches, kerf depth 171 (see FIG. 12) of about 0.004 inches, recast wall width 173 (see FIG. 12) of about 0.0016 inches, recast edge to edge wall 175 (see FIG. 12) of about 0.0049 inches, recast wall height 177 (see FIG. 12) of about 0.005 inches which produces a created surface roughness or RA of 22 to 35 um from a surface initially having a surface roughness of about 2.5 um. Table 12 and Table 13 shows the kerf data when varying the laser speed setting of the laser machine. In Table 12, the laser speed is set to 100 inches per second, and the created surface roughness RA of 22 to 35 um. In Table 13, the laser speed is set to 70 inches per second, and the created surface roughness RA of about 22 to 35 um.

Tables 14-16 show the kerf data and created surface roughness when the laser machine is set to the same settings as in Tables 11-13 but the power watt is set to 150 watts. Tables 17-19 show the kerf data and created surface roughness when the laser machine is set to the same settings as in Tables 11-13 but the power watt is set to 100 watts. For settings shown in FIGS. 11-19, the laser of the laser machine may be passed over the surface once and produce the created surface roughness RA identified in Tables 11-19.

TABLE 11

| Power Watt 200 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00165354 | 0.004 | 0.0015748 | 0.00492126 | 0.005 | 22-35 um |
| PWR Density | 1.24 mJ | | | | | | |
| Beam Spot Size | 10 um | | | | | | |
| Speed IPS | 140 | | | | | | |

TABLE 12

| Power Watt 200 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.0019685 | 0.005 | 0.00125984 | 0.00472441 | 0.0035 | 22-35 um |
| PWR Density | 1.24 mJ | | | | | | |
| Beam Spot Size | 10 um | | | | | | |
| Speed IPS | 100 | | | | | | |

TABLE 13

| Power Watt 200 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00393701 | 0.0065 | 0.00066929 | 0.00496063 | 0.002 | 22-35 um |
| PWR Density | 1.24 mJ | | | | | | |
| Beam Spot Size | 10 um | | | | | | |
| Speed IPS | 70 | | | | | | |

TABLE 14

| Power Watt 150 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.0015748 | 0.0035 | 0.00137795 | 0.00468504 | 0.004 | 22-35 um |
| PWR Density | 1.24 mJ | | | | | | |
| Beam Spot Size | 10 um | | | | | | |
| Speed IPS | 140 | | | | | | |

TABLE 15

| Power Watt 150 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.0019685 | 0.004 | 0.0011811 | 0.00362205 | 0.003 | 22-35 um |
| PWR Density | 1.24 mJ | | | | | | |
| Beam Spot Size | 10 um | | | | | | |
| Speed IPS | 100 | | | | | | |

TABLE 16

| Power Watt 150 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00370079 | 0.005 | 0.00070866 | 0.00476378 | 0.0015 | 22-35 um |
| PWR | 1.24 mJ | | | | | | |

TABLE 16-continued

| Power Watt 150 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Density | | | | | | | |
| Beam Spot Size | 10 um | | | | | | |
| Speed IPS | 70 | | | | | | |

TABLE 17

| Power Watt 100 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00098425 | 0.015 | 0.00149606 | 0.00338583 | 0.001 | 22-35 um |
| PWR Density | 1.24 mJ | | | | | | |
| Beam Spot Size | 10 um | | | | | | |
| Speed IPS | 140 | | | | | | |

TABLE 18

| Power Watt 100 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.0011811 | 0.003 | 0.00137795 | 0.00318898 | 0.002 | 22-35 um |
| PWR Density | 1.24 mJ | | | | | | |
| Beam Spot Size | 10 um | | | | | | |
| Speed IPS | 100 | | | | | | |

TABLE 19

| Power Watt 100 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Wave | 54 | 0.00173228 | 0.004 | 0.0015748 | 0.00354331 | 0.0015 | 22-35 um |
| PWR Density | 1.24 mJ | | | | | | |
| Beam | 10 um | | | | | | |

TABLE 19-continued

| Power Watt 100 W | | | | | | | |
|---|---|---|---|---|---|---|---|
| | | Data | | | | | |
| | | Kerf Width | Kerf Depth | Recast Wall Width | Recast Edge to Edge Wall | Recast wall height | Created Surface RA |
| Spot Size | | | | | | | |
| Speed IPS | 70 | | | | | | |

The various settings described herein were for stainless steel and aluminum. However, the general principles of forming the roughing setting, smoothing setting and the annealing settings may be applied to other types of metallic materials such as alloys of iron and carbon, steel, magnesium alloy, sheet metal, aluminum, carbon steel, etc. with different settings per their own material characteristics. The settings are for a model 70W_EP_Z from SPI Lasers, LLC. FIG. 14 is a table of settings for 17-4 stainless steel and aluminum. The table illustrates a slightly different setting for 17-4 stainless steel compared to the chart above in that the smoothing pass may be accomplished with two passes instead of one pass as discussed above. The table in FIG. 14 illustrates two different settings for aluminum. The first setting sets the laser so that the aluminum material is in a sense micro machined with a slight recast material protruding upward, whereas the second setting sets the laser to have more recast material protrude upward compared to the first setting. The first and second settings may illustrate a range of settings for aluminum.

The various aspects described herein are in relation to the formation of an emboss and deboss of a textured surface on a surface of a pulley having a plurality of grooves wherein the pulley grooves engage a belt in order to transmit power from a first shaft upon which the pulley is mounted to a second shaft generally parallel to the first shaft. Moreover, the various aspects described herein for the emboss and deboss of a textured surface have also been described in relation to forming the embossed/debossed textured surface on pulleys of a continuously variable transmission or CVT. The embossed/debossed textured surface is formed on first and second parts of a pulley of the CVT, and more particularly on a gripping surface which is where the belt engages for transmitting power between the first and second shafts. More broadly, it is also contemplated that the method and apparatus for forming the emboss or debossed textured surface may be applied to other applications including but not limited to the following applicational uses. The embossed or debossed textured surface may be formed on a pulley having a helical groove or a straight or helical gear, flat cylindrical pulley, etc. By way of example and not limitation, a drum such as the drum shown in FIG. 24 may have a plurality of belts mounted thereto for transmitting power to or from the drum to a second shaft. The embossed or debossed textured surface may be formed on the drum where the drum engages the belt. The embossed or debossed textured surface may also be formed on a spindle of a lathe. Broadly speaking the embossed or debossed textured surface may be formed utilizing the method and apparatus as described herein on a surface that is used to engage a belt or other power transmission means to increase the coefficient of friction of the surface in order to prevent slippage between the power transmission means and the surface.

Figure 25:
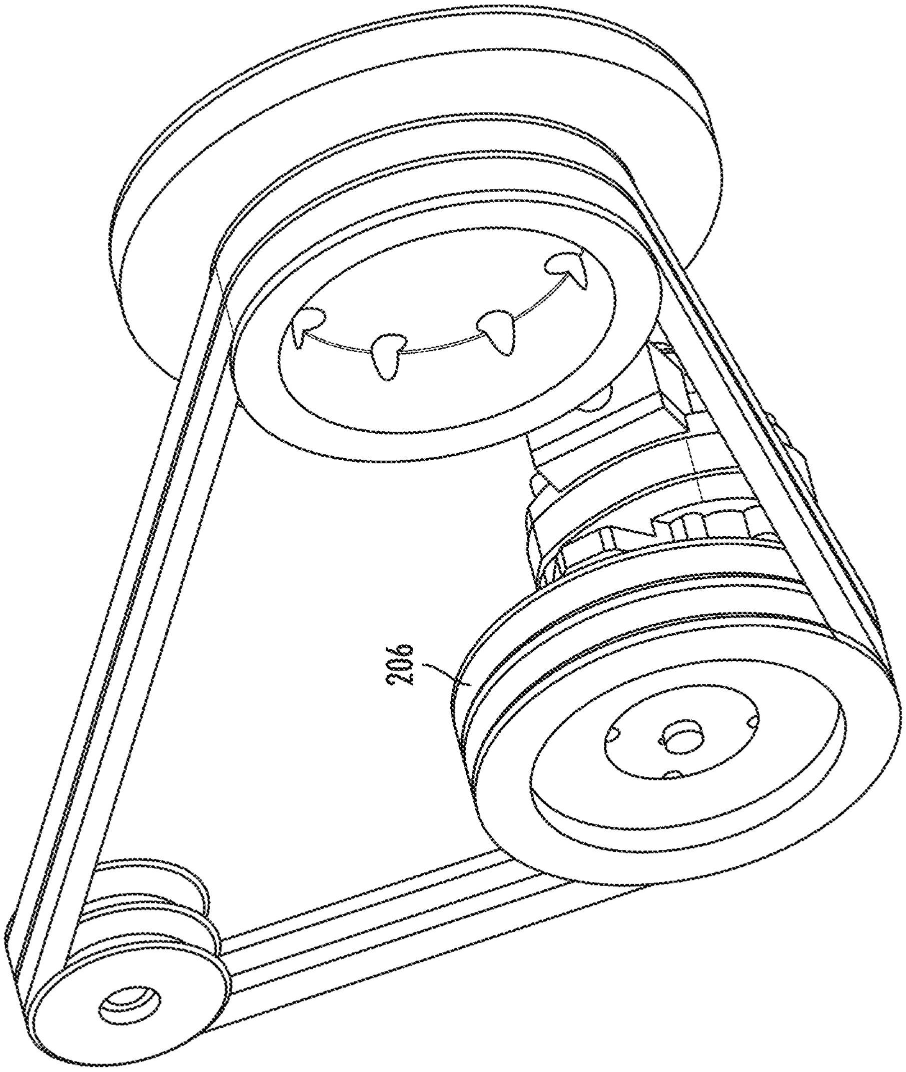
FIG. 25 is a perspective view of V groove idler and drive pulleys with a friction patch formed on an interface surface of the idler and drive pulleys.

Referring now to FIGS. 15-25, a friction patch or lines may be applied to a wheel rim 200 so that a tire 202 does not slip and cause the tire to be unbalanced because of tire slippage on the rim 200 (see FIGS. 15-23), a flat pulley 204 (see FIG. 24) or a pulley 206 with grooves (see FIG. 25). The friction patch may be formed by the emboss or deboss methods described above including but not limited to laser infusing particulates on the surface or milling or laser removing material from the surface.

Figure 15:
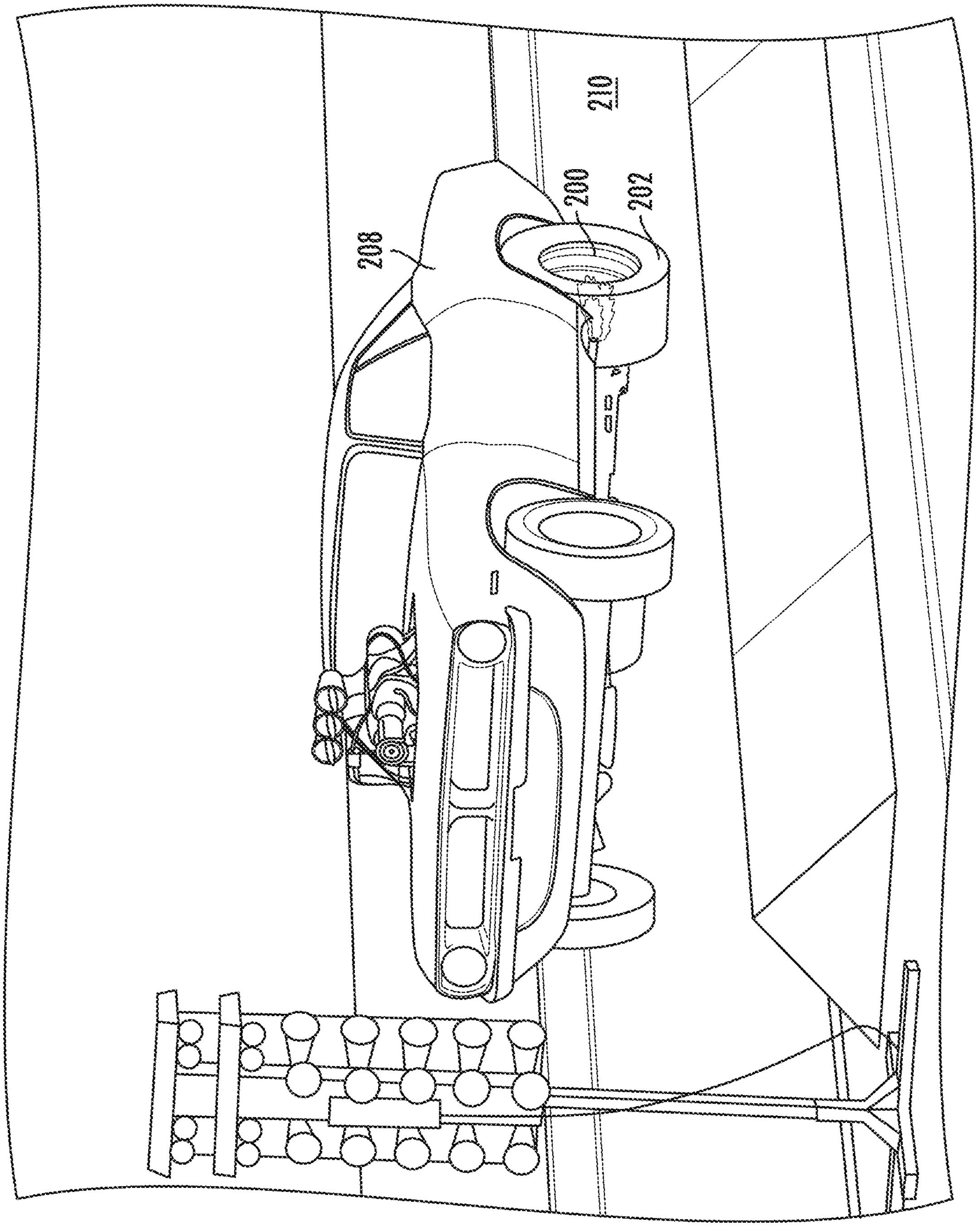
FIG. 15 illustrates a drag race car.
Figure 16:
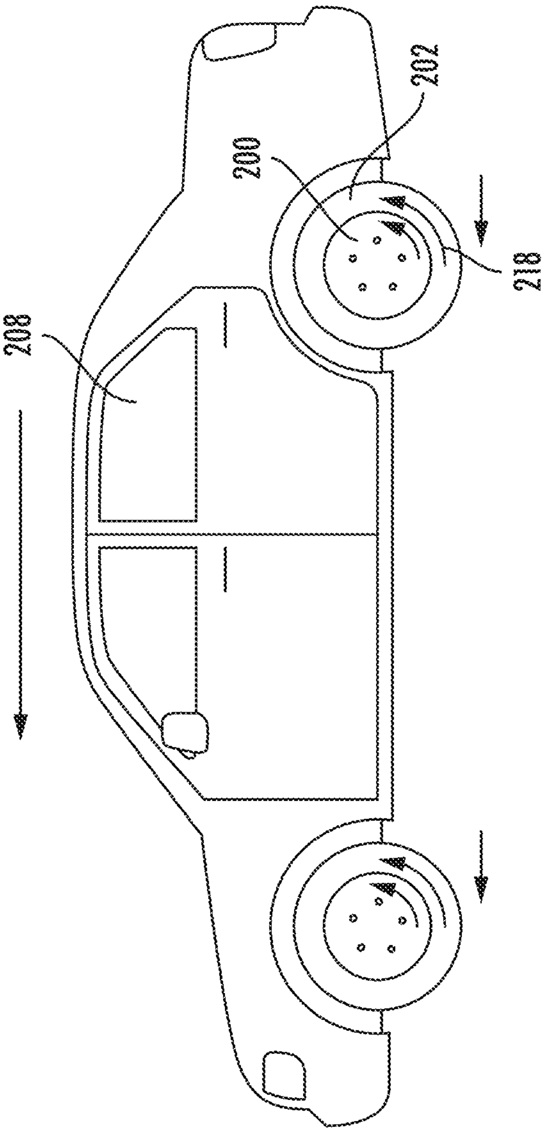
FIG. 16 is a side view of the drag race car illustrated in FIG. 15.

More particularly, referring now to FIGS. 15-23, formation of the friction patch on the wheel rim 200 will be described in relation to the deboss method and apparatus discussed in relation to FIGS. 9-13 above. FIG. 15 illustrates a racecar 208. The racecar starts from 0 miles per hour and accelerates and reaches a high speed as fast as possible in a few seconds. In order to do this, the drive wheels create a high amount of torque in order to propel the racecar 208 forward. The highest level of torque is achieved when the racecar 208 first accelerates from standstill. The goal is to achieve the highest level of torque with minimal slippage between the tire 202 and the road 210. Unfortunately, in generating the highest level of torque, a small amount of slippage may occur between the tire 202 and the rim 200. As shown in FIG. 16, when the racecar 208 accelerates forward, the wheels rotate counterclockwise. Unfortunately, even if there is a small amount of slippage between the rim 200 and the tire 202, the wheel (i.e., tire and rim) eventually becomes unbalanced. On a typical race day, the car may be involved in multiple races. Each race generates slip between the rim 200 and the tire 202 so that by the end of the day, the slip may be about 4 linear inches. At the start of the race day, the tire 202 is balanced on the wheel rim 200. In this way, when the racecar 208 reaches a high-speed, the wheel does not wobble due to any imbalance. Unfortunately, when the rim 200 and the tire 202 slips with respect to each other when the racecar 208 starts out of the gate, the tire rotates and the wheel is now unbalanced. As the racecar 208 reaches its top speed, the wheel may begin to wobble because of the unbalance. Throughout the day, the tire 202 slips on the rim 200 and becomes more and more unbalanced.

Figure 17:
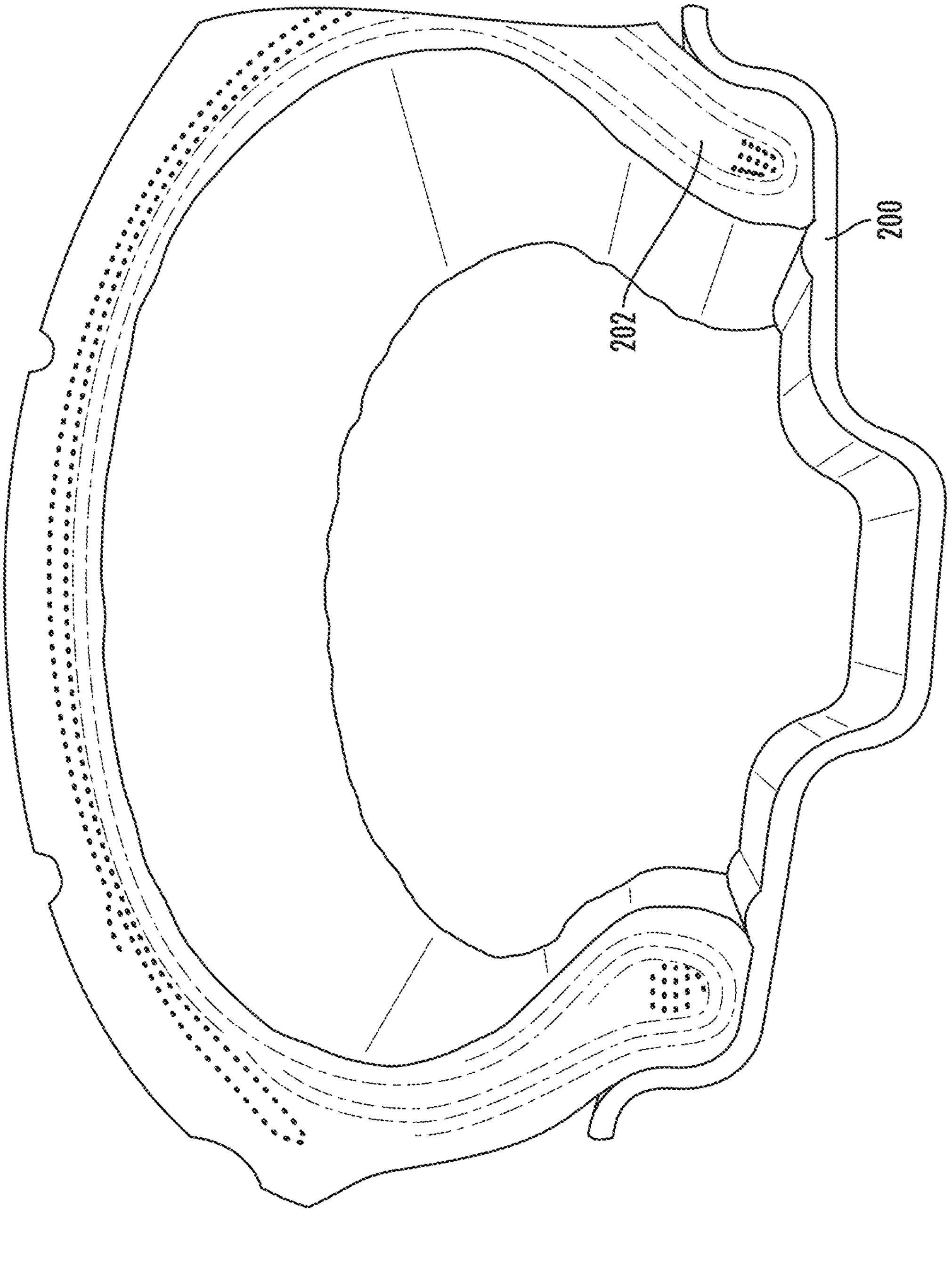
FIG. 17 is a cross-sectional view of a wheel of the drag race car shown in FIGS. 15 and 16.
Figure 18:
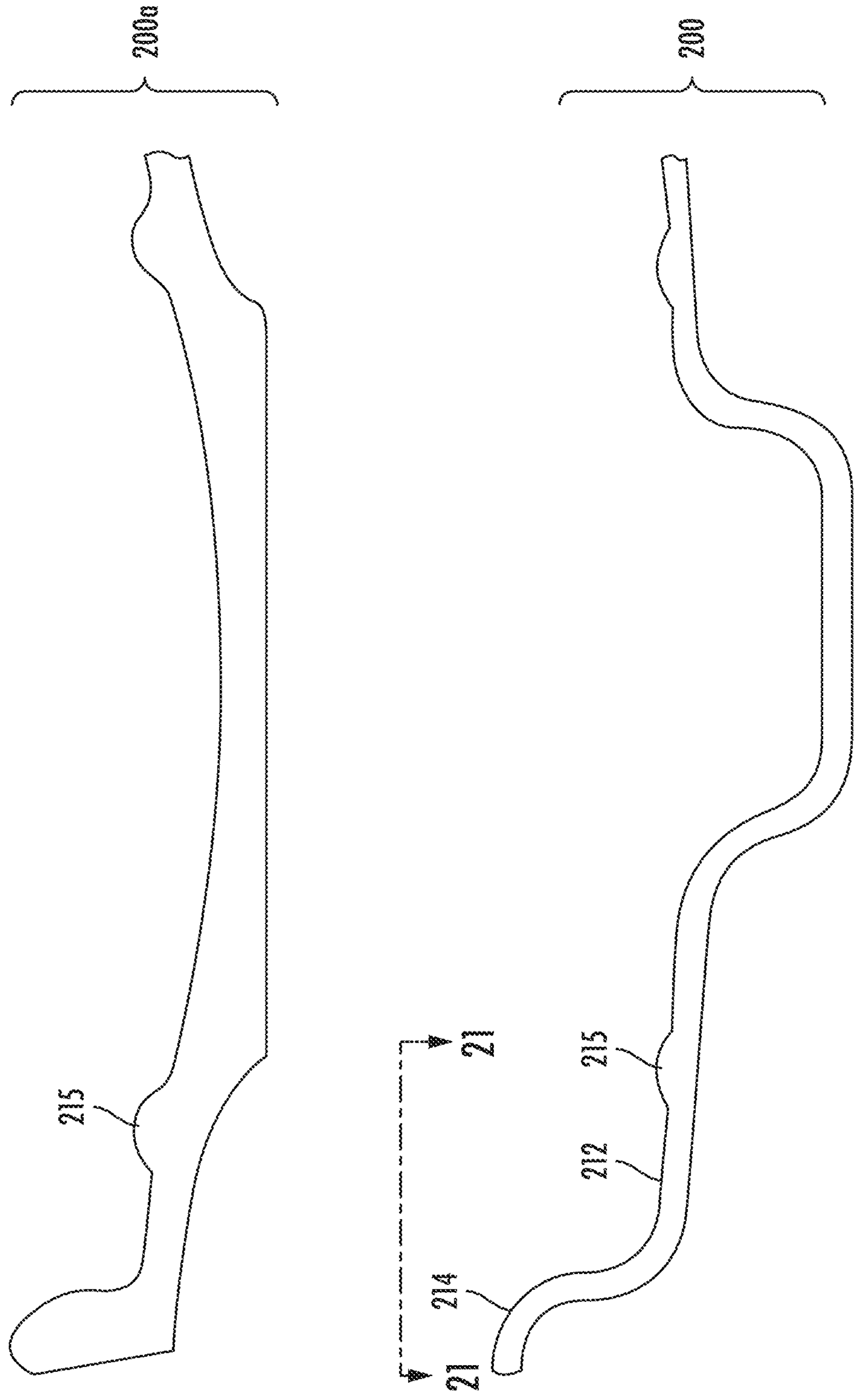
FIG. 18 is a cross-sectional view of a rim of the wheel shown in FIG. 17.

Referring now to FIG. 17, a cross-sectional view of the wheel including the tire 202 and the rim 200 is shown. FIG. 18 illustrates a motorcycle rim 200*a* and a passenger car rim 200. The rims 200, 200*a* has a bead seat 212 and a flange 214. The bead seat 212 is between the bead hump 215 and the flange 214. The friction patch may be formed on the bead seat 212 and/or the flanged surface 214. The friction patch may be formed with laser by performing a roughing pass over the bead seat 212 and/or the flange surface 214. Optionally, a smoothing pass may also be performed on the bead seat 212 and the flange 214. Moreover, as an additional optional step, an annealing pass may also be performed on the bead seat 212 and the flanged 214. The roughing pass, smoothing pass, and annealing pass may be formed 360° around the rim 200, 200*a*. To conduct the passes on the rim 200, the rim 200 may be mounted to a laser as discussed above. Although a friction patch may be applied to the bead seat and flange, it is also contemplated that friction lines may be applied thereto in that they are intermittent patches or lines about a circumference of the wheel rim 200, 200*a*. Although the friction patch has been described as being formed as a laser-induced deboss, it is also contemplated that the friction patch may be formed with a laser-induced emboss method described above as well as mechanically forming the friction patch within end mill.

Figure 19:
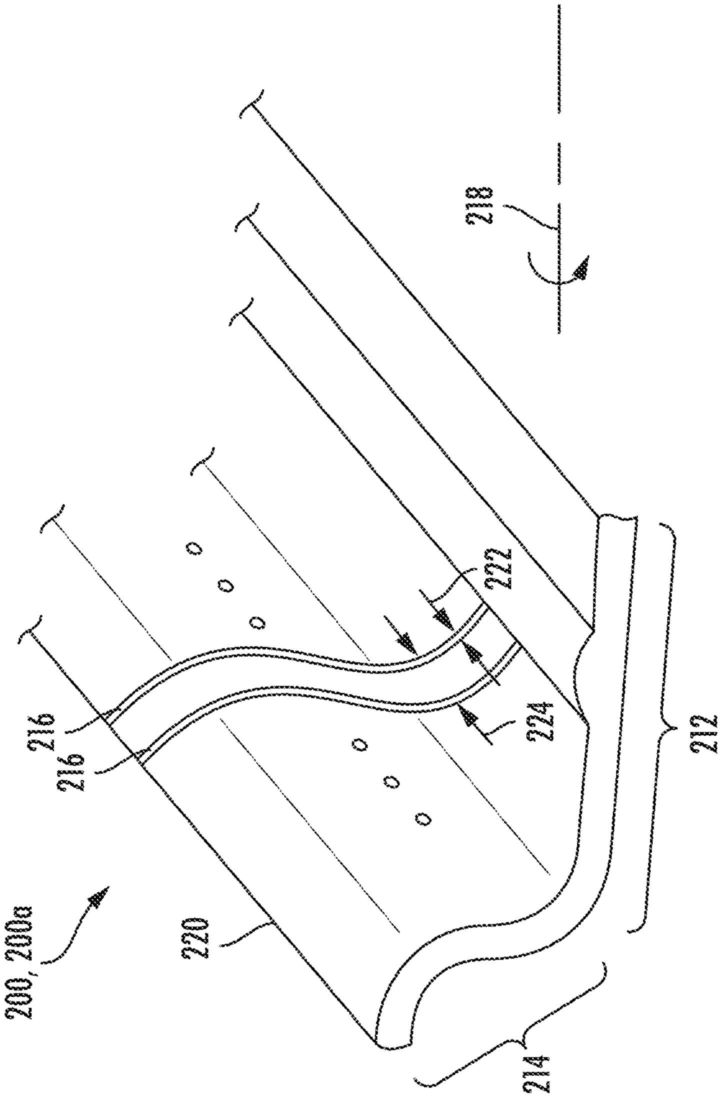
FIG. 19 is a top view of the rim shown in FIG. 18 illustrating spaced apart friction lines in a first direction.
Figure 20:
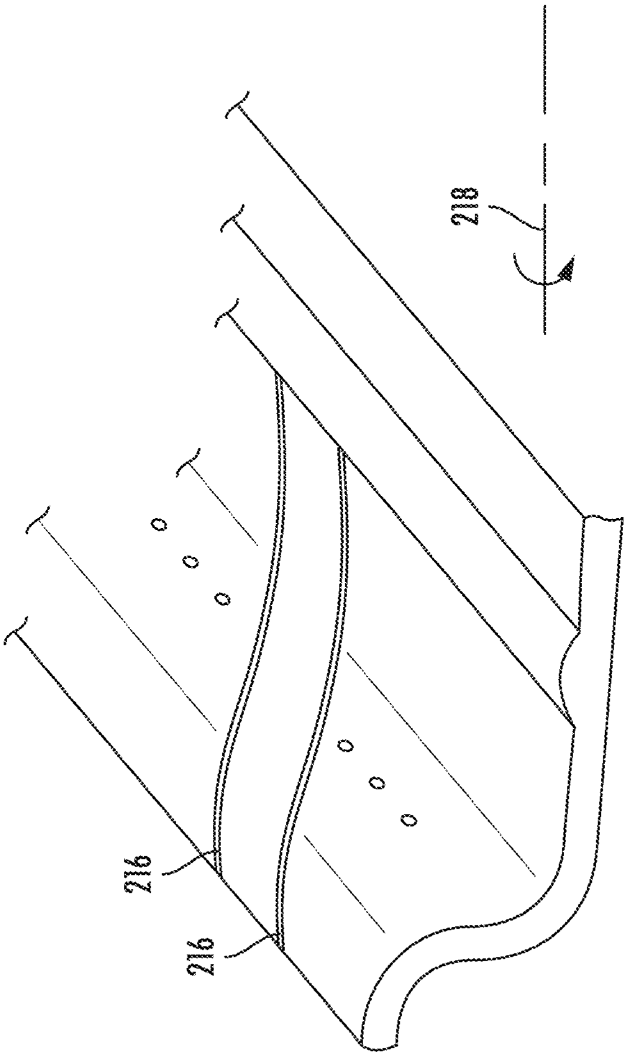
FIG. 20 is a top view of the rim shown in FIG. 18 illustrating spaced apart friction lines in an opposite skew second direction compared to the direction shown in FIG. 19.
Figure 21:
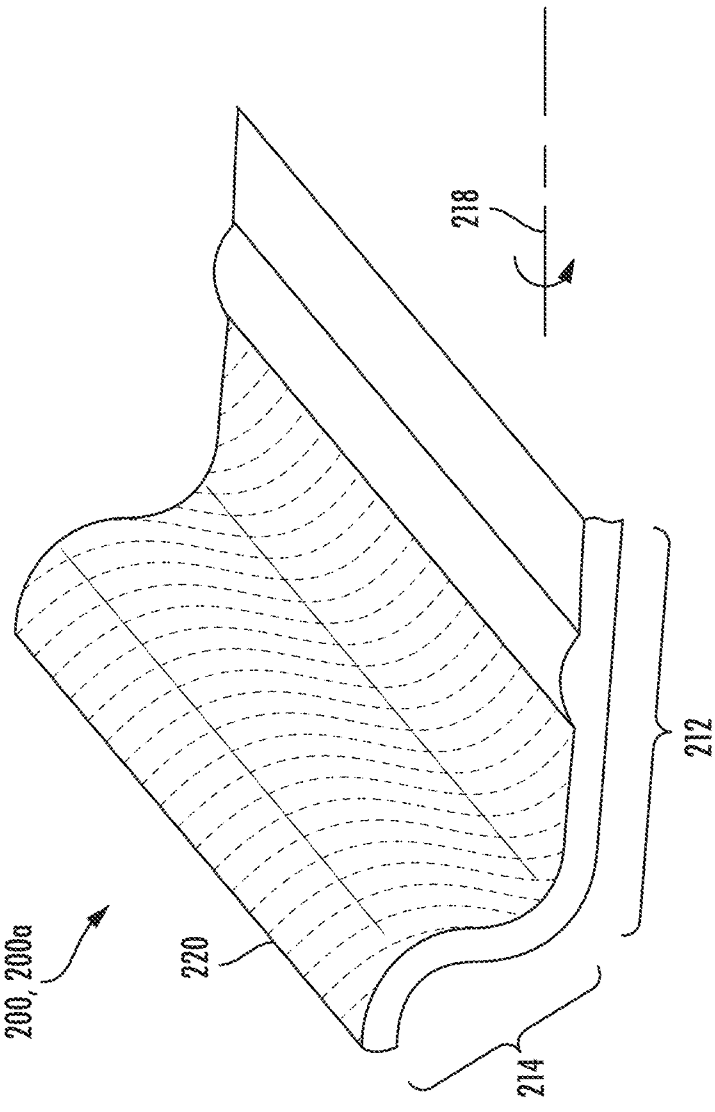
FIG. 21 is a top view of the rim shown in FIG. 18 illustrating friction lines close together in the first direction.
Figure 22:
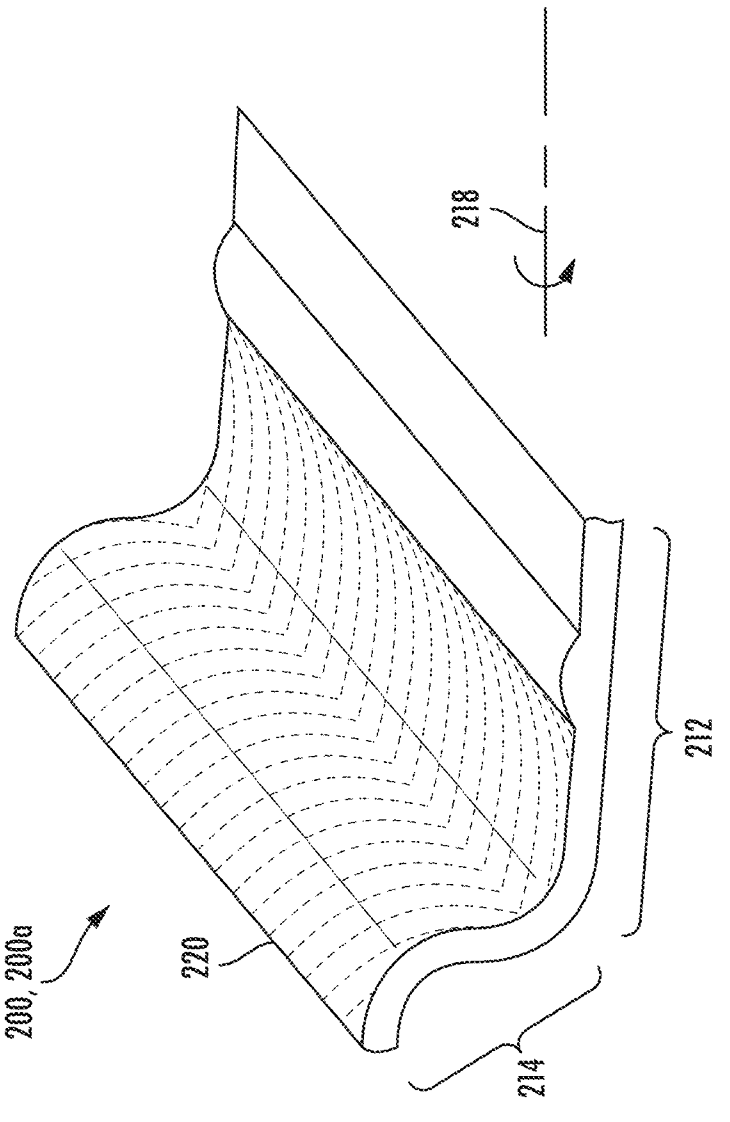
FIG. 22 is a top view of the rim shown in FIG. 18 illustrating friction lines close together forming a V shaped pattern of friction lines.
Figure 23:
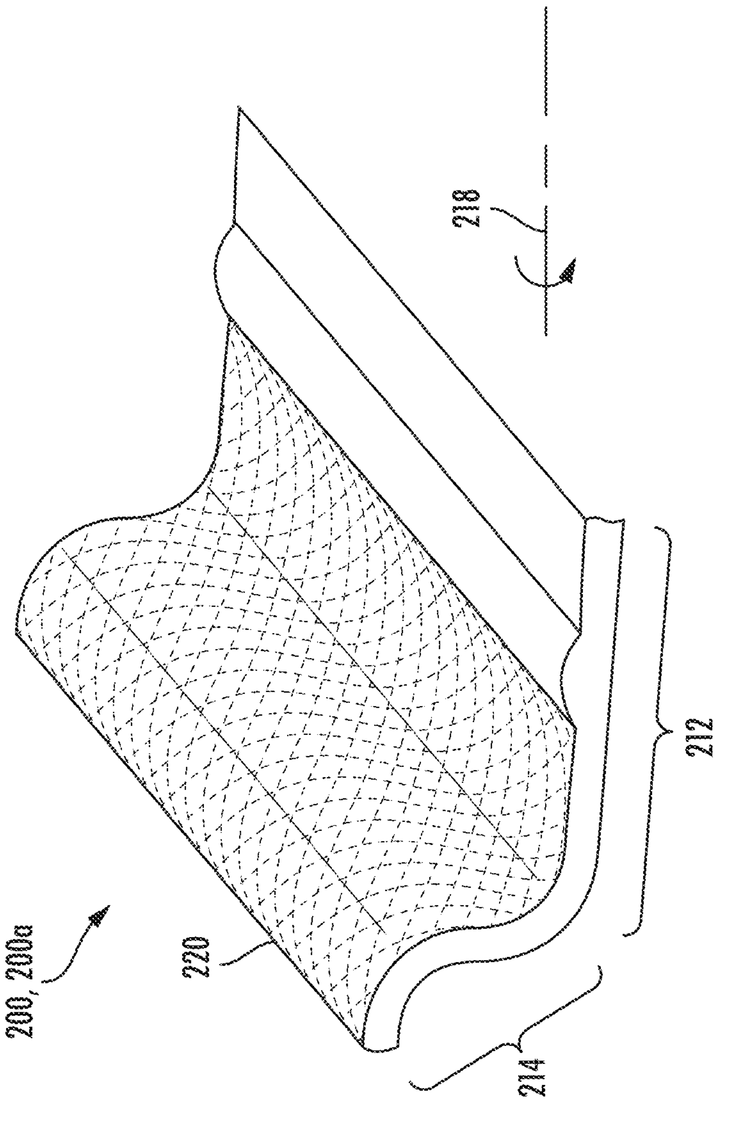
FIG. 23 is a top view of the rim shown in FIG. 18 illustrating a cross hatch of friction lines close together.

Referring now to FIG. 19, a top view of the bead seat 212 and flange 214 is shown. The friction patch or lines 216 are shown. Only two (2) of the friction lines 216 are shown for the purposes of clarity. The friction lines 216 may be formed about the entire circumference of the wheel rim 200, 200*a*. They may be spread apart evenly throughout the circumference of the rim. The friction lines 216 may be formed so that they 216 are skewed with respect to a rotating axis of the wheel rim 200, 200*a*. For example, the friction lines 216 may be skewed in a backward direction with respect to a rotational axis 218 of the wheel rim 200, 200*a*, as shown in FIG. 19. Alternatively, the friction lines 216 may be skewed in a forward direction with respect to a rotational rotation 218 of the wheel rim 200, 200*a*, as shown in FIG. 20. The friction lines 216 mitigate slippage between the tire and the rim 200, 200*a*. If there is slippage between the tire and the rim, then such slippage is minimal (e.g. less than ½ inch, more preferably less than ⅛ inch for automotive drag racing situation). Moreover, if there is slippage between the tire and the rim, the friction lines 216 may tear into the tire. Any portion of the tire that is removed by the friction lines 216 may be urged out to the side 220 of the wheel rim because of the backwards slant of the friction lines 216. For the forward skewed friction lines 216 shown in FIG. 20, the torn up tire may be urged into the tire because of the forward slant of the friction lines 216. The bits of torn up tire may works its way to the outside or the inside of the rim by way of the smooth portion of the rim between the friction lines 216 without the friction lines 216. The skew angle between the friction lines 216 and the rotational axis 218 may be between 20 degrees to 80 degrees. At zero degrees skew angle, the friction lines 216 would be parallel to the rotational axis 218. Preferably, the skew angle between the friction lines 216 and the rotational axis 218 may be 45 degrees. The friction lines 216 may have a width 222 of about 1/32" to ½" and may have a gap 224 away from an adjacent friction line 216 between about 1/32" to ½". Preferably, the width 222 of the friction lines 216 is 1/32" and the gap 224 is about 1/32". Instead of friction lines 216, a friction patch may be formed continuously about the wheel rim 200, 200*a*. The friction lines shown in FIGS. 21-23 are not spaced apart but are close together so as not to form a significant space so that torn up tire can work its way to the outside or the inside of the rim. In FIG. 21, the friction lines have a backwards slant. Alternatively, the friction lines may have a forward slant. In FIG. 22, the friction lines have a combination backwards and forward slant formed into a V shape. In FIG. 23, the friction lines have a cross hatch.

Referring now to FIGS. 21 and 22, the friction patch formed via laser infusing particulates into the surface or laser debossing material from the surface may be formed on an exterior surface of a flat round drum pulley 204 or a V-shaped groove pulley 206.

Figure 26:
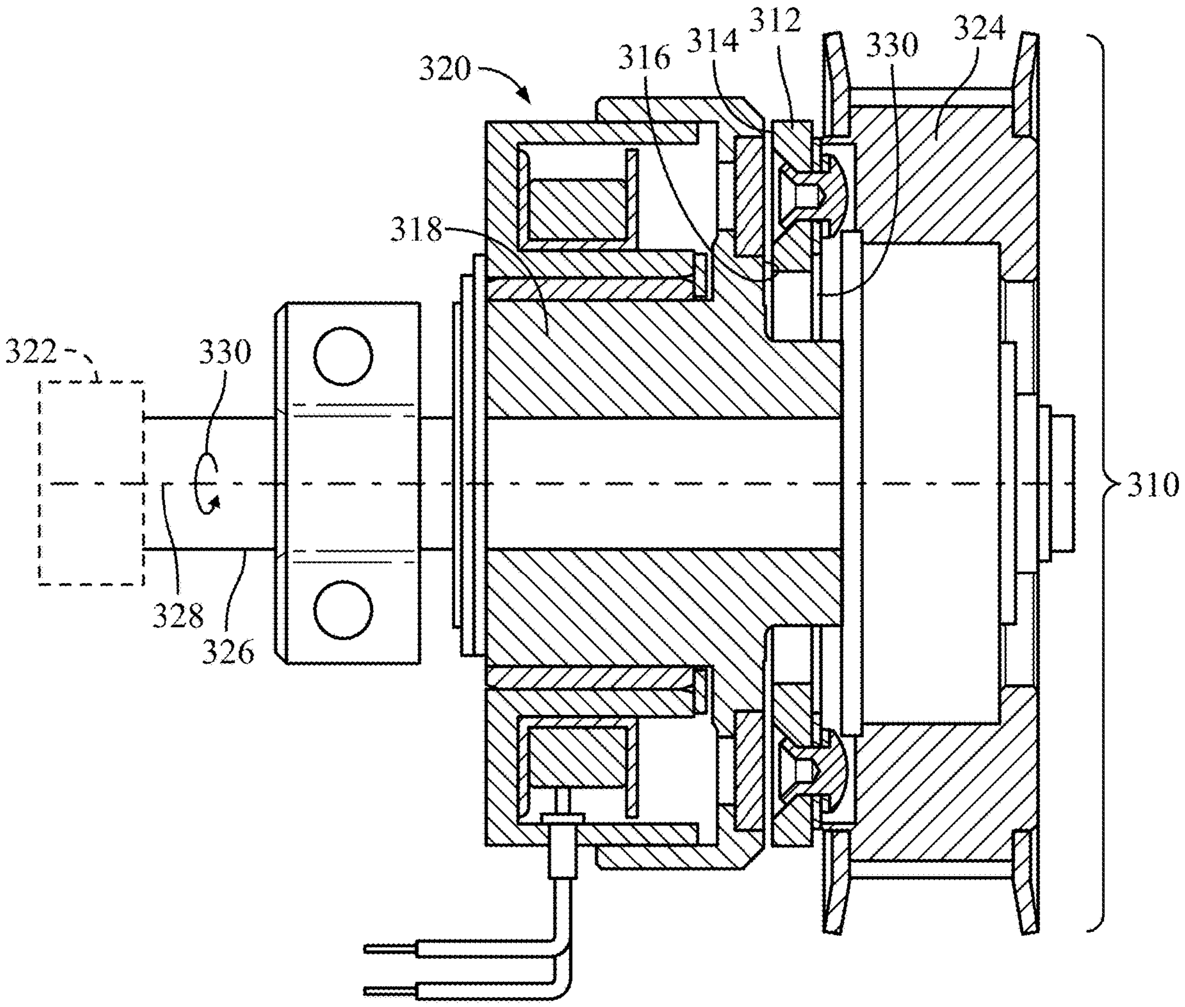
FIG. 26 is a cross sectional view of a first type of electromagnetic clutch in a disengaged position.
Figure 27:
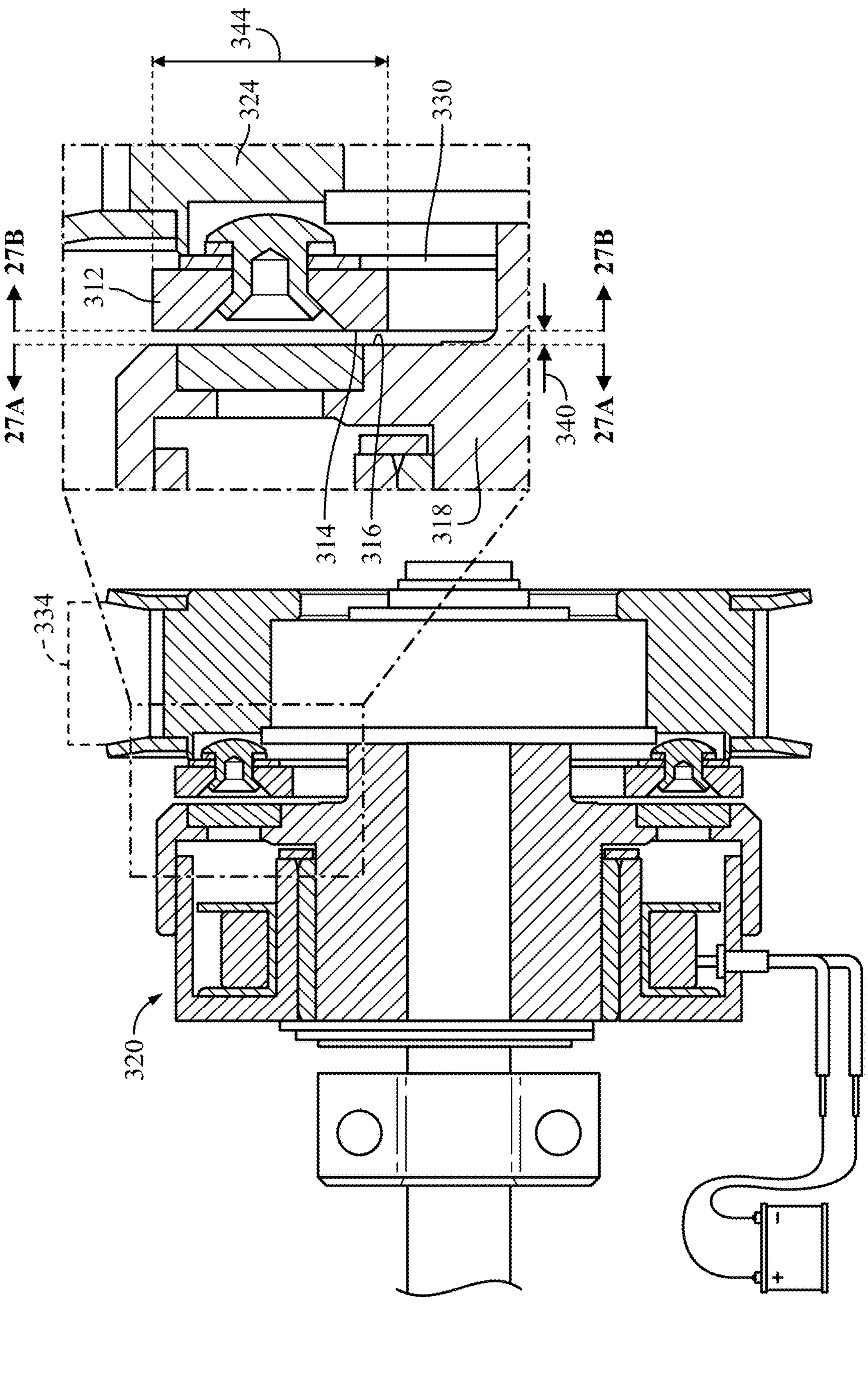
FIG. 27 is an enlarged view of a portion of the clutch shown in FIG. 26.
Figure 28:
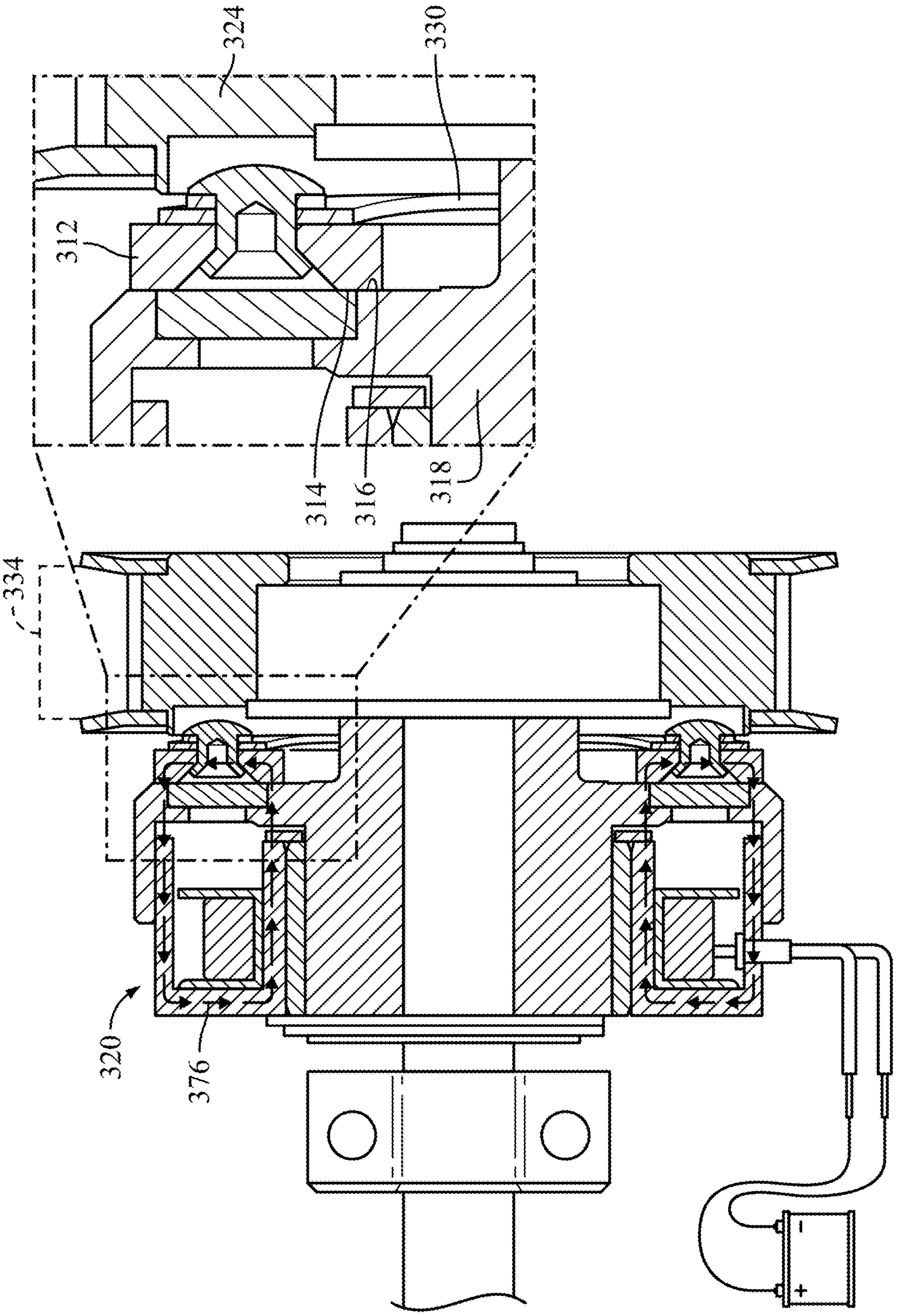
FIG. 28 is a cross sectional view of the first type of electromagnetic clutch in an engaged position.
Figure 29:
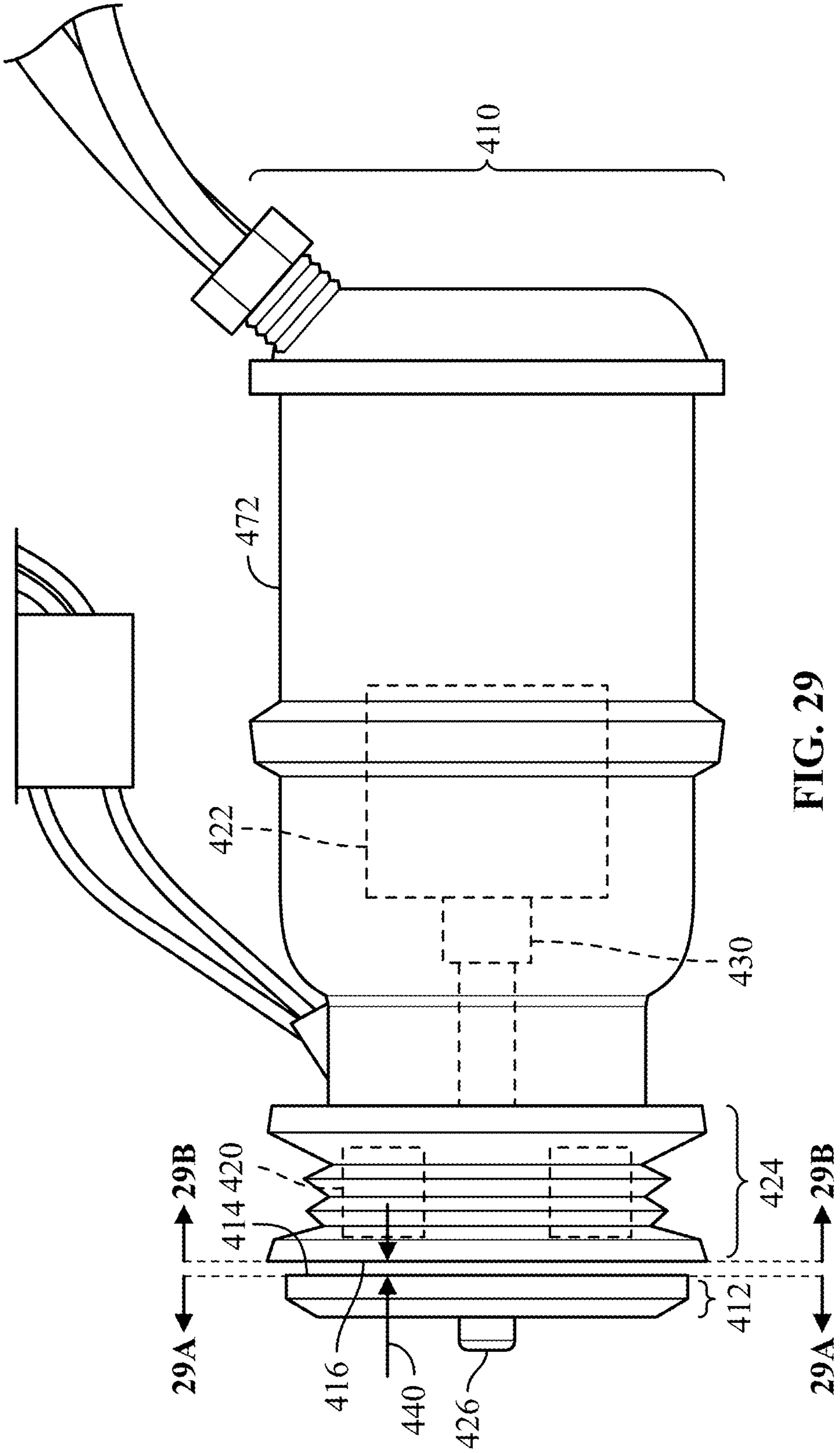
FIG. 29 illustrates a second type of electromagnetic clutch in a disengaged position.
Figure 29B:
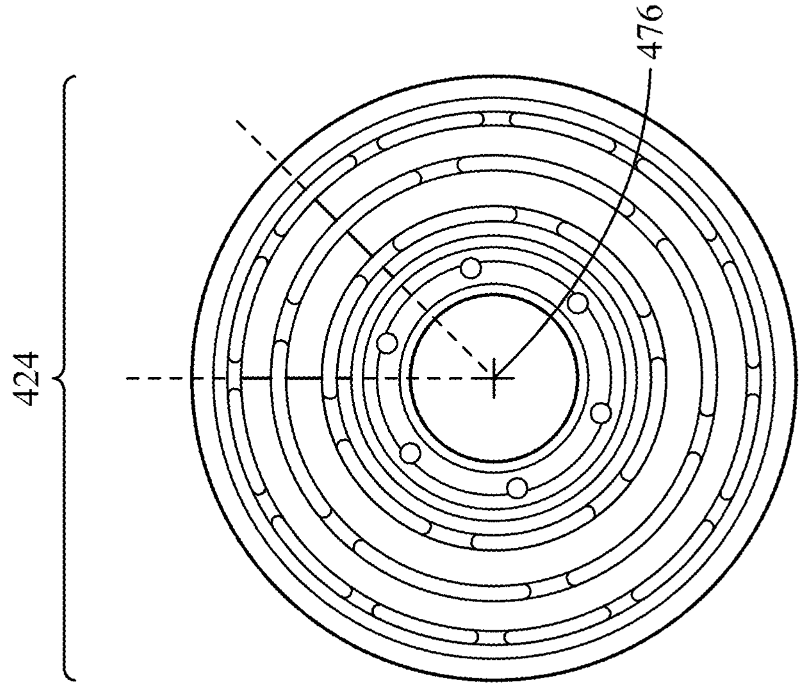
FIG. 29B is a plan view of a first embodiment of a flat engaging surface of a driven disc.
Figure 29A:
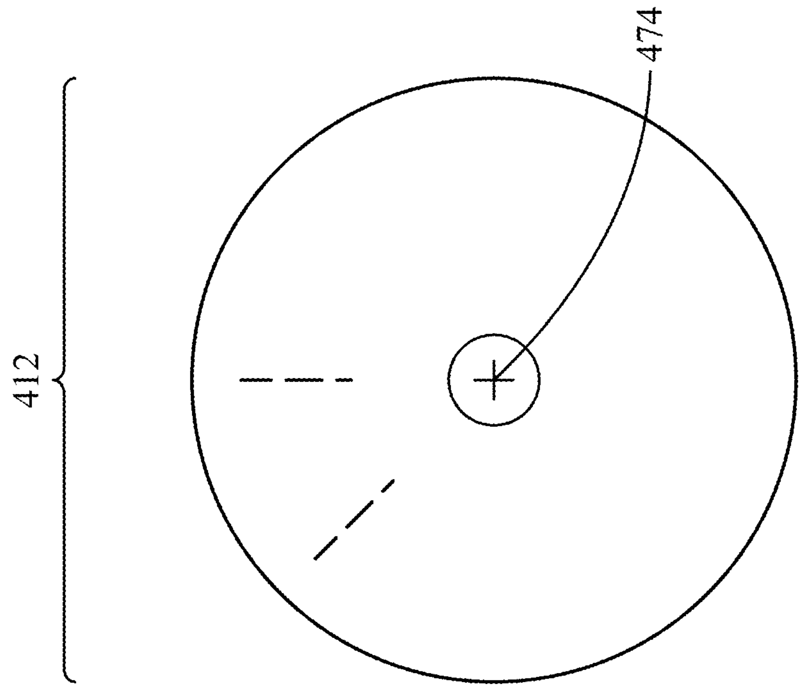
FIG. 29A is a plan view of a first embodiment of a flat engaging surface of a driving disc.
Figure 29D:
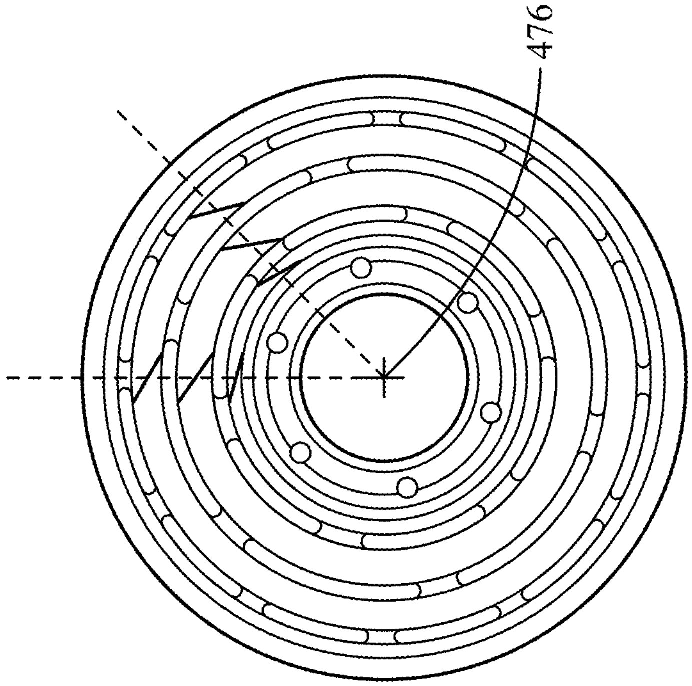
FIG. 29D is a plan view of a second embodiment of the flat engaging surface of the driven disc.
Figure 29C:
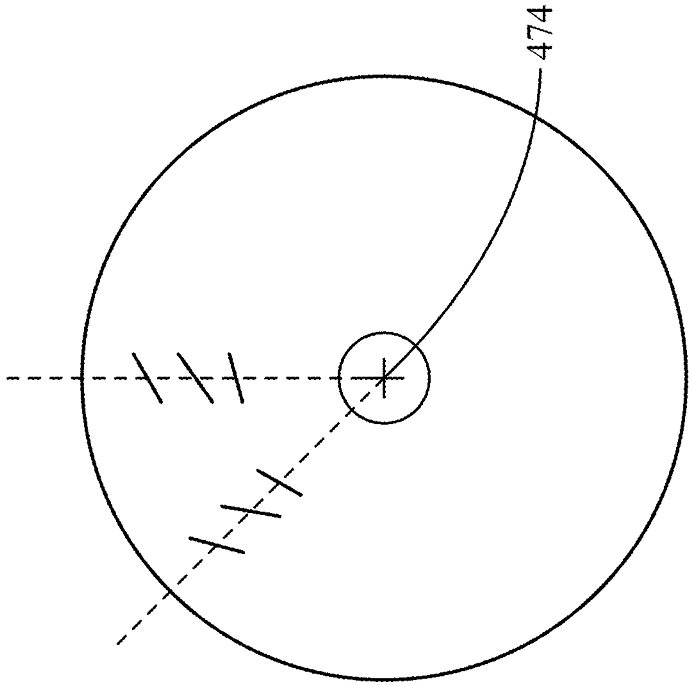
FIG. 29C is a plan view of a second embodiment of the flat engaging surface of the driving disc.
Figure 29F:
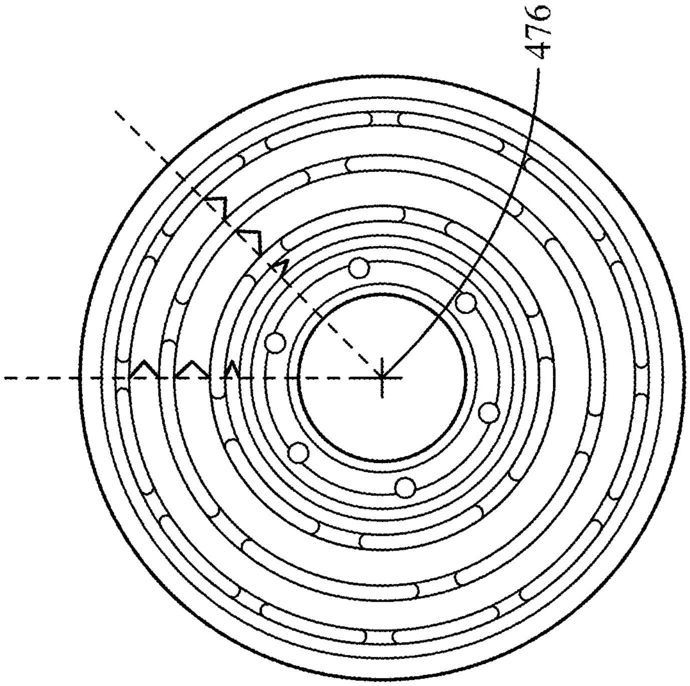
FIG. 29F is a plan view of a third embodiment of the flat engaging surface of the driven disc.
Figure 29E:
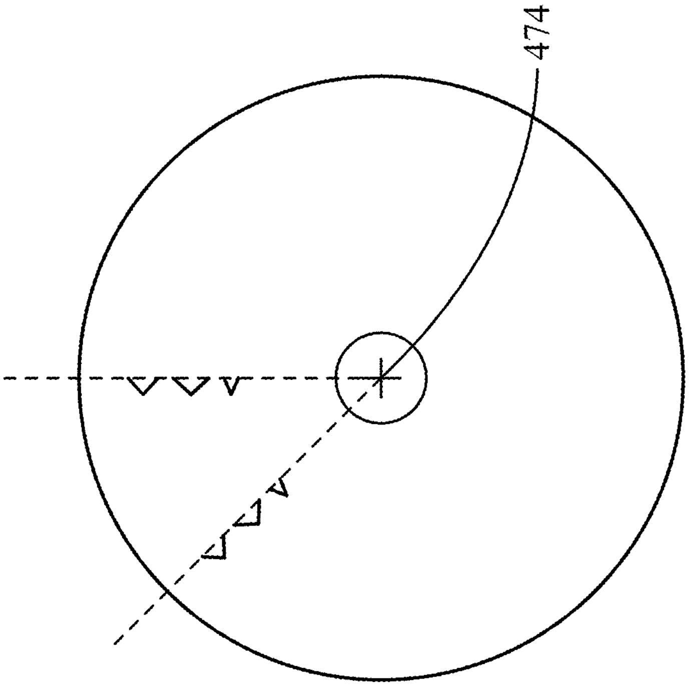
FIG. 29E is a plan view of a third embodiment of the flat engaging surface of the driving disc.
Figure 29H:
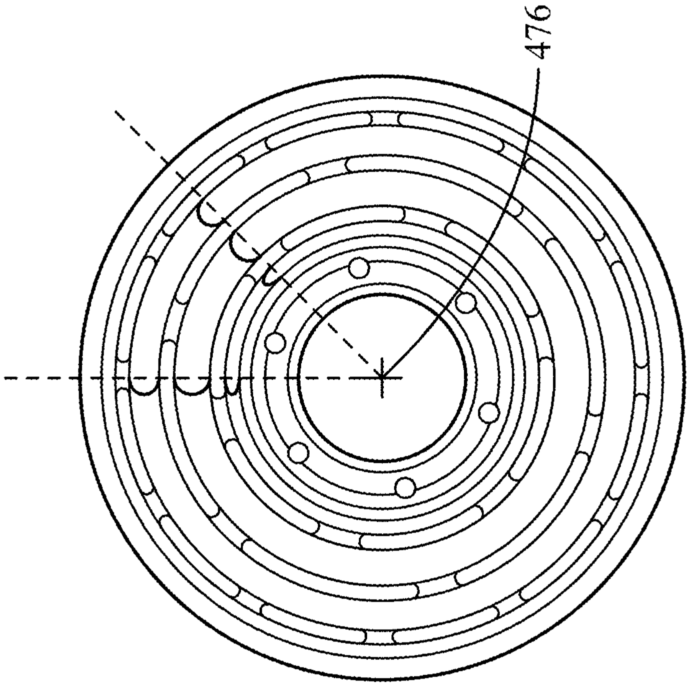
FIG. 29H is a plan view of a third embodiment of the flat engaging surface of the driven disc.
Figure 29G:
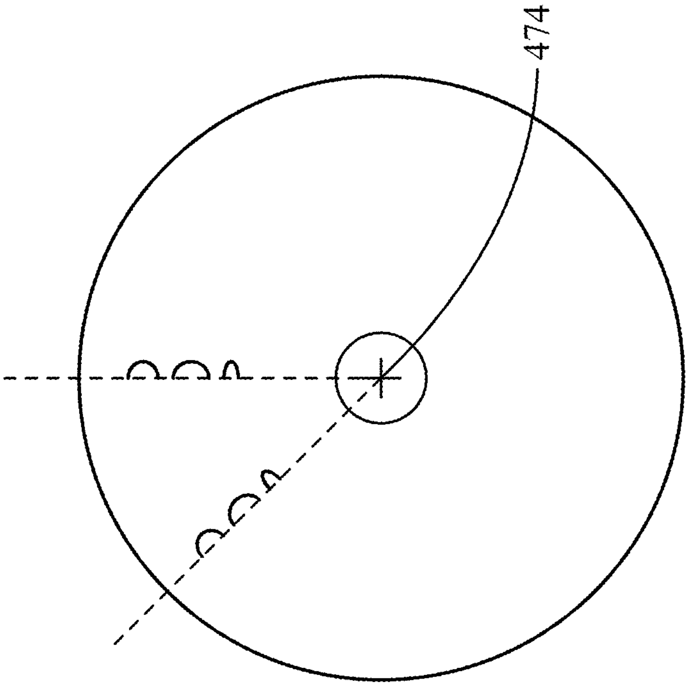
FIG. 29G is a plan view of a third embodiment of the flat engaging surface of the driving disc.
Figure 29J:
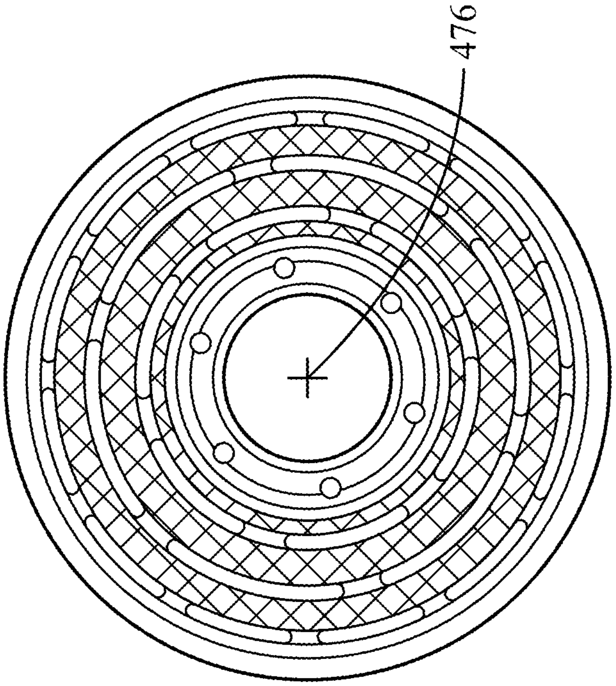
FIG. 29J is a plan view of a fourth embodiment of the flat engaging surface of the driven disc.
Figure 29I:
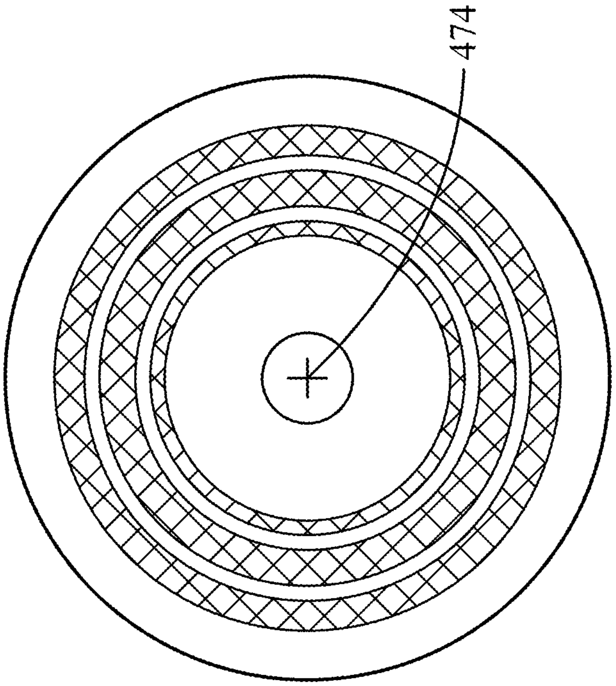
FIG. 29I is a plan view of a fourth embodiment of the flat engaging surface of the driving disc.
Figure 30:
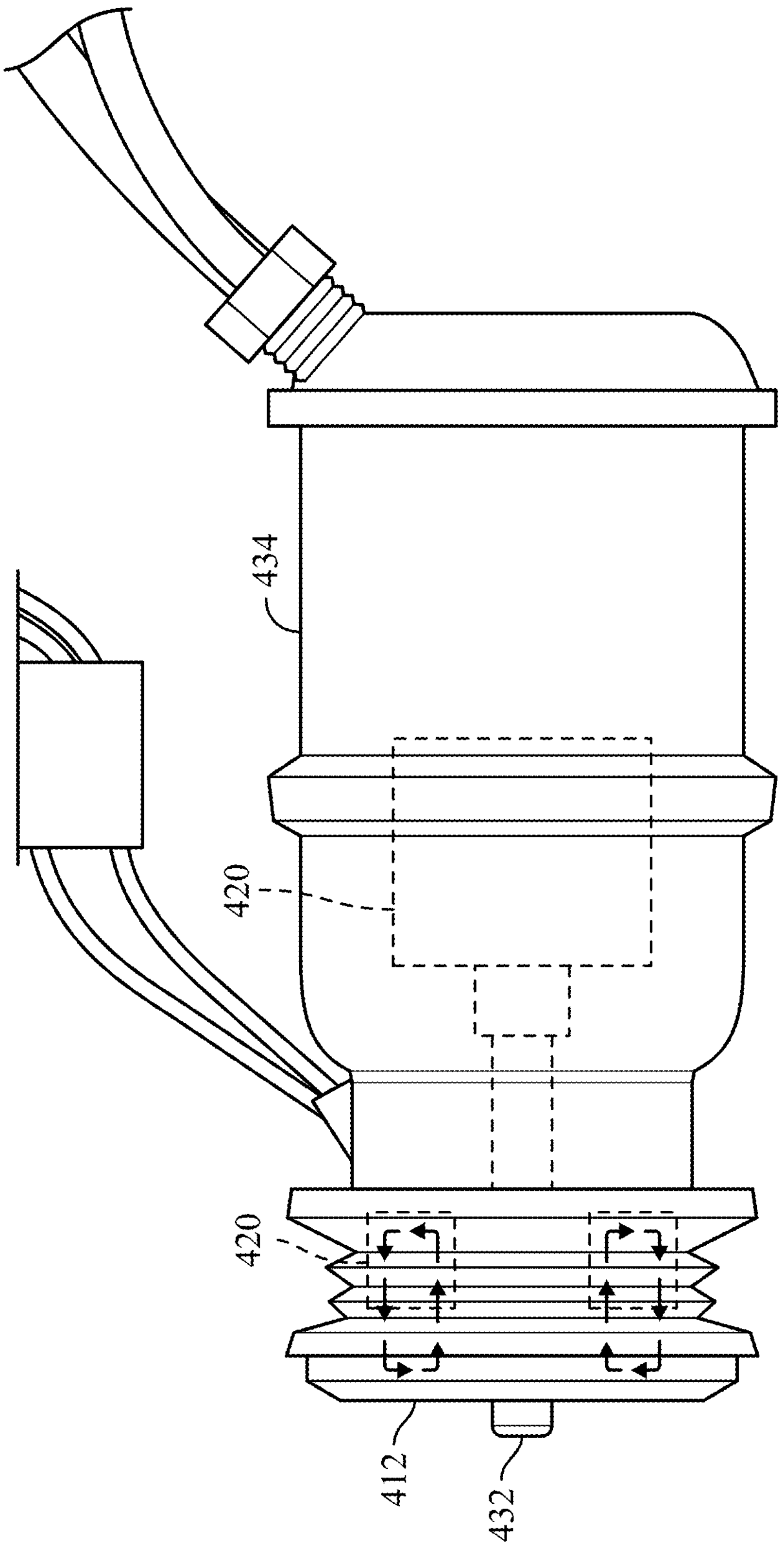
FIG. 30 illustrates the second type of electromagnetic clutch in an engaged position.

Referring now to FIGS. 26-31, the various aspects are described in relation to an electromagnetic clutch 310, 410 as shown in FIGS. 26 and 29. Although two different types of electromagnetic clutches 310, 410 have been used to describe the various aspects described herein, the various aspects may be implemented in other types of electromagnetic clutches as well as other types of rotating discs that transmit torque to rotate a shaft upon engagement of mating discs. The clutches 310, 410 may have a driving disc (rotor 318 shown in FIG. 1, armature 412 shown in FIG. 29) that define flat engaging surfaces 316 (see FIG. 26), 414 (see FIG. 29). These flat engaging surfaces 316, 414 engage flat engaging surfaces 314 (see FIG. 26), 416 (see FIG. 29) of a driven disc (armature 312 and pulley 324 shown in FIG. 26, pulley 424 shown in FIG. 29). The flat engaging surfaces 316, 414 may have laser induced friction treatment formed thereon to increase a coefficient of friction and to reduce, eliminate or mitigate slippage between the flat engaging surfaces 316, 414 and 314, 416 when they contact each other. They contact and engage with each other when an electromagnet 320, 420 are energized, as shown in FIGS. 28, 30. When the electromagnets 320, 420 are energized, the driving discs (rotor 318 shown in FIG. 26, armature 412 shown in FIG. 29) are drawn closer to and engage with the driven discs (armature 312 and pulley 324 shown in FIG. 26, pulley 424 shown in FIG. 29) at the flat engaging surfaces 316, 314 and 414, 416.

In FIG. 26, the armature 312 and the pulley 324 do not rotate when the electromagnet 320 is not energized. The rotor 318 is continuously rotated by power of a separate motor 322 (e.g., car engine). In FIG. 29, the armature 412 continuously rotates under the power of the 422 powered by electricity from a motor such as from a motor of an automobile. Laser induced friction treatment is formed on the flat engaging surfaces 314, 316 and 414, 416 with a laser beam. When the flat engaging surfaces 614, 316 and 414, 416 contact each other the driving discs engage with a pulley 324, 424 to rotate the pulley 324, 424 under the power of the driving disc.

Referring now specifically to the embodiment shown in FIG. 26, the electromagnetic clutch 310 is shown. The electromagnetic clutch 310 has a shaft 326 connected to the motor 322. The motor 322 may be a motor of an automobile. The motor 322 rotates the shaft 326 about a central rotating axis 328 in the direction of arrow 330. It is also contemplated that the shaft 326 may be rotated in the opposite direction. The direction shown in the drawings is merely for convenience and to explain the aspects of the electromagnetic clutches 310, 410. The electromagnetic clutch 310 has a rotor 318 which is fixedly attached to the shaft 326. By way of example, a key may fit into a keyway of the shaft 326 and the rotor 318. The key may hold the rotor 318 to the shaft 326 so that upon rotation of the shaft 326, the rotor 318 would also rotate in the same direction synchronously and at the same speed.

The armature 312 may be fixedly attached to the pulley 324 by way of a flat spring 330 (see FIG. 27). When the electromagnet 320 is de-energized, the spring 330 biases the armature 312 away from the rotor 318 so that the flat engaging surfaces 314, 316 of the armature 312 and the rotor 318 do not contact each other. See the position of the armature in 312 in FIG. 27. An airgap 340 is present between the flat engaging surfaces 314, 316. In this state, when the motor 322 rotates the shaft 326, and the shaft 326 rotates the rotor 318, the pulley 324 and the armature 312 do not rotate and remain stationary.

When the electromagnet is energized as shown in FIG. 28, the electromagnetic field passes through the armature as indicated by the arrows 376. The electromagnet 320 attracts the armature 312 toward the rotor 318. At this time, the flat engaging surfaces 314, 316 of the armature 312 and the rotor 318 are placed into contact with each other. The flat engaging surfaces 314, 316 have laser induced friction treatment formed on them in order to increase their coefficient of friction. The rotation of the shaft 326 is transmitted to the armature 312 as torque through the rotor 318 and the flat engaging surfaces 314, 316 of the armature 312 and the rotor 318. The armature 312 rotates the pulley 324 by transmitting power through the spring 330. When the electromagnet 320 is energized, a sufficient amount of normal force is created to draw the armature 312 onto the rotor to rotate the belt 334 on the pulley 324 via rotational frictional forces between the flat engaging surfaces 314, 316.

As long as the electromagnet 320 is energized, flat engaging surface 314 of the armature 312 and the flat engaging surface 316 of the rotor 318 are placed into contact with each other and are frictionally engaged to each other.

At the instance when the flat engaging surface 314 of the armature 312 contacts and engages the flat engaging surface 316 of the rotor 318, slippage may occur. The laser induced friction treatment on one or both of the flat engaging surfaces 314, 316 reduces, eliminates or mitigates the slippage. The laser induced friction treatment may be formed on the flat engaging surfaces 314, 316 of the armature 312 and the rotor 318. The laser induced friction treatment increases the coefficient of friction of the surfaces 314, 316 to reduce, prevent or mitigate slippage and thus wear of the flat engaging surfaces 314, 316 of the armature 312 and the rotor 318.

Figure 27A:
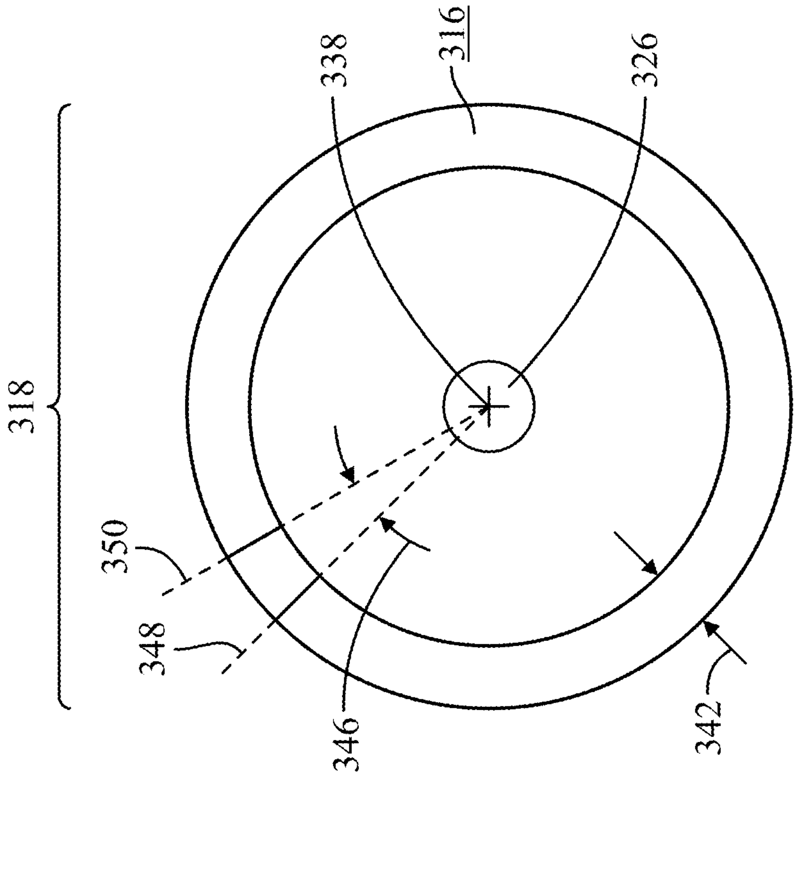
FIG. 27A illustrates a plan view of a first embodiment of a flat engaging surface of a rotor of the clutch shown in FIG. 26.
Figure 27B:
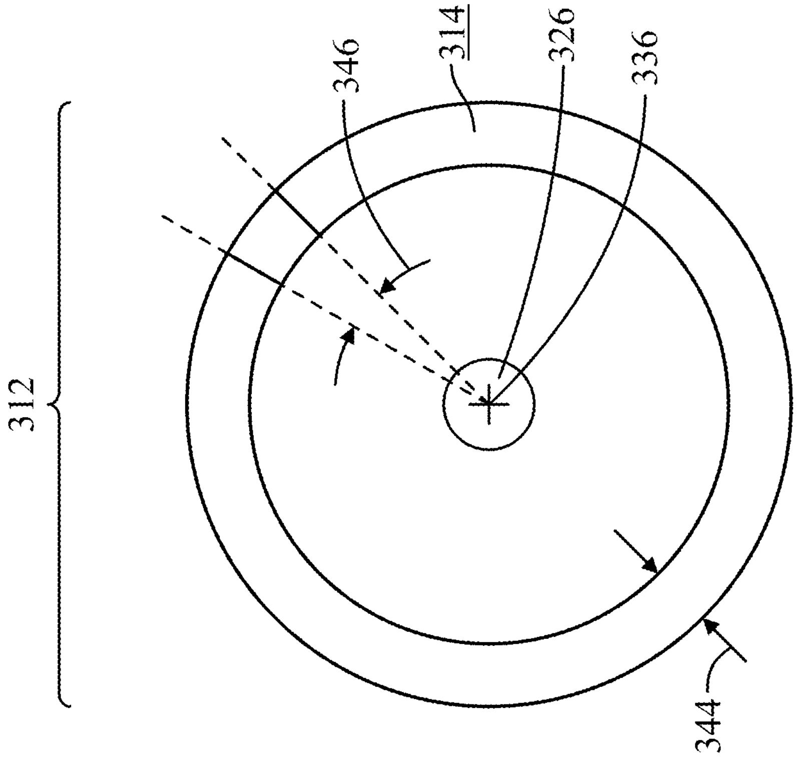
FIG. 27B illustrates a plan view of a first embodiment of a flat engaging surface of an armature rotor of the clutch shown in FIG. 26.
Figure 27D:
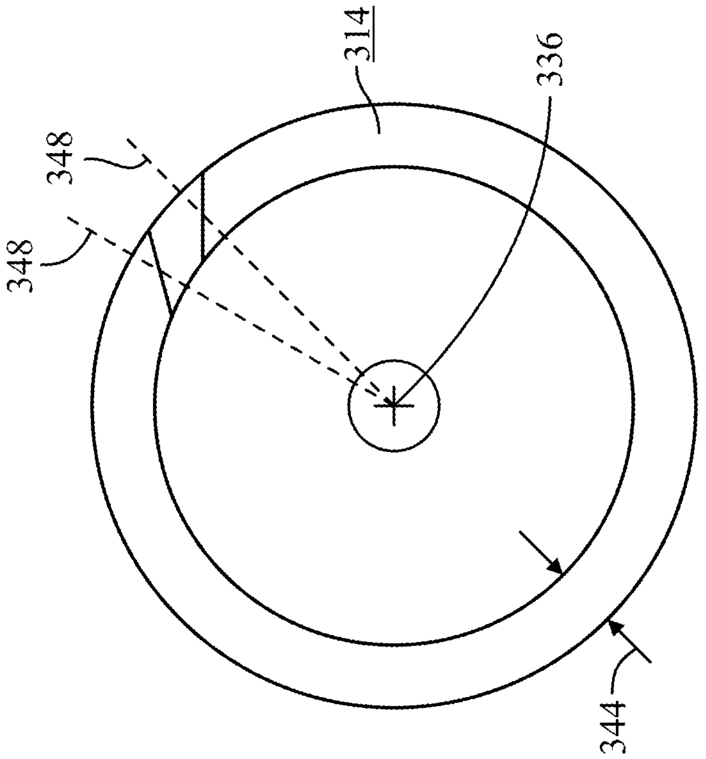
FIG. 27D illustrates a plan view of a second embodiment of a flat engaging surface of the armature rotor of the clutch shown in FIG. 26.

Referring now to FIGS. 27A and B, the flat engaging surfaces 314, 316 are shown. The widths 342, 344 of the flat engaging surfaces 314, 316 are also shown. The flat engaging surfaces 314, 316 of the armature 312 and the rotor 318 have laser induced friction treatment formed thereon. The laser induced friction treatment may be formed by directing the laser as a straight line across the surfaces 314, 316. The straight line 382 of the laser induced friction treatment may be aligned to a rotating axis 336 of the armature 312 and a rotating axis 338 of the rotor 318 then extend outward. The straight line of the laser induced friction treatment may intersect the rotating axis of the rotor 318 and the armature 312. A plurality of the straight line laser induced friction treatment may be formed on each of the flat engaging surfaces 314, 316 of the armature 312 and the rotor 318. The plurality of straight line laser induced friction treatment may be angularly spaced apart from each other at an angle 346. The angle 346 may be the same between adjacent straight line laser induced friction treatments. In other words, the straight line laser induced friction treatment is angularly equidistant from each other on the respective flat engaging surfaces 314, 316 of the armature 312 and the rotor 318. By way of example and not limitation, each of the flat engaging surfaces 314, 316 may have between twenty 20 to 1440 straight line laser induced friction treatments form thereon which are equidistantly spaced apart from each other as a radial array. Additionally, the straight line laser induced friction treatment may be formed on only an outer portion of the flat engaging surfaces 314, 316 indicated by the widths 342, 344, as shown in FIGS. 27A and B. As such, each straight line laser induced friction treatment may not contact an adjacent straight line laser induced friction treatment. Alternatively, a sufficient number of straight line laser induced friction treatment may be formed on the flat engaging surfaces 314, 316 so that adjacent straight line laser induced friction treatments may overlap with each other. For example, the overlap may be at least at a lower section of the widths 342, 344 closer to the rotating axes 336, 338, and also contemplates the entire length of the straight line laser induced friction treatment.

Figure 27C:
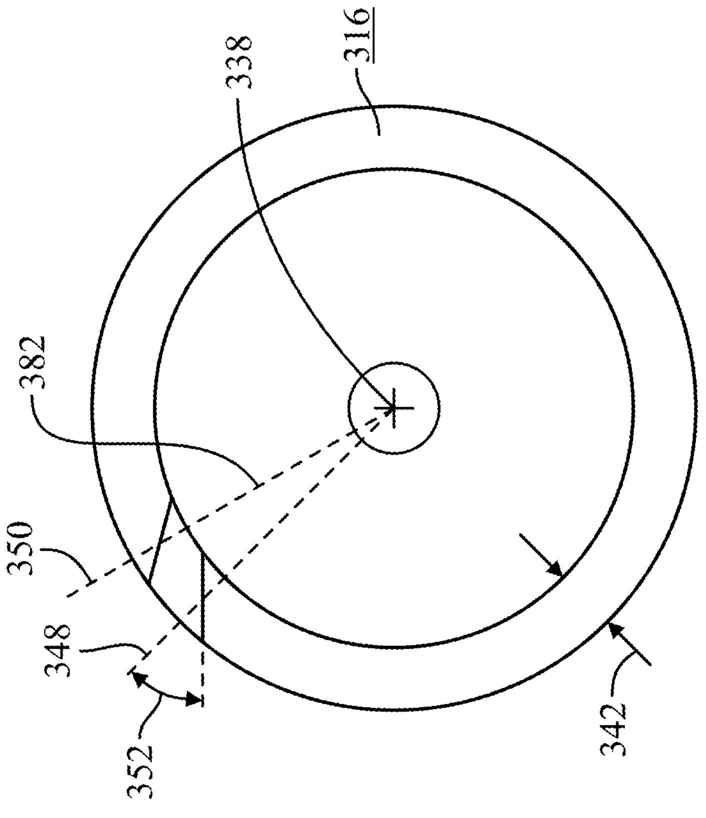
FIG. 27C illustrates a plan view of a second embodiment of the flat engaging surface of the rotor of the clutch shown in FIG. 26.
Figure 27F:
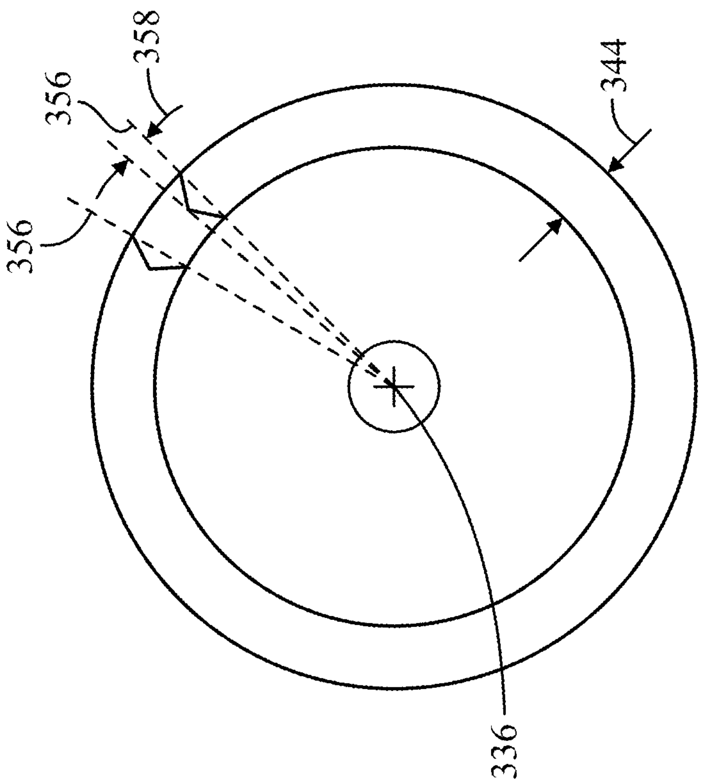
FIG. 27F illustrates a plan view of a third embodiment of a flat engaging surface of the armature rotor of the clutch shown in FIG. 26.
Figure 27E:
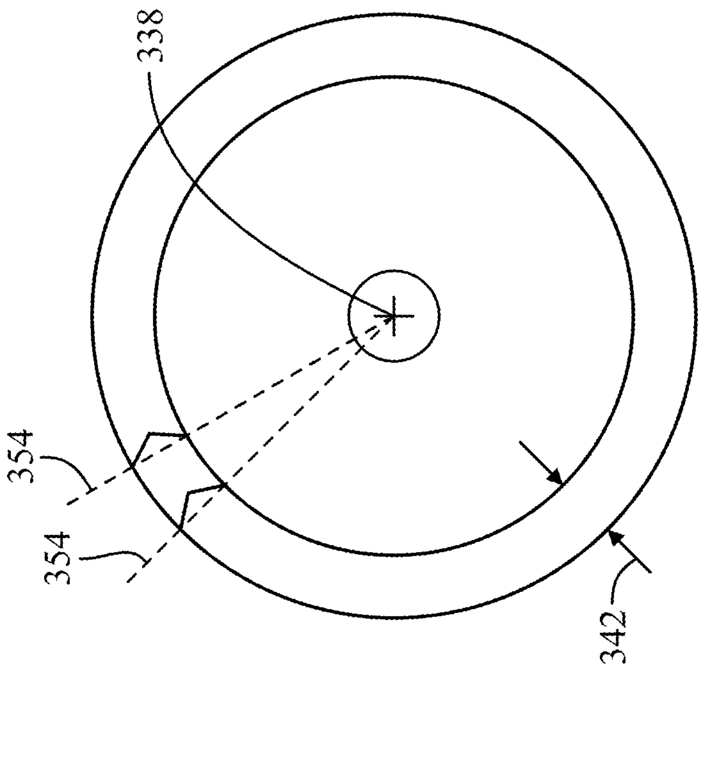
FIG. 27E illustrates a plan view of a third embodiment of the flat engaging surface of the rotor of the clutch shown in FIG. 26.
Figure 27G:
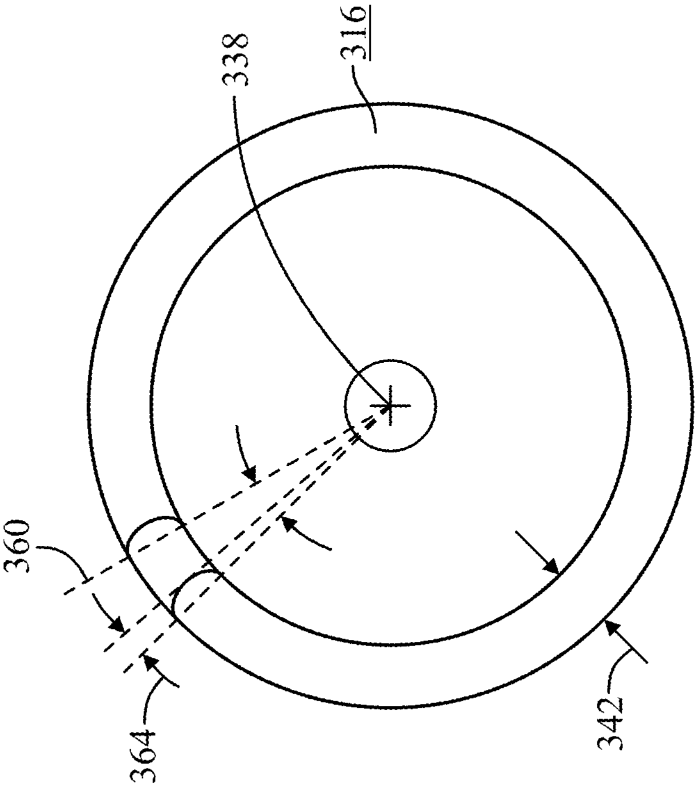
FIG. 27G illustrates a plan view of a fourth embodiment of the flat engaging surface of the rotor of the clutch shown in FIG. 26.
Figure 27H:
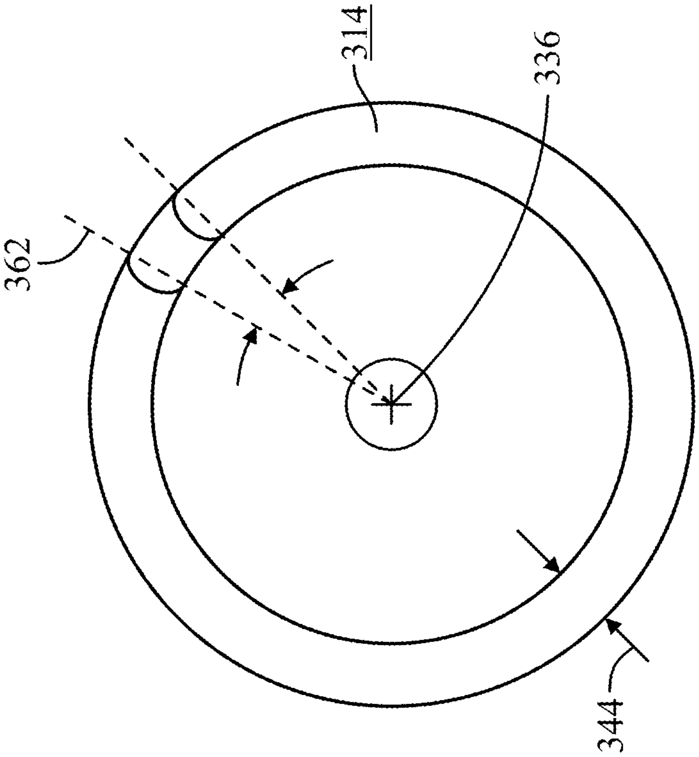
FIG. 27H illustrates a plan view of a fourth embodiment of a flat engaging surface of the armature rotor of the clutch shown in FIG. 26.
Figure 27I:
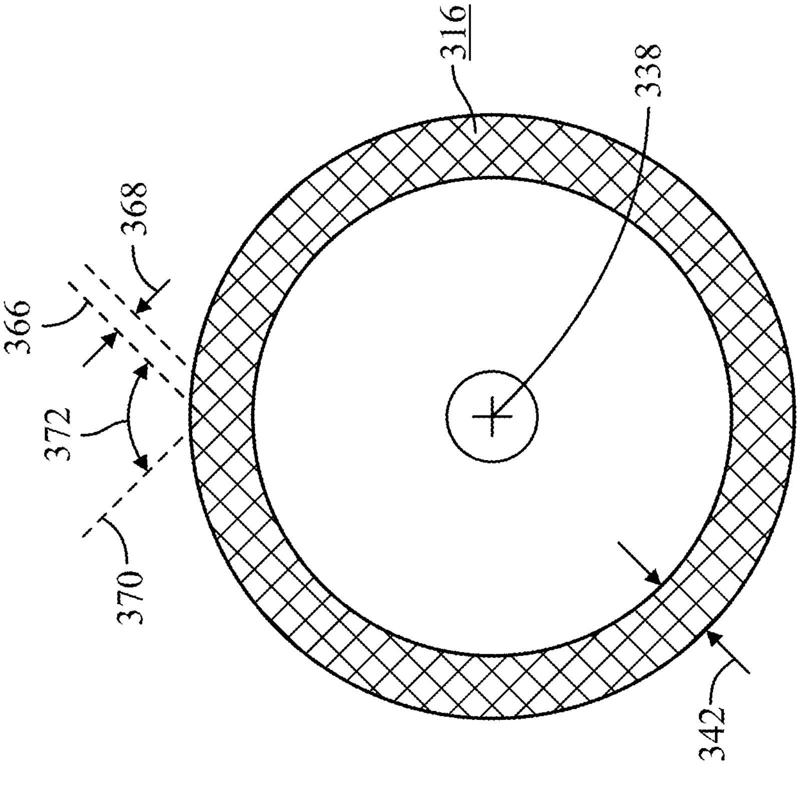
FIG. 27I illustrates a plan view of a fourth embodiment of the flat engaging surface of the rotor of the clutch shown in FIG. 26.
Figure 27J:
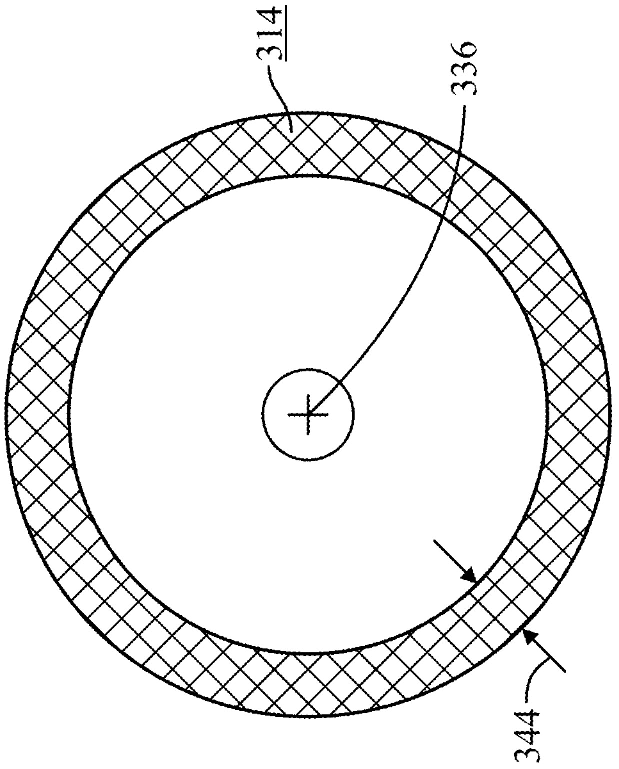
FIG. 27J illustrates a plan view of a fourth embodiment of a flat engaging surface of the armature rotor of the clutch shown in FIG. 26.

Other configurations of the laser induced friction treatment are also contemplated instead of a straight line. By way of example and not limitation, the laser induced friction treatment may have a skewed configuration as shown in FIGS. 27C and D. A straight line may be drawn from the rotating axes 338, 336. The straight line laser induced friction treatment may be formed at an angle 352 to the straight lines 348, 350. The straight line laser induced friction treatment may be formed on both the flat engaging surfaces 314, 316. The straight line laser induced friction treatment may be formed on the flat engaging surface 314 as a mirror image compared to the straight line laser induced friction treatment formed on the flat engaging surface 316. In this manner, the laser induced friction treatment formed on flat engaging surface 316 matches and engages with one of the laser induced friction treatment formed on the flat engaging surface 314. Referring now to FIGS. 27E and F, the laser induced friction treatment may be formed as an arrow configuration. The trailing edges of the arrows may be aligned to a straight line radiating outward from the straight lines 354, 356. A peak of the arrows may have a height 358 defined by its angle 358 from the rotating axes 338, 336 and be midway of a width 342, 344 of the surfaces 316, 314. The angle 358 may be between 1 and 15 degrees from a peak of the arrow to a base of the arrow. The configuration of the laser induced friction treatment may be mirror images of each other on the flat engaging surfaces 314, 316. Referring now to FIGS. 27G and H, the laser induced friction treatment may be formed into a semi circular or curved configuration. The trailing edges of the curve may be aligned to a straight line radiating outward from the straight lines 360, 362. A peak of the curve or the straight line 360, 362 may contact a tangent of the semi-circle defined by its angle 364 from the rotating axes 338, 336. The peak or the contact of the tangent point may be midway of a width 342, 344 of the surfaces 316, 314. The angle 364 may be between 1 and 15 degrees. The configuration of the laser induced friction treatment may be mirror images of each other on the flat engaging surfaces 314, 316.

In the laser induced friction treatment discussed in relation to FIGS. 27A-H, each laser induced friction treatment is identical to an adjacent laser induced friction treatment as a circular or radial array about the rotating axes 336, 338. However, it is also contemplated that the laser induced friction treatment may be formed as a linear array. By way of example and not limitation, a plurality of first straight line laser induced friction treatment 366 may be formed on the flat engaging surface 316. The first straight line laser induced friction treatment 366 may be parallel with each other. A plurality of second straight line laser induced friction treatment 370 may also be formed on the flat engaging surface 314. The second straight line laser induced friction treatment 370 may be parallel with each other. The first and second straight line laser induced friction treatment 370 may define an angle 372. The angle 372 may be between or equal to 1 degrees and 90 degrees. More preferably, the angle 372 may be between or equal to 35 degrees and 45 degrees. The angle 372 creates a diamond or square shaped laser induced friction treatment on the surface 314. The laser induced friction treatment formed on the surface 316 may be formed as a mirror image on the surface 314. A distance 368 between the lines 366, 370 may be between 0.001 inch and 0.125 inch. More preferably, the distance between the lines 366, 370 may be between 0.004 inches and 0.012 inches.

Other configurations are also contemplated which include and are not limited to sinusoidal configuration with a constant or varying amplitude and constant or varying period.

The laser induced friction treatment on the flat engaging surface 314 may have a mirror image compared to the laser induced friction treatment formed on the flat engaging surface 316. In this way, when the flat engaging surfaces 314, 316 of the armature 312 and the rotor 318 engage each other, each laser induced friction treatment on the flat engaging surface 314 of the armature 312 engages and matches with a corresponding laser induced friction treatment on the flat engaging surface 316 of the rotor 318.

Alternatively, one of the flat engaging surfaces 314, 316 may have less laser induced friction treatment compared to the other one of the flat engaging surfaces 314, 316. In other words, the entire surface of the flat engaging surfaces 314, 316 does not need to be covered with laser induce friction treatment. Rather, only a portion (e.g., 10%, 25%, 33%, 50% 75%) thereof need be covered with the laser induced friction treatment but yet still have enough friction to impart sufficient torque and mitigate slip between the armature 112 and the pulley 124. For example, the flat engaging surface 314 may have about 33% of its surface covered with laser induced friction treatment whereas the flat engaging surface 316 may have 100% of its surface covered with laser induced friction treatment. As these surfaces 314, 316 engage and disengage one another, the laser induced friction treatment formed on the flat engaging surface 314 would engage with only ⅓ of the laser induced friction treatment formed on the flat engaging surface 316. As such, the flat engaging surface 316 would last three times as long as the flat engaging surface 314. Preferably, one of the flat engaging surfaces 314, 316 is a sacrificial part. The flat engaging surface which is of the sacrificial part may have less laser induced friction treatment formed thereon so that the laser induced friction treatment on the non sacrificial part randomly engages with some but not all of the laser induced friction treatment formed on the sacrificial part each time that the parts engage and disengage. In the example above, the flat engaging surface 314 may be the sacrificial part. However it is also contemplated that the flat engaging surface which is of the sacrificial part may have more laser induced friction treatment formed thereon.

When the respective laser induced friction treatments on the flat engaging surfaces 314, 316 are engaged to each other, the rotor 318 rotates the pulley 324. The pulley has a belt 34 which drives another component such as a condenser unit of an air conditioner of an automobile.

When the respective laser induced friction treatments on the flat engaging surfaces 314, 316 are disengaged from each other, there is a gap between the rotor 318 and the armature 312 so that the rotor 318 does not rotate the armature 314 and the pulley 324. The rotor 318 continues to rotate under the rotational power of the shaft 326. However, because of the disengagement between the flat engaging surfaces 314, 316 of the armature 312 and the rotor 318, the pulley 324 remains stationary.

The air gap 340 between the rotor 318 and the armature 312 may be between the peaks of the laser induced friction treatment formed on the flat engaging surfaces 314, 316 of the armature 312 and the rotor 318. The air gap 340 may be between 0.001 inch and 0.050 inches between the peaks of the laser induced friction treatment formed on the flat engaging surface 314 of the armature 312 and the peaks of the laser induced friction treatment formed on the flat engaging service 316 of the rotor 318.

Figure 31:
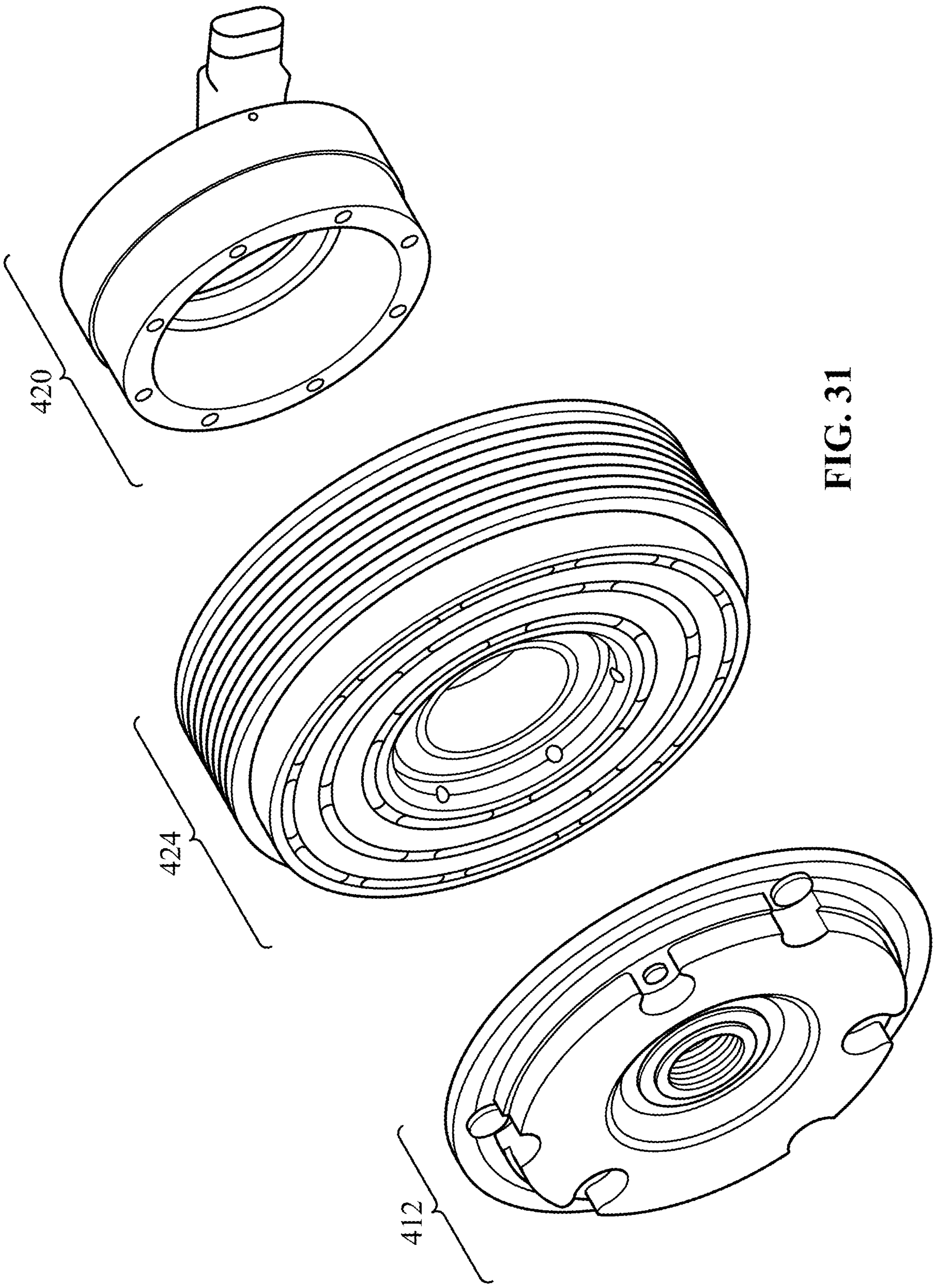
FIG. 31 illustrates an exploded view of the second type of electromagnetic clutch.

Referring now to FIGS. 29-31, a second type of electromagnetic clutch 410 is shown. The armature 412 is the driving disc which drives the pulley 424 (i.e., driven disc) when a flat engaging surface 414 of the armature 412 engages a flat engaging surface 416 of the pulley 424. An electric motor 422 may be disposed within a housing 472 of the electromagnetic clutch 410. The electric motor 422 rotates the shaft 426 from an external power supply such as a motor of an automobile. The armature 412 is fixedly attached to the shaft 426. As such, when the shaft 426 is rotating under the power of the motor 422, the armature 412 also rotates at the same speed and in the same direction. A spring 430 may be disposed within the housing 472 of the electromagnetic clutch 410 and may bias the armature 412 to a disengaged position which is shown in FIG. 29. The pulley 424 may have an electrical coil 420 disposed within the pulley. When the electrical coil 420 is energized, a magnetic field is generated which passes through an air gap 440 and passes through the armature 412. This generates a force which overcomes a force of the spring 430 so as to traverse the armature 412 to an engaged position, as shown in FIG. 30. In the engaged position, the flat engaging surface 414 of the armature 412 is in contact with the flat engaging surface 416 of the pulley 424. Torque is transferred from the armature 412 to the pulley 424 via the engaged flat engaging surfaces 414, 416 to rotate the pulley 424 in the same direction and at the same speed as the armature 412.

The laser induced friction treatment formed on the flat engaging surfaces 414, 416 mitigate slip between the two surfaces 414, 416. The laser induced friction treatment formed on the surfaces 414, 416 may have a mirror configurations in the same manner discussed in relation to the flat engaging surfaces 314, 316 above. Also, the laser induced friction treatment formed on the flat engaging surfaces 414, 416 is formed as a radial array around the rotating axes 474, 476 of the armature 412 and the pulley 424. Because of this, the laser induced friction treatment formed on the flat engaging surfaces 414, 416 engages and matches with a corresponding laser induced friction treatment formed on the flat engaging surfaces 414, 416. Each laser induced friction treatment formed on the flat engaging surfaces 414, 414 is frictionally engaged to a corresponding laser induced friction treatment formed on the flat engaging surfaces 414, 416. In certain circumstances, the entire surface of the flat engaging surfaces 414, 416 does not need to be covered with laser induce friction treatment. Rather, only a portion (e.g., 10%, 25%, 33%, 50% 75%) thereof need be covered with the laser induced friction treatment but yet still have enough friction to impart sufficient torque and mitigate slip between the armature 412 and the pulley 424. The other flat engaging services 414, 416 may be fully covered with the laser induced friction treatment. When the flat engaging surfaces 414, 416 engage each other, only a fraction of the laser induced friction treatment formed on the entire flat engaging surfaces 414, 416 are used. Over a period of time, the flat engaging surfaces 414, 416 that is fully covered with the laser induced friction treatment would wear down slower compared to the laser induced friction treatment formed on other one of the flat engaging surfaces 414,416.

The laser induced friction treatment has been described as being formed on both the flat engaging surfaces 314, 316 and 414, 416. However, it is also contemplated that the laser induced friction treatment may be formed on either the flat engaging surface 314 or the flat engaging surface 316. As such, one of the surfaces 314 or 316 would have no laser induced friction treatment. Also, it is contemplated that the laser induced friction treatment may be formed on either the flattened surface 414 or the flat engaging surface 460. As such, one of the surfaces 414 or 414 would have no laser induced friction treatment. Even with laser induced friction treatment formed on only one of the surfaces 314 or 316, 414 or 416, the friction treatment formed on the surface 314 or 316, 414 or 416 still increases the coefficient of friction between the engagement of the surfaces 314 and 316 and the engagement of the surfaces 414 and 416. Moreover, the laser induced friction treatment which has been formed on the surface 314 or 316, 414 or 416 begins to form pits or depressions within the other surface 314 or 316, 414 or 416 which does not have the laser induced friction treatment. In this regard, the laser induced friction treatments formed on the surface 314 or 316, 414 or 416 begins to be seated on the surface 314 or 316, 414 or 416 which does not have the laser induced friction treatment and is formed as a smooth flat surface.

It is also contemplated that one or both of the flat engaging surfaces 314, 316 and 414, 416 may be annealed. By annealing the flat engaging surfaces 314, 316, 414, 416, the flat surface and if friction treatment has been formed thereon is hardened. By hardening the flat surface and/or the laser induced friction treatment, the flat surface and the laser induced friction treatment would wear down slower compared to a flat surface or laser induced friction treatment which has not been annealed. In an aspect, one of the flat engaging surface 314 or 316, 414 or 416 may be anneal or may to have a greater hardness compared to the other one of the flat engaging surface 314 or 316, 414 or 416. Preferably, the part which is not a replaceable part is annealed or made to have a greater hardness compared to the part which is replace to rebuild the electromagnetic clutch. By way of example and not limitation, the flat engaging surface 314 of the armature 312 in FIG. 26 may have a lower hardness compared to the flat engaging surface 314 of the rotor 318 which may be annealed to achieve this relative hardness. As the armature 312 wears down, it can be replaced while allowing the rotor 318 to have a greater lifespan. Likewise, the flat engaging surface 414 of the armature for 12 may have a lower hardness compared to the flat engaging surface 416 of the pulley 424 period to achieve this relative hardness, the flat engaging surface 416 of the pulley 424 may be annealed.

As discussed above, the flat engaging surfaces 314, 316, 414, 416 may be formed with as a laser induced friction treatment thereon. The laser induced friction treatment may be formed utilizing the laser embossing and debossing embodiments described herein. For example, the laser induced friction treatment may be recast as induced by laser as discussed herein. Moreover, the engaging surfaces 314, 316, 414, 416 have been described as being flat. However, it is also contemplated that other configurations for the engaging surfaces 314, 316, 414, 416 may be used including but not limited to mating concave and convex configurations.

It is also contemplated that the various aspects described in relation to the embodiment shown in FIGS. 26-28 may be applied and combined with the embodiment shown in FIGS. 29-31. Also, the various aspects described in relation to the embodiment shown in FIGS. 29-31 may be applied and combined with the embodiment shown in FIGS. 26-28. By way of example and not limitation, the various configurations of the laser induced friction treatment discussed in relation to FIGS. 27A-27J, as shown in FIGS. 29A-29J.

The electromagnetic clutch 310, 410 was described in relation to an electromagnetic clutch as used in an automobile. However, the electromagnetic clutch may be used in other types of machinery including but not limited to office equipment, pumps compressors, servo motors, robotics, outdoor power equipment, processing machinery, factory automation, medical equipment, and off road equipment. The shaft 326, 426 would be rotated with a motor associated with one of these other types of equipment and used to selectively rotate a pulley 324, 424.

As discussed above, the pulley is described as the driven disc. Also, the rotor and the armature is described as the driving disc. However, it is contemplated that a separate disc may be attached to the pulley, rotor and armature as an intermediate part. This separate disc may rotate with the part to which it is attached. Nevertheless, the separate disc and the pulley, rotor and the armature are considered to be the same.

The above description is given by way of example, and not limitation. Given the above disclosure, one skilled in the art could devise variations that are within the scope and spirit of the invention disclosed herein, including usage of other types of lasers. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An electromagnetic clutch comprising:

a shaft attachable to a motor for imparting rotation to the shaft;

a rotor fixedly attached to the shaft so that the rotor rotates in sync with the shaft, the rotor having a laser induced friction engaging surface, the laser induced friction engaging surface being flat and formed as a pattern;

a spring;

an armature attached to the spring, the armature being biased to a disengaged position under a force of the spring, the armature having an engaging surface which is disposed parallel to the laser induced friction engaging surface of the rotor, in the disengaged position, a gap exists between the engaging surface of the armature and the laser induced friction engaging surface of the rotor so that the armature remains stationary while the rotor is rotating, the armature being traversable to an engaged position wherein the engaging surface of the armature is in frictional engagement with the laser induced friction engaging surface of the rotor so that the armature rotates in sync with the rotor;

a pulley attached to the armature so that the pulley rotates in sync with the armature, the rotor being rotatable while the pulley remains stationary when the armature is in the disengaged position, the pulley rotates in sync with the rotor when the armature is in the engaged position;

an electrical coil electrically communicable with a power source, the electrical coil disposed adjacent to the laser induced friction engaging surface of the rotor, the electrical coil being energizable so as to form an electric field across the laser induced friction engaging surface of the rotor and the armature, when the electrical coil is de-energized, the spring biases the armature to the disengaged position, when the electrical coil is energized, a magnetic force of the electrical coil attracts the armature so as to overcome the spring force and to traverse the armature to the engaged position and transmit power from the rotor to the pulley and rotate the pulley.

2. The clutch of claim 1 wherein the gap exists between the laser induced friction surface of the rotor and the engaging surface of the armature when the electrical coil is de-energized.

3. The clutch of claim 2 wherein the gap is between 0.001 inches and 0.050 inches.

4. The clutch of claim 3 wherein the gap is between 0.005 inches and 0.025.

5. The clutch of claim 4 wherein the laser induced friction surface has recast formed thereon and the recast has a height between 0.002 and 0.005 inches, wherein the gap is defined between peaks of the recast.

6. The clutch of claim 5 wherein the recast is formed on the laser induced friction surface as a plurality of straight lines that are equidistantly spaced apart and intersect a central rotating axis of the armature and the rotor.

7. The clutch of claim 6 wherein the laser induced friction surface of the armature has an equal number of straight lines as the laser induced friction surface of the rotor.

8. The clutch of claim 1 wherein the engaging surface of the armature is a laser induced friction surface.

9. An electromagnetic clutch comprising:

a shaft attachable to a motor for rotating the shaft;

a pulley attachable to the shaft so that the pulley is selectively rotatable in sync with the shaft, the pulley having an engaging surface;

a spring;

an armature fixedly attached to the shaft so that the armature rotates in sync with the shaft, the armature having a laser induced friction surface which is disposed parallel to the engaging surface of the pulley and formed as a pattern, the armature attached to the spring and biased to a disengaged position under a force of the spring, the armature being traversable to an engaged position;

an electrical coil disposed adjacent to the engaging surface of the pulley, the electrical coil being energizable so as to form an electric field across the engaging surface of the pulley and the armature, when the electrical coil is de-energized, the spring biases the armature to the disengaged position, when the electrical coil is energized, a magnetic force of the electrical coil attracts the armature so as to overcome the spring force and to traverse the armature to the engaged position and transmit power from the armature to the pulley and rotate the pulley;

wherein the laser induced friction surface of the pulley and the engaging surface of the armature are parallel to each other and has a gap when the electrical coil is de-energized.

10. The clutch of claim 9 wherein the laser induced friction surface of the rotor and the engaging surface of the armature are both flat.

11. The clutch of claim 9 wherein the gap is between 0.001 inches and 0.050 inches.

12. The clutch of claim 11 wherein the gap is between 0.005 inches and 0.025.

13. The clutch of claim 12 wherein the laser induced friction surface has recast formed thereon and the recast has a height between 0.002 and 0.005 inches, wherein the gap is defined between peaks of the recast.

14. The clutch of claim 13 wherein the recast is formed on the laser induced friction surface as a plurality of straight lines that are equidistantly spaced apart and intersect a central rotating axis of the armature and the rotor.

15. The clutch of claim 14 wherein the laser induced friction surface of the armature has an equal number of straight lines as the laser induced friction surface of the rotor.

16. The clutch of claim 9 wherein the engaging surface of the pulley is a laser induced friction surface.

17. A method of operating an electromagnetic clutch, the method comprising steps of:

providing the electromagnetic clutch attached to a motor;

energizing an electrical coil with a power source;

forming an electromagnetic field through an armature;

traversing the armature closer to a flat laser induced friction surface of a rotor the laser induced friction surface formed as a pattern;

contacting an engaging surface of the armature with the flat laser induced friction surface of the rotor to rotate the pulley;

deenergizing the electrical coil;

traversing the armature to a disengaged position to form a gap between the engaging surface of the armature and the flat laser induced friction surface of the rotor to stop rotation of the pulley.

18. The method of claim 17 wherein the contacting step further comprises a step of engaging recast formed on the engaging surface of the armature to recast formed on the laser flat induced friction surface of the rotor.

19. The method of claim 18 wherein the contact step further comprises a step of engaging each line of recast formed on the laser induced friction surface of the armature to one line of recast formed on the laser induced friction surface of the rotor.

* * * * *